(12) United States Patent
Arcot

(10) Patent No.: US 9,771,184 B2
(45) Date of Patent: Sep. 26, 2017

(54) EXPANDABLE ADAPTER FOR A FREE-STANDING BAG

(71) Applicant: Titan IP LLC, Naperville, IL (US)

(72) Inventor: Santosh Arcot, Naperville, IL (US)

(73) Assignee: Titan IP LLC, Naperville, IL (US)

( * ) Notice: Subject to any disclaimer, the term of this patent is extended or adjusted under 35 U.S.C. 154(b) by 49 days.

(21) Appl. No.: 14/612,498

(22) Filed: Feb. 3, 2015

(65) Prior Publication Data

US 2017/0001761 A1  Jan. 5, 2017

Related U.S. Application Data

(63) Continuation-in-part of application No. 13/952,313, filed on Jul. 26, 2013, now Pat. No. 8,985,854, which is a continuation-in-part of application No. 12/878,789, filed on Sep. 9, 2010, now Pat. No. 8,517,610.

(60) Provisional application No. 61/691,199, filed on Aug. 20, 2012.

(51) Int. Cl.
*B65D 33/00* (2006.01)
*B65D 30/18* (2006.01)
*B65F 1/00* (2006.01)
*B65D 30/20* (2006.01)
*B65B 67/12* (2006.01)
*B65D 30/10* (2006.01)

(52) U.S. Cl.
CPC ........ *B65D 33/007* (2013.01); *B65B 67/1238* (2013.01); *B65D 31/08* (2013.01); *B65D 31/10* (2013.01); *B65D 31/16* (2013.01); *B65D 33/00* (2013.01); *B65F 1/0006* (2013.01); *B31B 2219/90* (2013.01); *B65D 2207/00* (2013.01); *Y02W 30/807* (2015.05)

(58) Field of Classification Search
CPC ...... B65D 33/007; B65D 31/08; B65D 31/10; B65D 31/16; B65D 33/00; B65F 1/0006; B65B 67/1238
USPC ........... 383/33–34.1, 36, 120, 906; 229/67.3, 229/198.1
See application file for complete search history.

(56) References Cited

U.S. PATENT DOCUMENTS

| | | | | |
|---|---|---|---|---|
| 1,666,294 A | * | 4/1928 | Downes-Martin | A24F 19/12 131/240.1 |
| 2,833,460 A | * | 5/1958 | Votolato | B65D 33/00 383/36 |
| 3,062,428 A | * | 11/1962 | Oettinger | B65D 5/2052 206/515 |
| 4,036,423 A | * | 7/1977 | Gordon | B65D 81/3453 229/101 |

(Continued)

*Primary Examiner* — Jes F Pascua
(74) *Attorney, Agent, or Firm* — McDonnell Boehnen Hulbert & Berghoff LLP

(57) ABSTRACT

Disclosed herein are adapters for use with ordinary lawn and leaf bags. In one example, a foldable, expandable, and reusable adapter is provided. The adapter includes a rectangular base unit that is designed to receive four connector pieces. The four connector pieces are made of a rigid material and may include respective vertical and horizontal creases that allow them to be folded. As such, once assembled, the adapter may be folded for storage and later expanded for use. In use, the adapter is inserted into a lawn or leaf bag and provides a larger opening for the bag as well as prevents the mouth of the bag from closing.

21 Claims, 43 Drawing Sheets

(56) References Cited

U.S. PATENT DOCUMENTS

| | | | |
|---|---|---|---|
| 7,736,057 B2 * | 6/2010 | VanBost | B65B 67/04 141/114 |
| 7,866,538 B2 * | 1/2011 | Liao | B65D 5/0005 229/101 |
| 8,517,610 B2 * | 8/2013 | Arcot | B65D 31/16 141/391 |
| 8,985,854 B2 * | 3/2015 | Arcot | B65D 31/16 141/391 |
| 2002/0074247 A1 * | 6/2002 | Tremblay | B65D 5/008 206/223 |

* cited by examiner

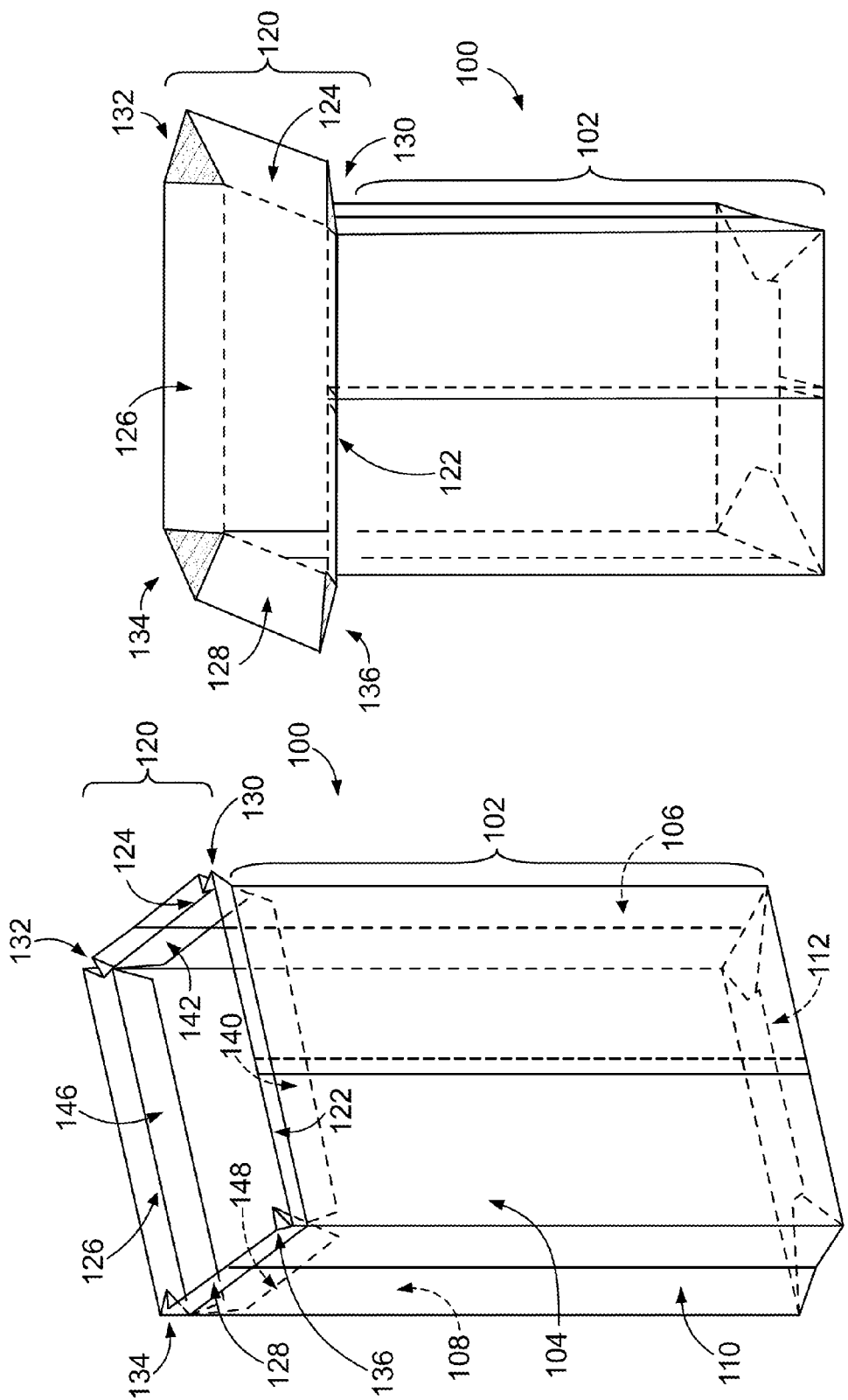

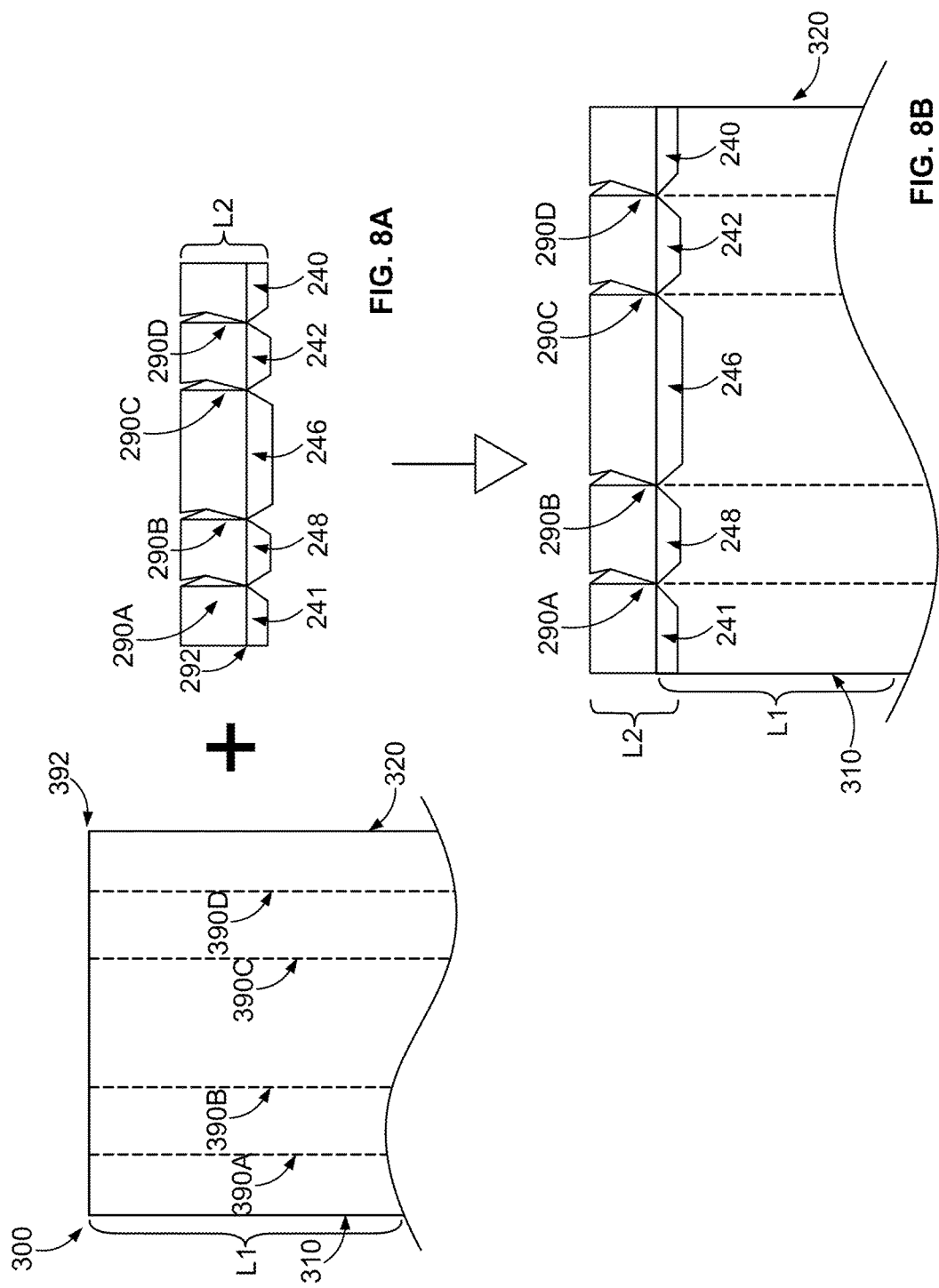

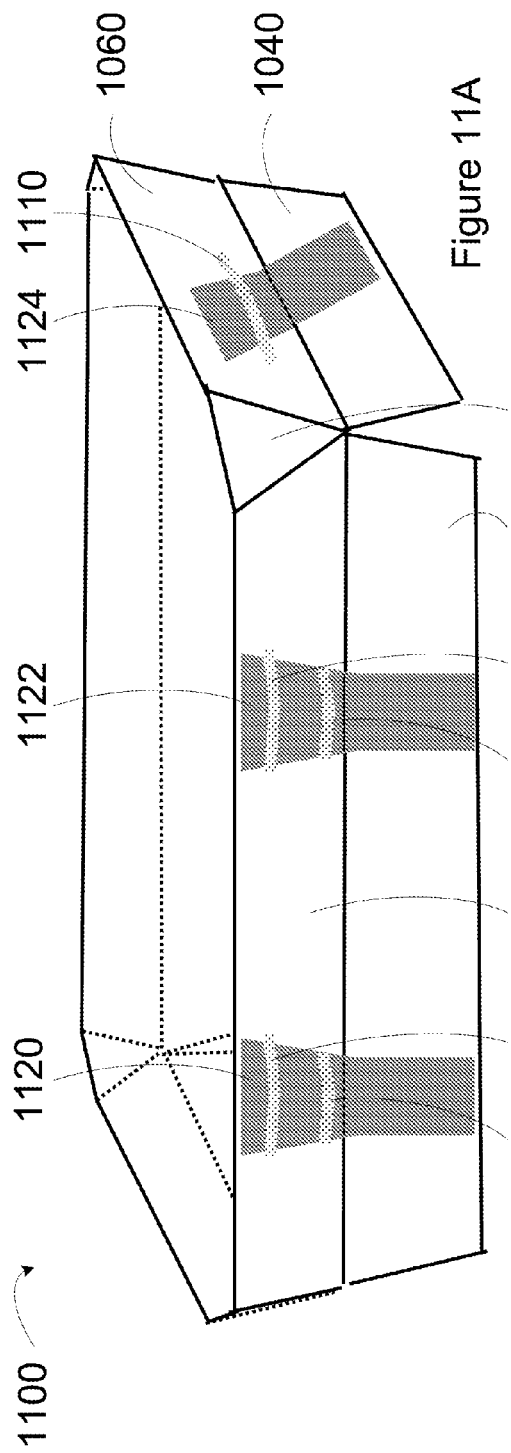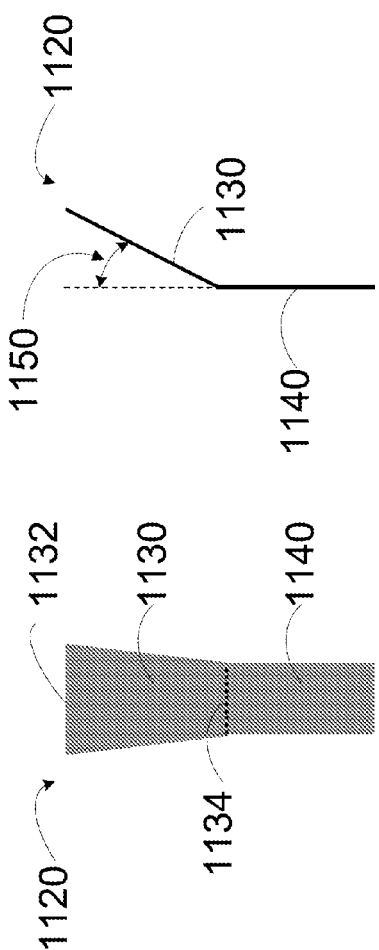
Figure 11A
Figure 11B
Figure 11C

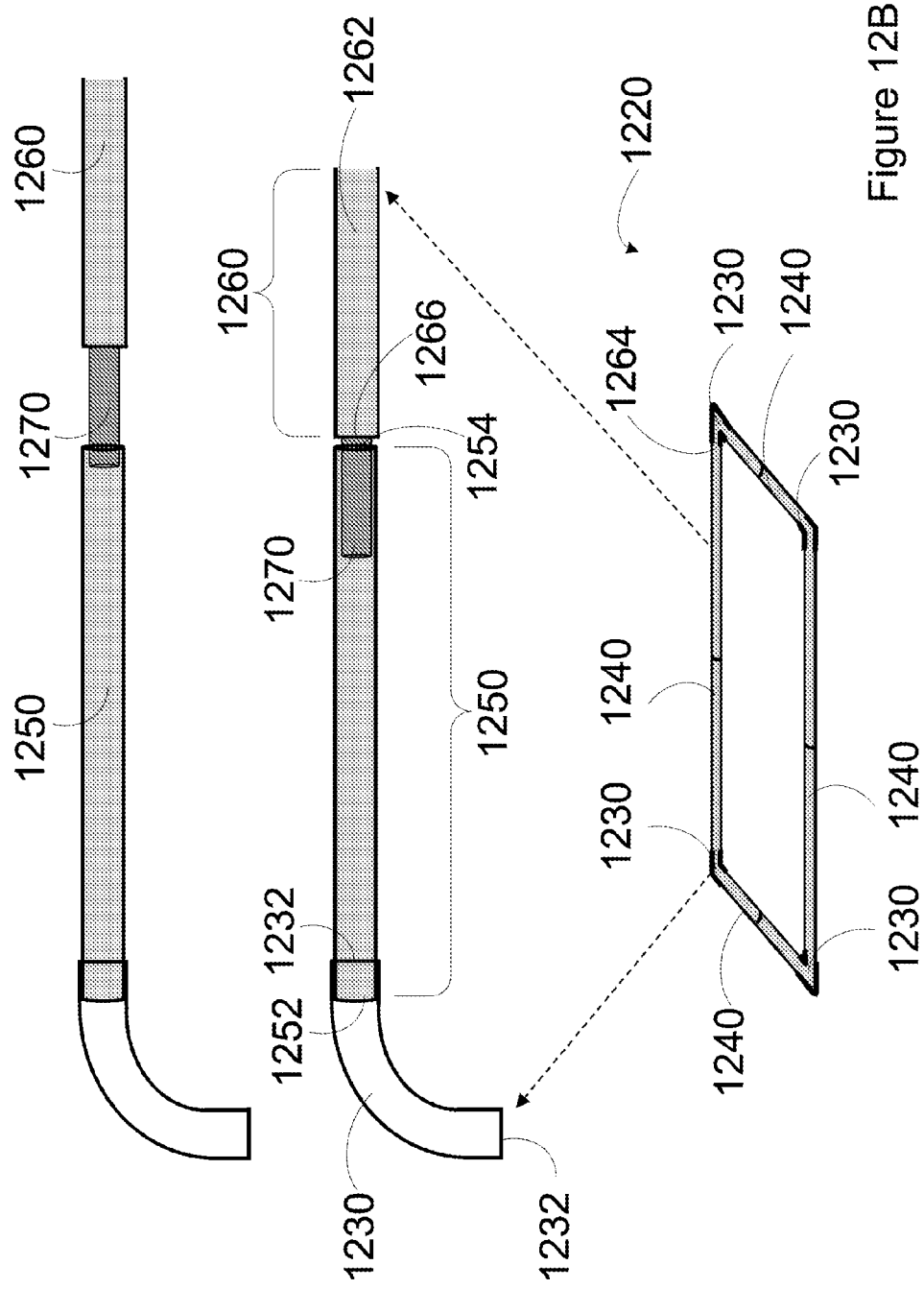

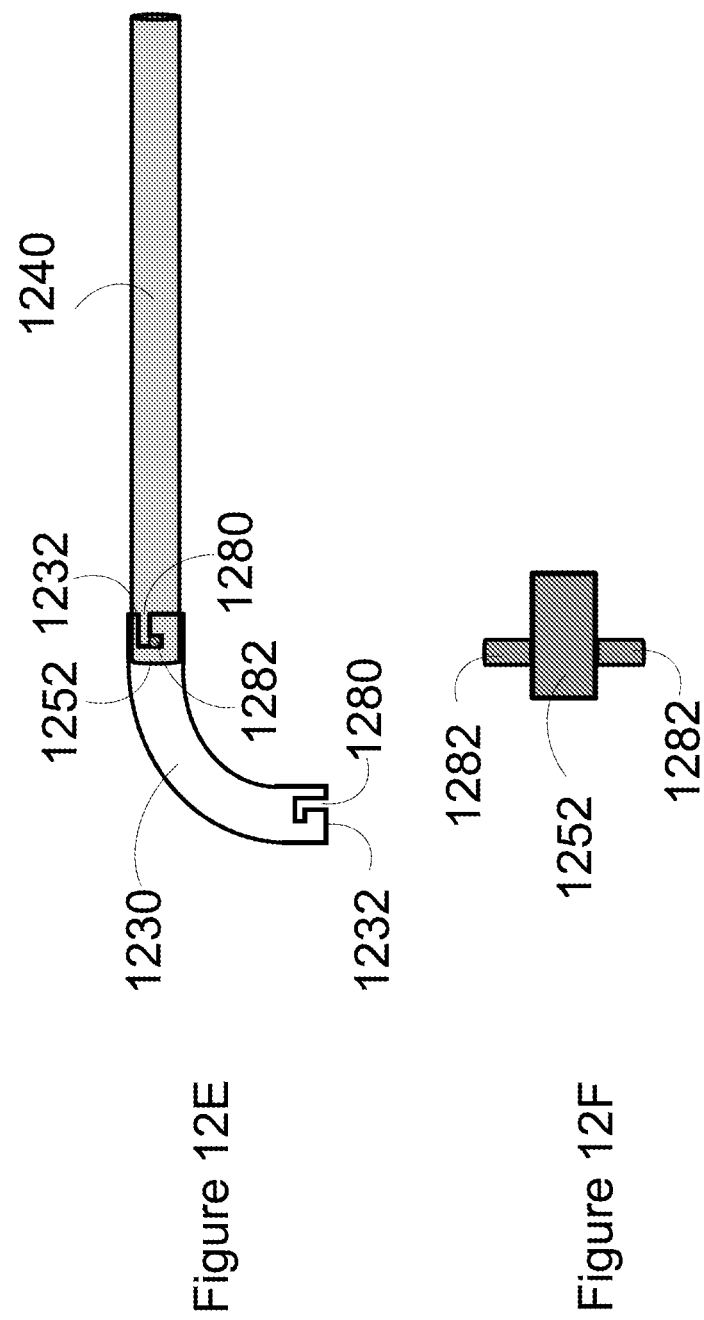

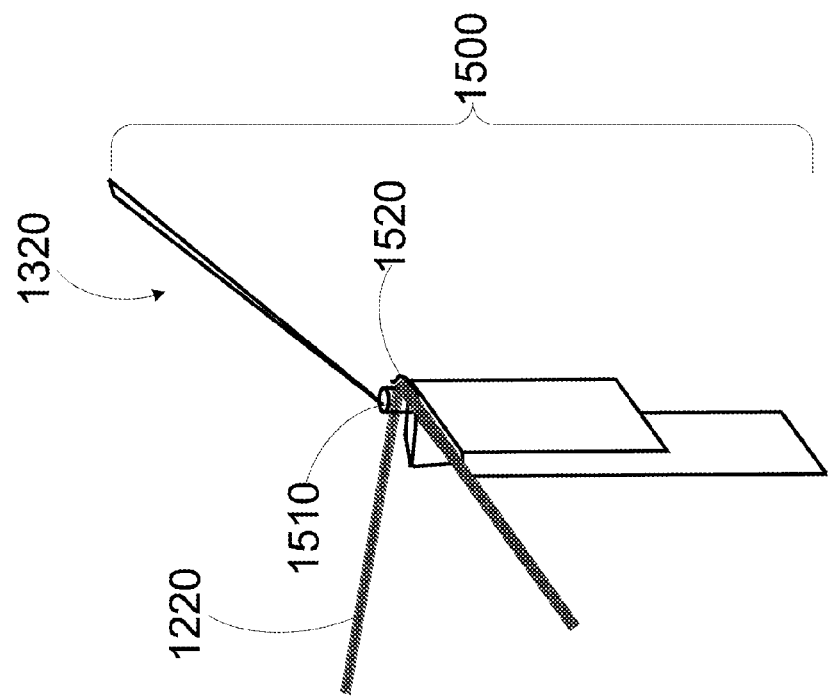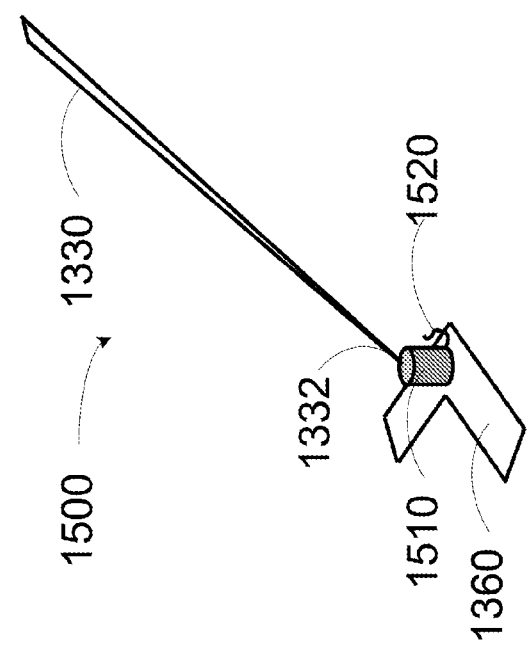
Figure 15

Figure 29 A
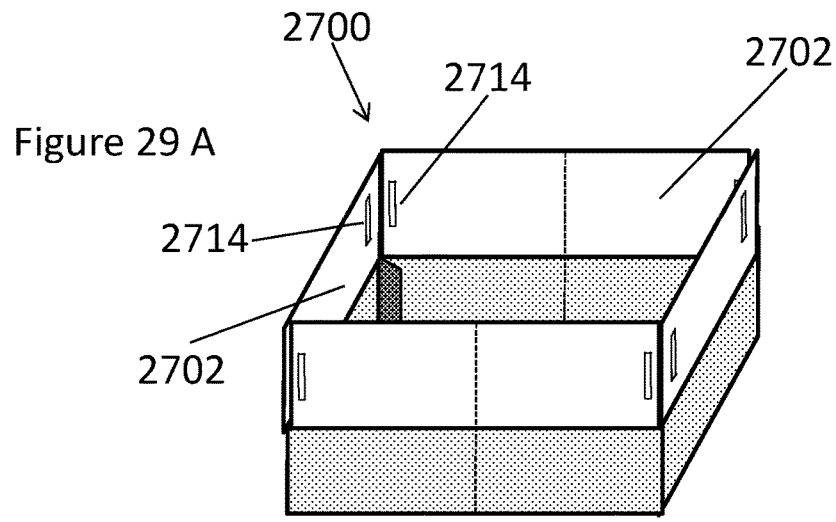
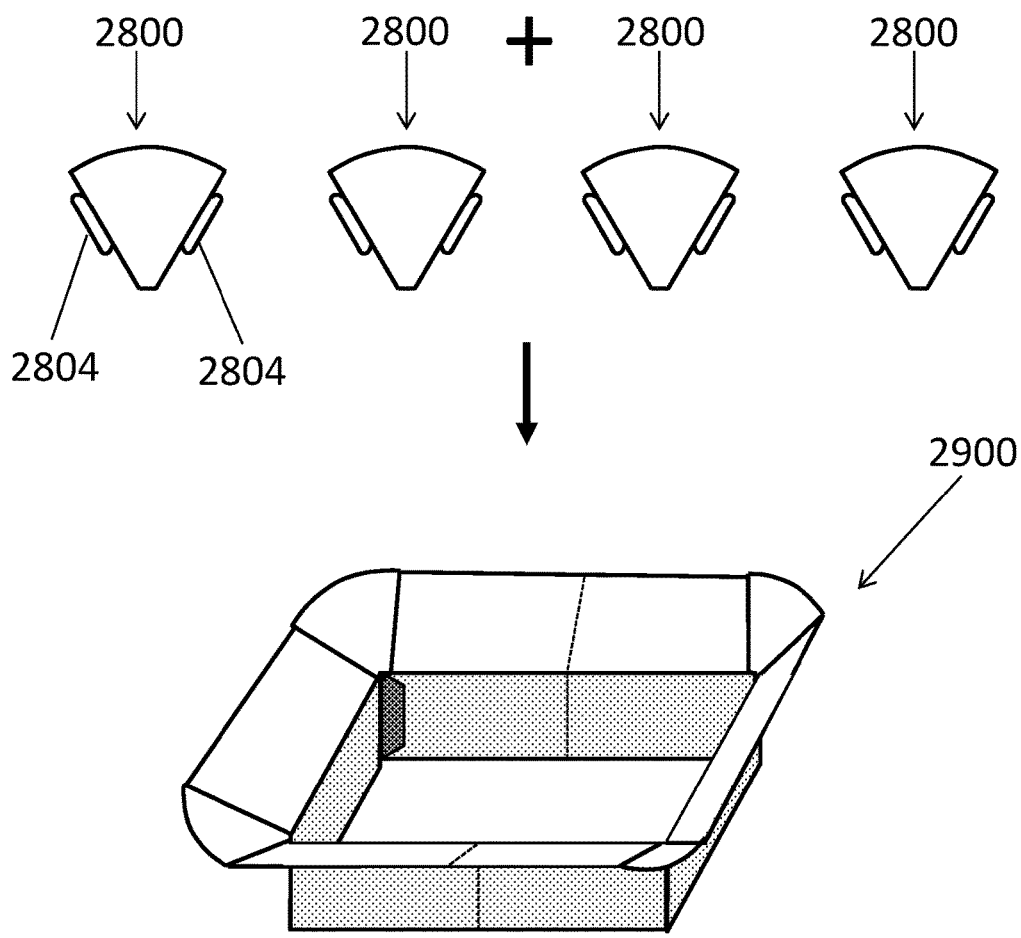

Figure 29 B
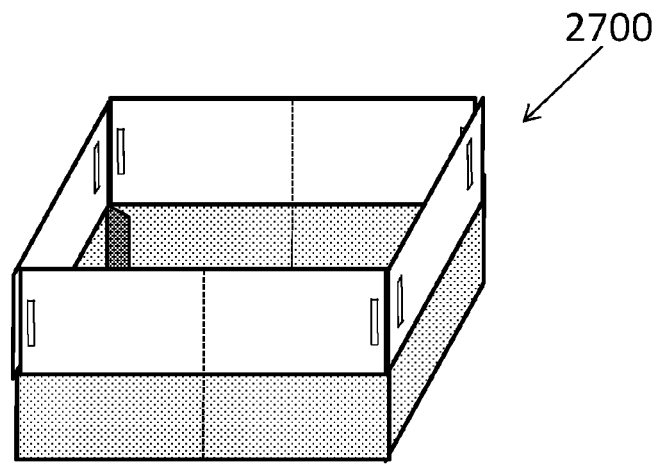
+
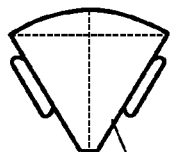 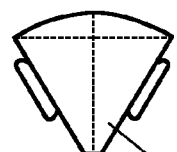 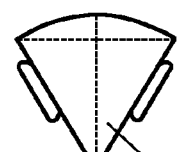 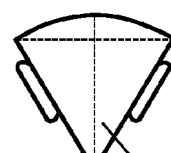
2820     2820     2820     2820
↓
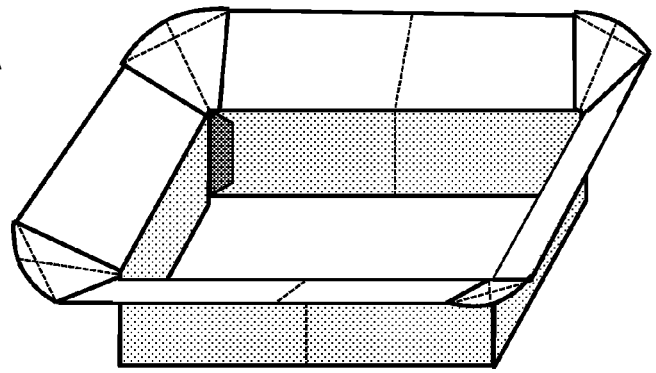
2910

EXPANDABLE ADAPTER FOR A FREE-STANDING BAG

CROSS-REFERENCE TO RELATED APPLICATION

This application is a continuation-in-part of U.S. patent application Ser. No. 13/952,313, filed on Jul. 26, 2013 and entitled "Adapter For a Free-Standing Bag", now pending, which is a continuation-in-part of U.S. patent application Ser. No. 12/878,789, filed on Sep. 9, 2010 and entitled "Foldable Bag with Expandable Opening," now issued as U.S. Pat. No. 8,517,610, and claims priority to U.S. Provisional Application No. 61/691,199, filed on Aug. 20, 2012 and entitled "An Adapter for a Free-Standing Bag," each of which are hereby incorporated herein by reference for all purposes as if fully set forth herein.

FIELD OF THE INVENTION

The invention relates to expandable, foldable adapters for a free-standing bag that provide a larger opening for the bag as well as prevent the bag from closing.

BACKGROUND

Ordinary free standing paper bags have become very popular in all facets of day-to-day life. Some bags are often used in the retail and food industries for packing of items such as groceries and food items from restaurants and take-out services, as well in the household waste industry for disposal of leaves, grass clippings and other biodegradable items. These bags are very simple in design and therefore easy to manufacture in large quantities and in an economical manner.

Such paper bags are generally foldable into a relatively flat rectangular form that is compact in size, so that they can be transported and sold more conveniently. In particular, two opposing sides of the bag are typically folded inward, collapsing the cavity of the bag so the other two opposing sides are brought together and centered perpendicularly above the base of the bag. Once the two opposing sides are brought together, the base of the bag can then be pivoted around the sides so that it is substantially parallel with the sides, and together with the sides forms a substantially flat rectangular shape. Bags folded into such a flat shape are typically stacked and packaged so that they can be sold in quantity.

In order to use the bag for its intended purpose, the bag is generally unfolded to create a vertical standing bag with a rectangular cavity and a base as the support for the bag. The simple design provides sufficient rigidity to the bag, but also allows the bag to collapse easily due to the folds in the vertical sides of the bag. This design aspect may be particularly important in taller lawn and leaf bags. Other variants of this basic design also include handles for easy carrying of the bag containing its contents.

One issue with such bags, which may be particularly problematic in lawn bags, is tears in the top portion of the bag resulting from the act of loading the contents, particularly odd-shaped objects or slightly oversized items such as twigs or branches. Further, in the case of lawn bags, factors such as wind can make it difficult to load the bag when the sides of the bag collapse. The fixed opening dimension also makes it quite challenging to load items such as grass clippings and leaves. The bag can collapse upon itself resulting in partial or complete closure of the opening, which makes the act of loading the bag a frustrating experience. Furthermore, the act of transferring grass clippings into the paper bag directly using the receptacle unit that collects grass clippings generally attached behind a lawnmower can result in tears in the paper bag opening leading to spills and additional inconvenience and frustration.

None-the-less, this standard bag design has withstood the test of time without significant modifications to the opening dimensions and shape of the bag. One reason for this is the simple manufacturing process that easily enables production of large quantities of the existing design. A number of mechanisms and devices that can aid in filling of the paper lawn bags have been documented. Some of these are funnel-shaped devices that aid in loading the bag, (see e.g., U.S. Pat. No. 6,085,647 and U.S. Pat. No. 6,116,548), while others are rigid frames that are inserted into the bag (see e.g., U.S. Pat. No. 5,915,768) or around the mouth of the bag to keep the mouth open and prevent from collapsing (see e.g., U.S. Pat. No. 6,138,962). The variety of products that have been designed to address the explicit problem of the difficulty in loading the lawn bags is an indication of the importance of the problem and clear evidence of the need to alleviate this problem.

However, most of these devices or methods are items that have to be sourced separately and/or modified extensively for use with bags of other dimensions, and therefore necessitate additional expenditure of money and time. For instance, U.S. Pat. No. 6,085,647 and U.S. Pat. No. 6,116,548 demonstrate the use of a hopper mounted on a stand that can be used to fill lawn bags placed below. It can be easily concluded that a bag of a different dimension or cross-section would necessitate a different hopper and stand design and dimensions. Likewise, U.S. Pat. No. 5,915,768 demonstrates a method of creating a funnel made out of plastic material that can be used for packing yard waste into a bag. U.S. Pat. No. 6,138,962 demonstrates a method to use a frame to keep the mouth of the bag open during the act of loading.

Furthermore, most of these devices or methods do not have desirable characteristics for routine consumer use. For instance, U.S. Pat. No. 7,736,057 B2 and U.S. Pat. No. 7,302,978 B1 demonstrate devices that are foldable in design, but are not exactly compact. In addition, their design also limits the amount of material that can be loaded into the bag due to a rigid bottom portion that extends all the way into the base of the bag. Moreover, the material used in the manufacture of these devices is corrugated paper that can easily get wet which would cause the device to lose its structural integrity and prevent reuse of the device. Likewise, U.S. Pat. No. 5,271,589 demonstrates a method of creating a device made out of two interlocking pieces and is not compact either. This item also suffers from the same disadvantage of getting wet and is therefore designed as a disposable product. Finally, while this device can be used as an aid to fill lawn and leaf bags, it is designed for use with plastic refuse bags ideally. None of these existing solutions provide all the benefits that can be provided with a compact, light-weight, washable and reusable adapter as described in this invention.

OVERVIEW

Exemplary embodiments relate to the creation of a compact and foldable adapter that can be assembled to form an object with a cavity and a lower portion that can be inserted into ordinary, free-standing lawn and leaf bags. Upon insertion into the opening of a bag, the adapter is held in place to the opening of the bag using structural design elements such that the cavity of the adapter is outside the bag while the lower portion of the adapter is preferably inside the bag. The primary purpose of the cavity of the adapter is to form a larger surface area of the mouth of the bag to aid in easy loading of the bag. The structural design elements of the adapter are such that upon insertion of the adapter into the bag, the shape of the adapter is maintained in place and does not collapse by itself or due to external factors such as blowing wind.

The adapter piece is preferably created using light weight material that is fully flexible and washable. The light weight of the adapter ensures that upon insertion into, and affixing to the bag, the bag does not collapse upon itself due to the weight of the adapter. Another feature of the adapter is that it can be folded into a compact shape for easy storage after removing the structural design elements. Yet another feature of the adapter is that it is water-resistant and fully washable for reuse. The primary application of this adapter is for insertion into standard, free-standing lawn and leaf bags made out of single or double-ply paper. The shape and size of the adapter is modifiable for other similar applications.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 1 shows a finished bag with the adapter piece attached;

FIG. 2 shows the same bag as shown in FIG. 1 except in an expanded configuration that creates the funnel-shaped structure;

FIGS. 8A and 8B are block diagrams illustrating how an upper portion and lower portion of a bag may be connected, before being folded to create a cavity of the bag, according to an exemplary manufacturing method;

FIG. 11A shows an exemplary adapter piece including a plurality of side fasteners;

FIG. 11B shows a front view of an exemplary side fastener;

FIG. 11C shows a side view of an exemplary side fastener;

FIGS. 12B and 12C show an exemplary expandable frame in an unexpanded and an expanded state;

FIG. 12E shows an exemplary connector piece attached to an exemplary frame piece.

FIG. 12F shows a top-down view of an exemplary connection end of an exemplary frame piece;

FIG. 15 shows an exemplary corner fastener;

FIG. 29A shows a conceptual illustration of a method of connecting connector pieces to a base unit to form an adapter piece for a free-standing bag;

FIG. 29B shows a conceptual illustration of a method of connecting connector pieces to a base unit to form an adapter piece for a free-standing bag;

DETAILED DESCRIPTION

Figure 3A:
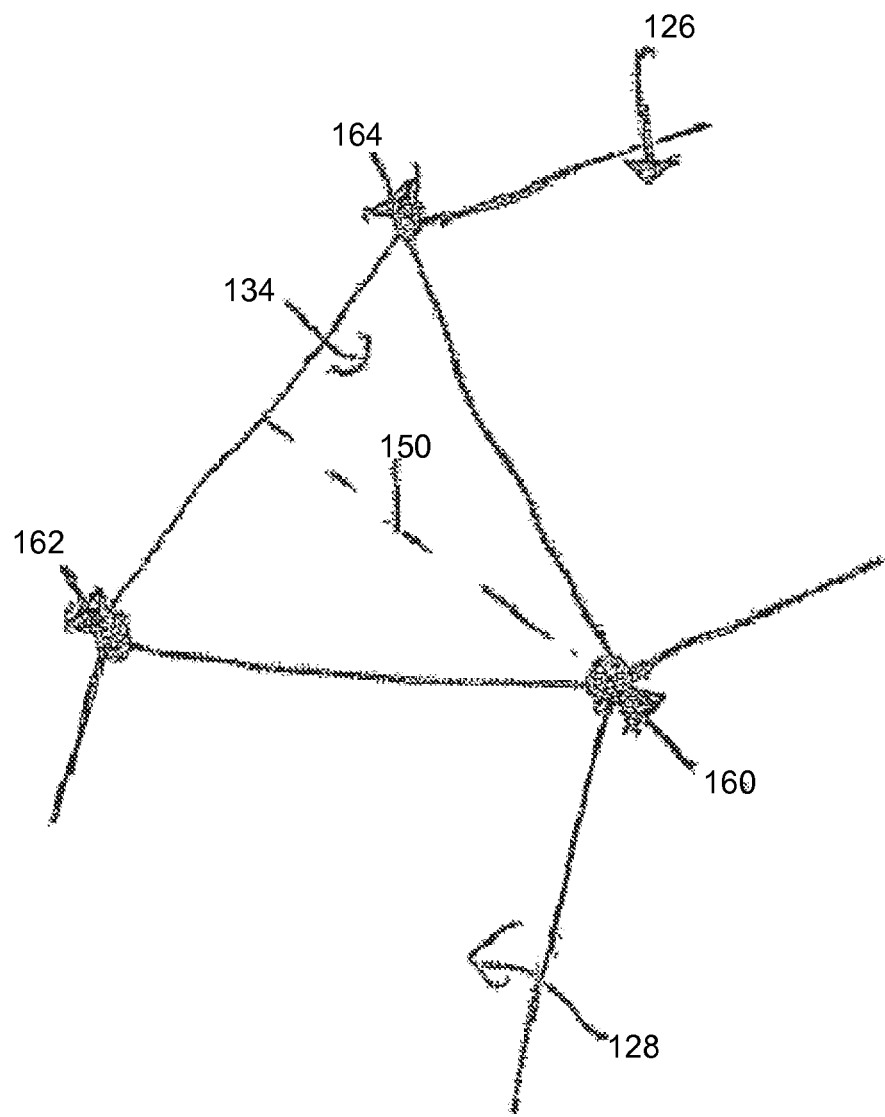
FIG. 3A shows a top-down view of a connector section in an expandable upper portion of an exemplary bag.

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

A bag according to an exemplary embodiment has a rectangular lower portion and an expandable upper portion that can be expanded to provide a larger opening to the bag. The lower portion preferably has inner walls that define a tubular cavity, while the foldable upper portion preferably has inner walls that define an upper cavity that varies in form depending upon whether or not the upper portion is expanded. When the upper portion of the bag is not expanded, the upper cavity preferably is tubular, and in an exemplary embodiment, is a rectangular cavity that is simply an extension of a rectangular cavity of the lower portion. However, when the upper portion is expanded, the upper cavity is preferably funnel-shaped, with a larger opening at the top of the bag.

As used herein, the term "cavity" shall mean any three-dimensional air-space within a structure that is enclosed on at least four sides by the structure. A cavity may be open-ended (i.e., not enclosed) on one or both ends of the structure (i.e., not enclosed by a bottom section and/or top section of the structure). A "tubular" cavity shall be understood to mean a cavity defined by side walls and having a cross-section of any shape (e.g., circular, rectangular, etc.), where the cross-sectional area is constant throughout the cavity. A "funnel-shaped" cavity shall be understood to mean a cavity defined by sloping side walls and having a cross-section of any shape, where the cross-sectional area increases/decreases throughout the cavity.

FIGS. 1 and 2 illustrate a free-standing bag 100 according to an exemplary embodiment. In FIG. 1, the triangular connector sections 130-136 at the corners of the bag are folded inward so that the bag has the form factor of traditional bags; i.e. a rectangular shape with a bottom panel and an opening at the top. By unfolding the triangular connector sections, a wider, funnel-shaped opening is formed. FIG. 2 illustrates the free-standing bag 100 once the upper portion is unfolded to create the funnel-shaped opening.

In FIGS. 1 and 2 the lower portion of the bag 100 includes a plurality of lower side sections and a bottom section that are connected to form a tubular lower cavity. More specifically, as shown in FIG. 1, the lower portion 102 preferably includes four side sections 104-110, with two opposing long sides 104, 108 parallel to each other, and two opposing short sides 106, 110 that are also parallel. As shown, the four side sections 104-110 are connected so as to define a lower cavity within the lower portion of the bag, with the bottom section 112 connected to the four side sections 104-110 so as to close the lower cavity at the bottom of the bag. As further shown, the lower cavity is preferably a tubular cavity having a rectangular cross-section.

The upper portion of the bag includes a plurality of upper side sections, a plurality of insert sections, and a plurality of connector sections. As shown, the upper portion 120 includes four rectangular side sections 122-128, with two rectangular long sides 122, 126 that are parallel to each other, and two rectangular short sides 124, 128 that are also parallel. As shown, the four connector sections 130-136 connect the four side sections 122-128 such that the upper portion can be expanded to provide a funnel-shaped opening to the bag by unfolding the connector sections 130-136. Further, the upper portion 120 preferably includes four insert sections 140-146, with one extending from each side section towards the lower portion of the bag. Each insert section 140-146 is preferably affixed by adhesive or other means to a corresponding lower side section 104-110, such that a lower edge of each upper side section 122-128 abuts an upper edge of a corresponding lower side section 104-110.

As noted, the upper portion 120 of the bag includes foldable connector sections 130-136 that allow the upper portion 120 of the bag to be expanded to create a funnel-shaped opening. To illustrate, FIG. 3A shows a more-detailed top-down view of one foldable connector section 134, which connects upper side sections 126 and 128. In FIG. 3A, the connector section 134 is shown in an unfolded position, which provides a funnel-shaped opening to the bag. Preferably, the connector section 134 is an equilateral triangle with a corner 160 that connects a lower corner of side section 128 and a lower corner of side section 126. The other two corners 162 and 164 are connected to only one side section (side section 126 and side section 128, respectively). When the connector sections 130-136 are unfolded, upper side sections 130-136 angle outward from the lower side sections 104-110 to form the funnel-shaped opening.

Figure 3B:
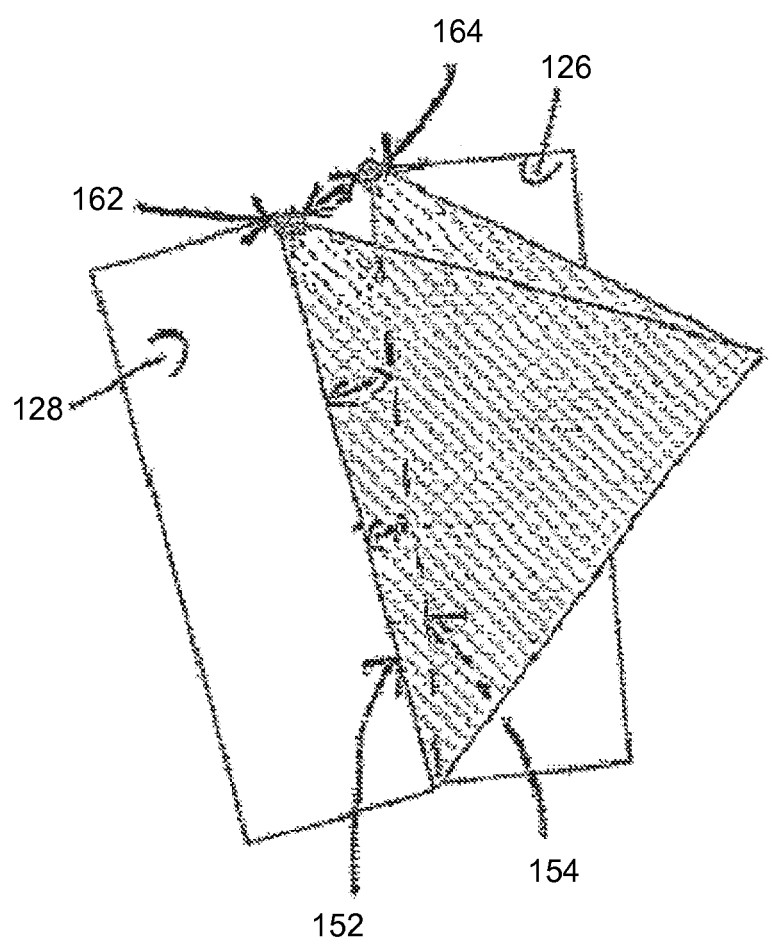
FIG. 3B shows an angular view of a connector section in an expandable upper portion of an exemplary bag.

Further, the connector section 134 preferably has a crease 150, which allows the connector section 134 to be folded inward and upon itself, as shown in FIG. 3B. Preferably, crease 150 bisects the connector section 134 (i.e., bisects the equilateral triangle), such that when the connection section 134 is folded inward to the upper cavity, the corners 162 and 164 of the connector section are brought together, so that edge 152 of side section 128 is substantially flush against the edge 154 of side section 154. As such, when the connector sections 130-136 are folded inward, the edges of upper side sections 122-128 form a substantially rectangular shape, and in effect extend lower side sections 104-110 to form a single rectangular cavity.

Figure 4A:
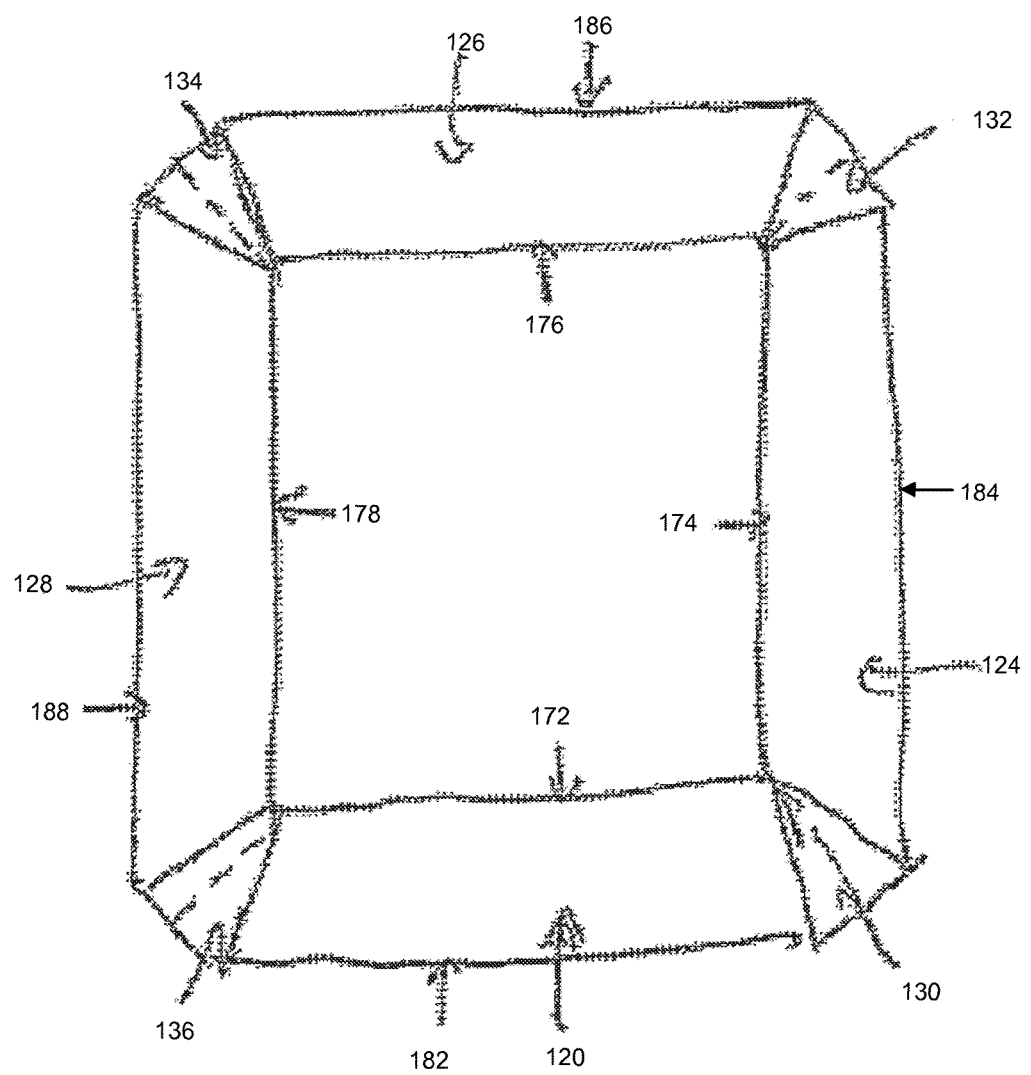
FIG. 4A shows an expandable upper portion of an exemplary bag in an expanded state.

FIG. 4A shows a top-down view of the upper portion 120 of the bag when connector sections 130-136 are unfolded. The cavity defined within the upper side sections 122-128, may be referred to as the upper cavity, and the cavity within the lower side sections 104-110 may be referred to as the lower cavity. As such the upper cavity is open at both ends, and defined as the space between a lower opening, which is defined by lower edges 172-178 of upper side walls 122-128, and an upper opening, which is defined by the upper edges 182-188 of upper side walls 122-128 and the upper edges 190-196 of connector sections 130-136.

The lower opening of the upper cavity, which is proximate to the lower cavity that is defined by lower side walls 104-100, preferably has a cross-section that is substantially the same size as a cross section of the lower cavity. In other words, the rectangle formed by the lower edges 172-178 of the upper side sections 122-128 is of substantially the same dimensions and orientation as the rectangle formed by the lower side sections 104-110. However, as shown, when the connector sections 130-136 are unfolded, the upper opening, which is distal to the lower cavity, is larger than the lower opening, as the upper edges 182-188 of upper side walls 122-128 and the upper edges 190-196 of connector sections 130-136, together, form an octagonal opening having a greater area than the rectangular opening formed by the lower edges 172-178 of the upper side sections 122-128. As such, when the upper portion is expanded, the upper side walls 122-128 angle outward from the lower edges 172-178, where the upper side walls 122-128 connect to lower side walls 104-110, thus defining a funnel-shaped upper cavity, which opens into the rectangular lower cavity.

Figure 4B:
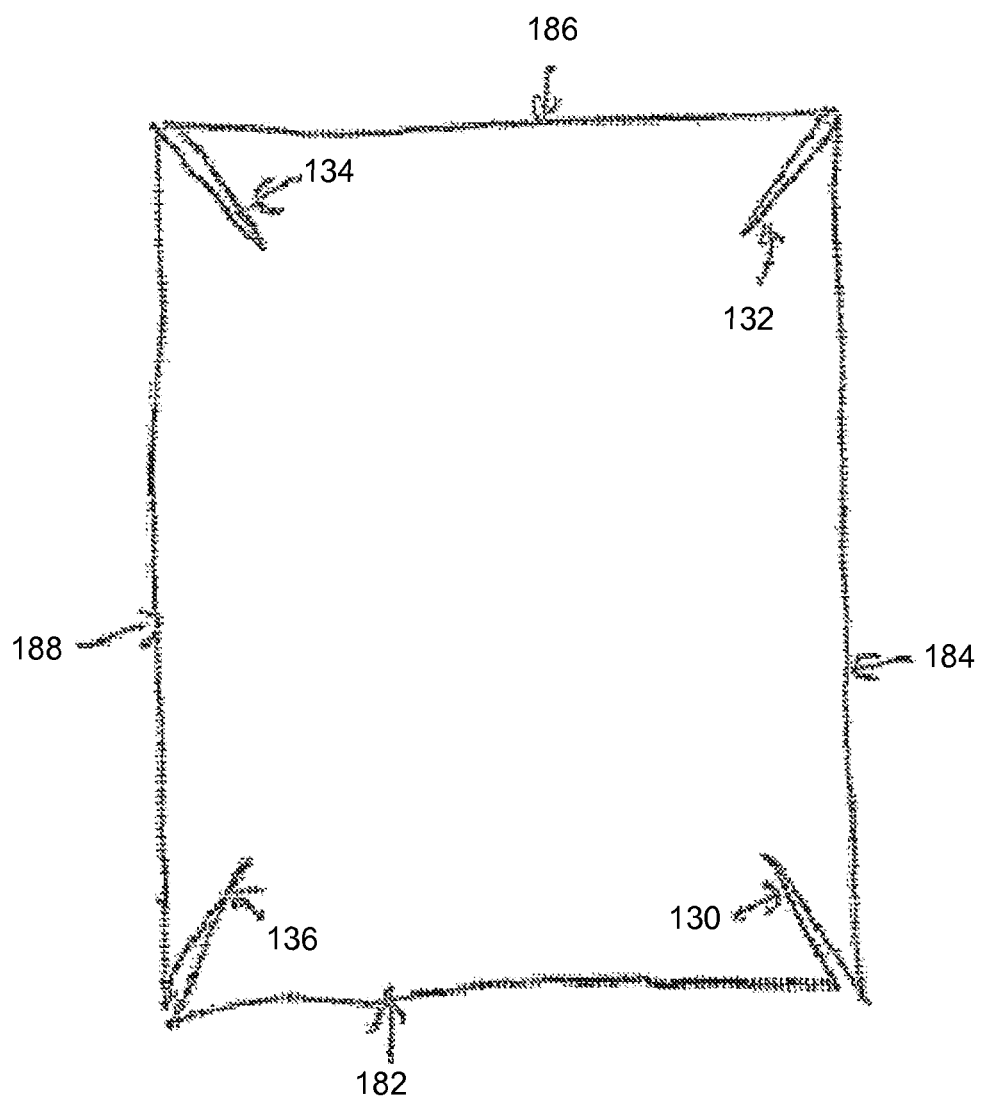
FIG. 4B shows an expandable upper portion of an exemplary bag in an unexpanded state.

FIG. 4B shows a top-down view of the upper portion 120 of the bag when the connector sections 130-136 are folded inward. Once the connector sections 130-136 are folded, the upper opening of the upper cavity is a substantially rectangular opening. Further, since each upper side section 122-128 is rectangular, both the lower opening and the upper opening are substantially the same size. As such, the upper cavity is tubular, and in the illustrated embodiment, is a rectangular cavity with a cross section that is the same size as a cross section of lower cavity. Thus, when the connector sections 130-136 are folded inward, the upper and lower cavities preferably form one contiguous rectangular cavity.

Figure 4C:
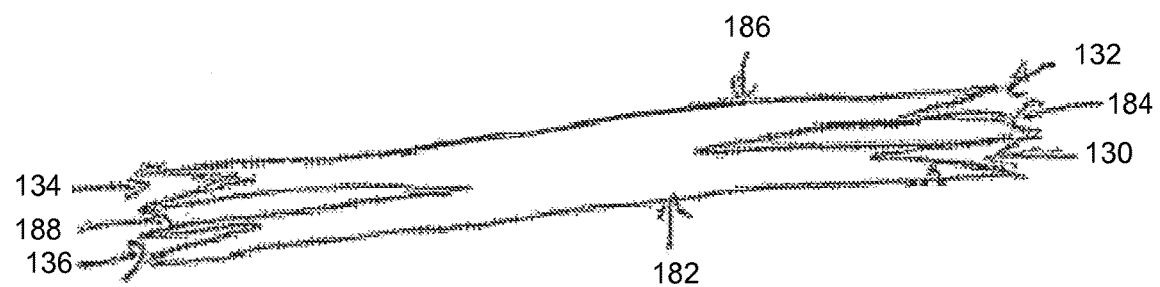
FIG. 4C shows a top-down view of an expandable upper portion of an exemplary bag folded to be substantially flat.

Referring back to FIGS. 1 and 2, in a further aspect, free-standing bag 100 may include creases such that the bag folds to a substantially flat shape. In particular, when connector sections 130-136 are folded inward, each upper side section 122-128 and its corresponding lower side section 104-110 effectively form a single rectangular side section. Folded as such, the bag 100 has a single rectangular cavity defined by four side walls and a bottom section, and thus takes on substantially the same form as traditional bags (albeit with the connector sections extending inward to the upper cavity). Crease patterns that allow traditional bags to fold flat are well known in the art. Accordingly, standard crease patterns may be applied to the lower portion 102 of bag 100, such as those shown by the dotted lines in the lower side sections 104-110 and bottom section 112 in FIGS. 5 and 6. As the connector sections 130-136 allow the upper portion to be folded so that the bag has the same form factor as a traditional bag, standard crease patterns may be extended through the upper portion 120 of the bag, as shown by the dotted lines in upper side sections 122-128. These standard crease patterns, along with the creases in the connector sections 130-136, allow the bag 100 to fold into a substantially flat rectangular shape, as shown by the top down view of the upper portion 120 shown in FIG. 4C. It should be understood that other crease patterns may be employed, without departing from the scope of the invention.

Figure 5:
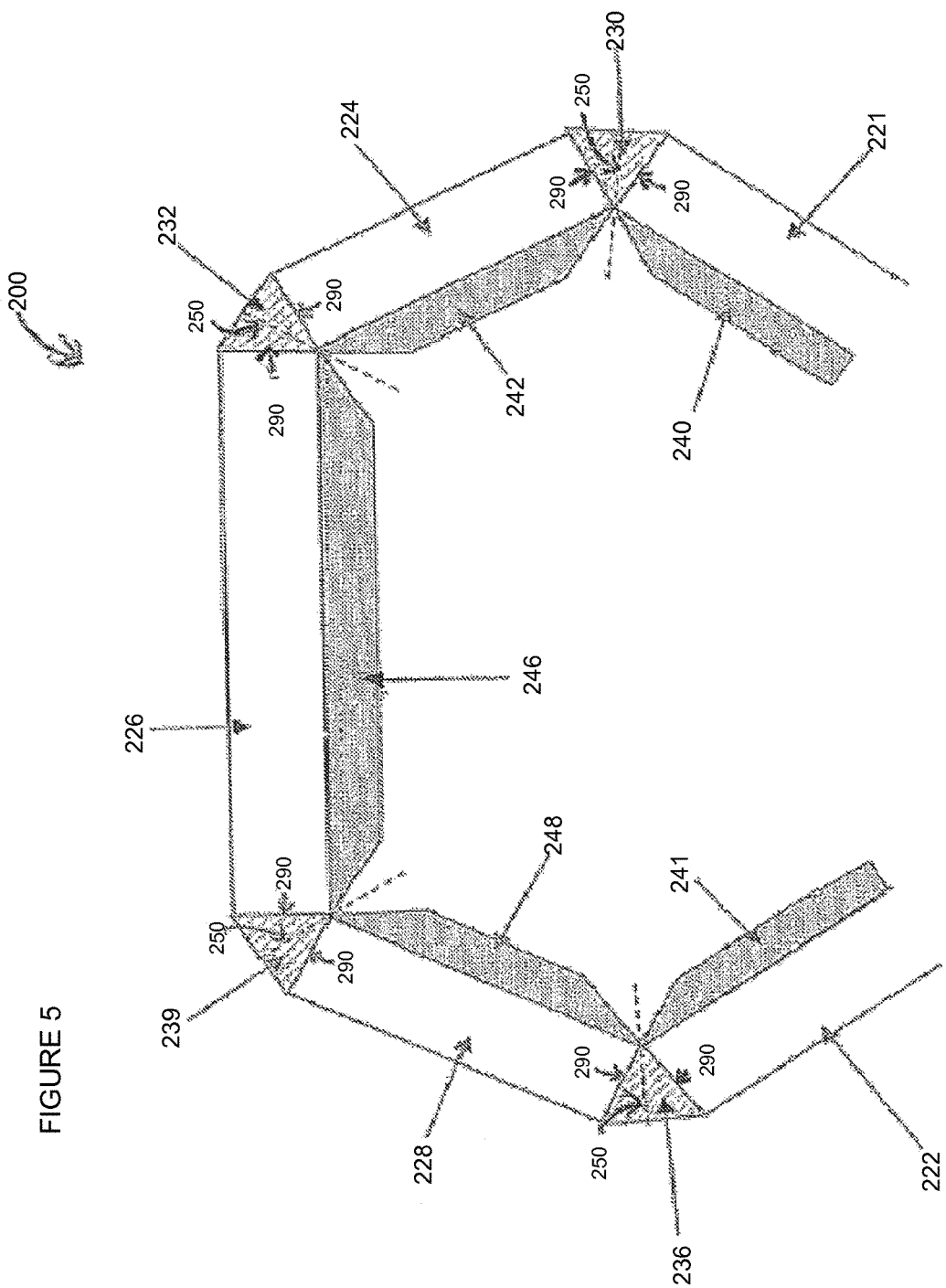
FIG. 5 shows the basic die-cut contiguous shape made out of a sheet of single or double-ply paper that becomes the basis of the adapter piece with all the appropriate folds.

In a further aspect, the upper portion 120 of the bag 100 (including the upper side sections, insert sections, and the connector sections) is preferably cut from a single piece of flat material. In particular, a die or other cutting technique may be used to a shape from a single piece of flat material that can manipulated to create the funnel-shaped upper portion 120. FIG. 5 illustrates a single piece of material cut into a shape 200 according to an exemplary embodiment, from which the upper portion 120 may be created. As shown, creases may be made in the shape 200 in order to define rectangular sections 221-228, which are connected by triangular sections 230-236. Further, creases may be made to define trapezoidal sections 240-248 which extend inward from the rectangular sections 221-228. Further, each triangular section 230-236 includes a crease 250 that bisects the equilateral triangle.

Preferably, the flat shape 200 is cut, and the creases are such, that triangular sections 230-236 are equilateral triangles. As shown, when the rectangular sections 221-228 are connected by equilateral triangles, the inner edges of rectangular sections 221-228 form a hexagonally-shaped inner wall. More specifically, as there are five rectangular sections 221-228, the inner wall defines five sides of a hexagon, with the sixth side (opposite rectangular section 246) being open. Furthermore, since the triangular sections 230-236 are equilateral, the hexagonal shape is be symmetrical; i.e. the inner edge of rectangular section 222 is of the same length and parallel to the inner edge of rectangular section 224, the inner edge of rectangular section 221 is of the same length and parallel to the inner edge of rectangular section 228, and the inner edge of rectangular section 226 is of the same length and parallel to the open side of the hexagon.

It should be understood, however, that triangular sections 230-236 may not be equilateral triangles. For example, the triangular sections may be isosceles triangles, in order to provide may provide a wider or narrower opening, depending on the form of the isosceles triangle. In particular, if the two equal angles of the isosceles triangle are less than sixty degrees, then the opening will be larger than if the triangular sections are equilateral, and if the two equal angles of the isosceles triangle are greater than sixty degrees, then the opening will be smaller than if the triangular sections are equilateral. Further, in embodiments where the triangular sections are not equilateral, the inner wall of the flat shape may still be hexagonal, albeit not symmetrical. For example, if the triangular sections are isosceles triangles, and if the two equal angles of the isosceles triangle are less than sixty degrees, then the inner edge of rectangular section 226 may be shorter than the opening in the inner wall that is opposite and parallel to it. Other examples are also possible.

Figure 6:
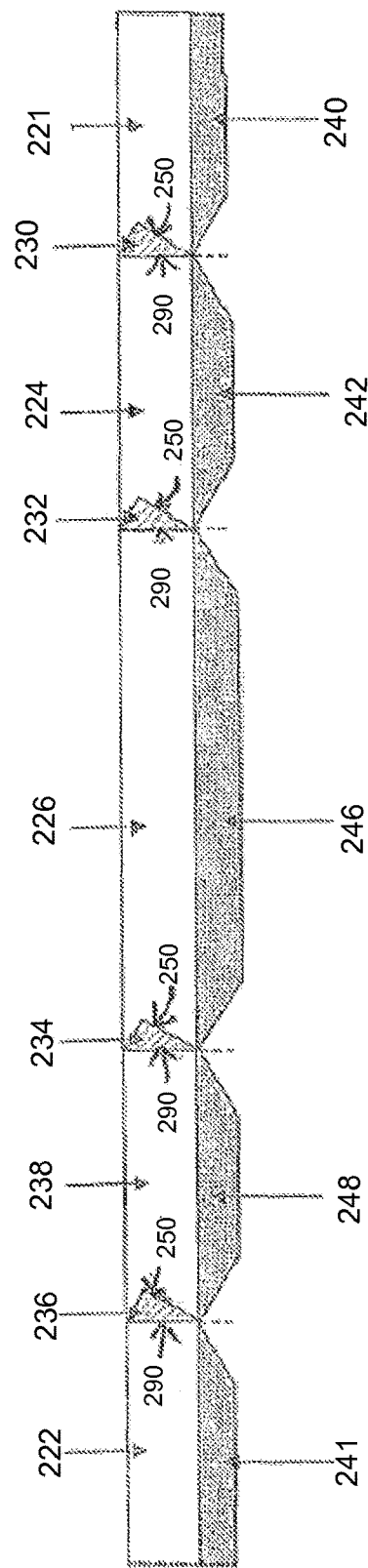
FIG. 6 shows the creation of a linear adapter piece out of the original die-cut shape shown in FIG. 5.
Figure 7A:
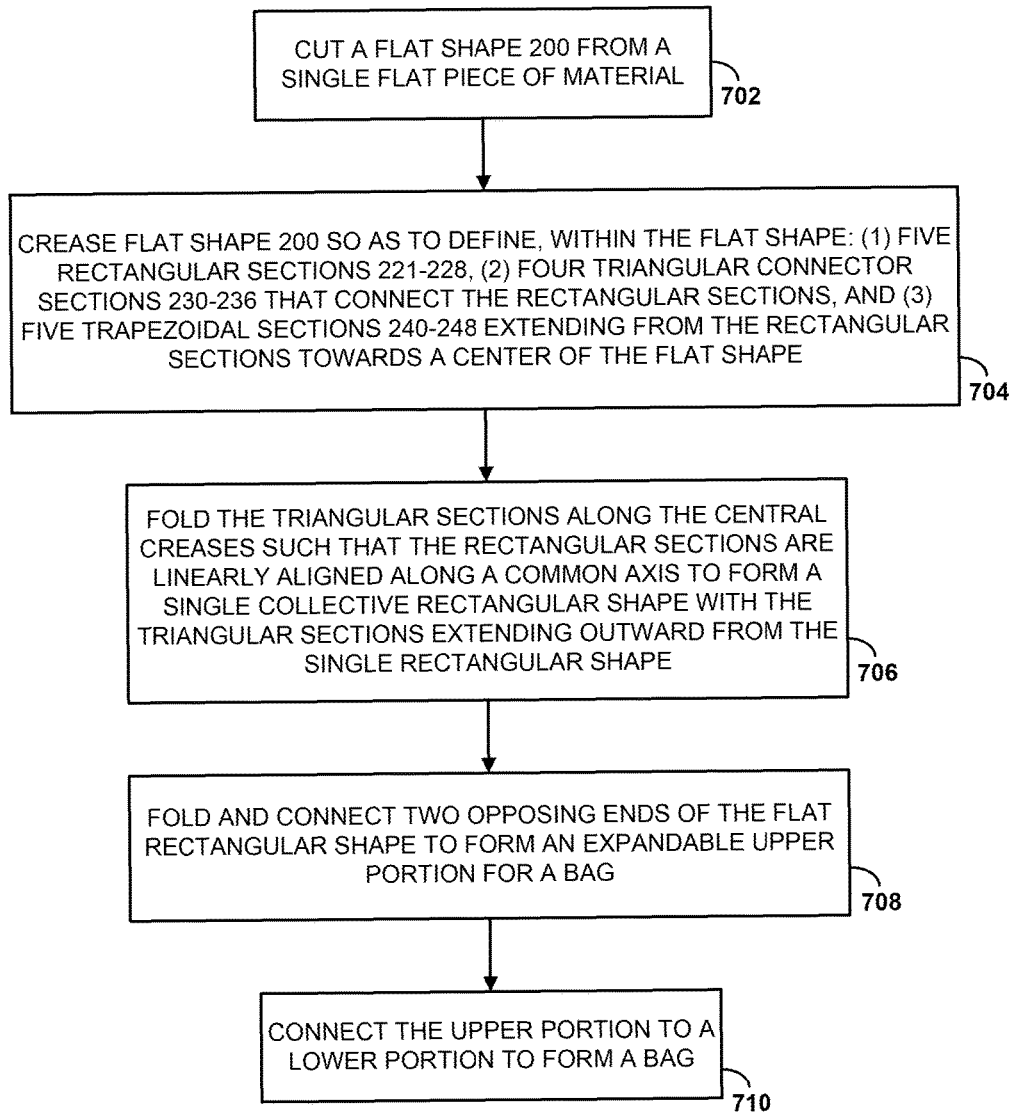
FIG. 7A is a flow chart illustrating a method for manufacturing a bag, according to an exemplary embodiment.

FIG. 7A is a flow chart illustrating a method for manufacturing a bag, according to an exemplary embodiment. As shown, the method involves cutting a flat shape (such as the shape shown in FIG. 5), from a single flat piece of material 200, as shown by block 702. The flat shape is then creased so as to define, within the flat shape: (1) five rectangular sections (e.g. sections 221-228), (2) four triangular connector sections that connect the rectangular sections (e.g., sections 230-236), and (3) five trapezoidal sections extending from the rectangular sections towards a center of the flat shape (e.g., sections 240-248), as shown in step 704. Preferably, each triangular section comprises a central crease dividing the triangular section and allowing the triangular section to be folded upon itself. Accordingly, as shown in step 706, the method further involves folding the triangular sections along the central creases such that the rectangular sections are linearly aligned along a common axis to form a single collective rectangular shape with the triangular sections extending outward from the single rectangular shape (e.g., as shown in FIG. 6). As shown by step 708, once triangular connector sections 230-236 have been folded so that a shape such as that shown in FIG. 6 is formed, the method involves folding and connecting two opposing ends of the flat rectangular shape (e.g., the end of the shape defined by sections 222 and 241, and the end of the shape defined by sections 221 and 240), such that the shape forms an expandable upper portion of the bag as described herein. This upper portion may then be connected to a lower portion to form the bag, as shown by block 710.

More specifically, in order that the piece of material 200 having the shape shown in FIG. 5 be formed into an upper portion 120, which is expandable to provide a funnel-shaped opening, the following may be performed. First, the triangular sections 230-236 may be folded inward along creases 250, such that rectangular sections 221-228 are linearly aligned along a common axis, as shown in FIG. 6. The shape 200 may then be folded at right angles along the creases 290, and rectangle 221 may be connected to rectangle 222 to form a single rectangle of the same dimensions as rectangle 226. By so doing, shape 200 is now arranged as upper portion 120. Specifically, rectangles 222-226 are arranged to serve as upper side sections 122-128 in upper portion 120, and the single rectangle formed by rectangles 221 and 222 is arranged to serve as upper side section 122. Further, the trapezoidal sections 240-246 are arranged to serve as insert sections 140-146, and the triangular sections 230-236 are arranged to serve as connector sections 130-136. Additionally, creases 250 and 290 allow the triangular sections to expand to define a funnel-shaped cavity, and fold inward to define a rectangular cavity.

In the manufacturing of an upper portion from a single piece of material, it should be understood that once rectangles 221 and 222 connected to form an upper side section, the upper side section is preferably of the same dimensions as rectangle 226, which serves as the opposing upper side section of the upper portion of the bag. However, the combined width of rectangles 221 and 222 is preferably greater than the length of rectangle 226, so that rectangles 221 and 222 can be overlapped in order that the rectangles be adhered to each other to form an upper side section. Further, it should be understood that the widths of rectangles 221 and 222 may vary, so long as rectangles 221 and 222 can be connected to form an upper side wall having the same dimensions as rectangle 226. Further, it is possible that rectangles 221 and 222 may be replaced by a single rectangular section that can be connected to a triangular section in order to form the upper portion of the bag.

Figure 7B:
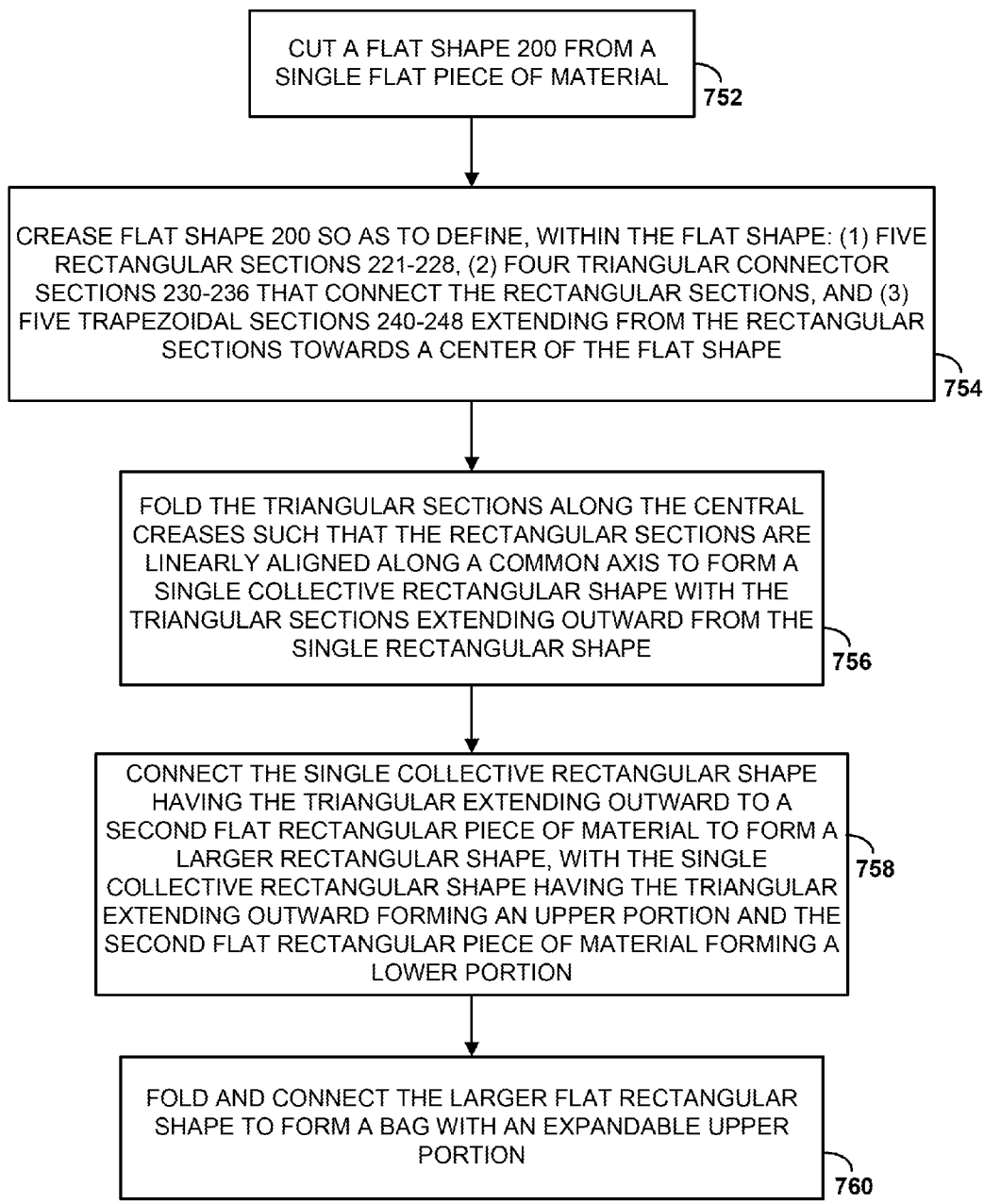
FIG. 7B is a flow chart illustrating another method for manufacturing a bag, according to an exemplary embodiment.
Figure 7C:
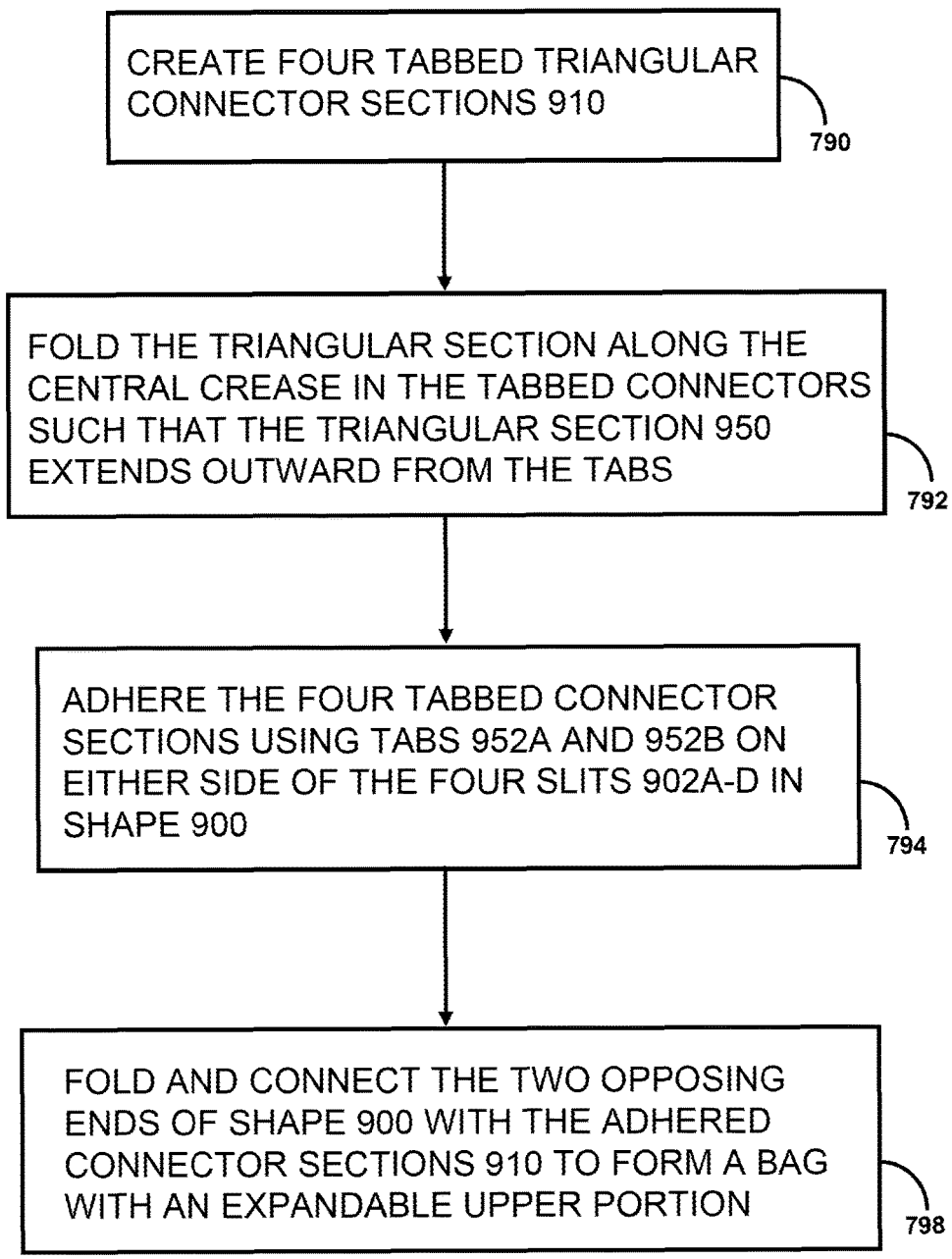

FIG. 7B is a flow chart illustrating another method for manufacturing a bag, according to an exemplary embodiment. In FIG. 7B, steps 752-756 are carried out in the same or similar manner as steps 702-706 of FIG. 7A. However, as shown by step 758, the single collective rectangular shape having the triangular extending outward is connected to a second flat rectangular piece of material to form a larger rectangular shape, with the single collective rectangular shape having the triangular extending outward forming an upper portion and the second flat rectangular piece of material forming a lower portion. Then after the upper and lower portion have been connected, the larger rectangular shape is folded and connected to form a bag with an expandable upper portion, as shown by step 760.

FIGS. 8A and 8B show how an upper portion and lower portion of the bag may be connected, before being folded to create a cavity of the bag, using a method such as that shown in FIG. 7B. More specifically, as shown in FIG. 8A, when the single piece of material 200 for the upper portion of the bag is folded as shown in FIG. 6, the trapezoidal sections 241-248 (i.e., insert sections) may be adhered to a second flat piece of material 300. The second flat piece of material 300 may be folded along creases 390A-390D (and possibly along other creases not shown) and adhered along sides 310 and 320 to form the lower portion of the bag. Preferably, the trapezoidal sections 241-248 are adhered such that an edge 292 formed by the rectangular sections 221-226 is substantially flush against an upper edge 392 of the piece of material 300 for the lower section, and such that creases 290A-290D of the upper portion of the bag align with creases 390A-390D of the lower portion, as shown in FIG. 8B. Alternatively, both piece 200 and piece 300 may be folded and adhered so as to form the upper and lower portion of the bag, respectively, before the trapezoidal sections 241-248 are adhered to piece 300.

Figure 9A:
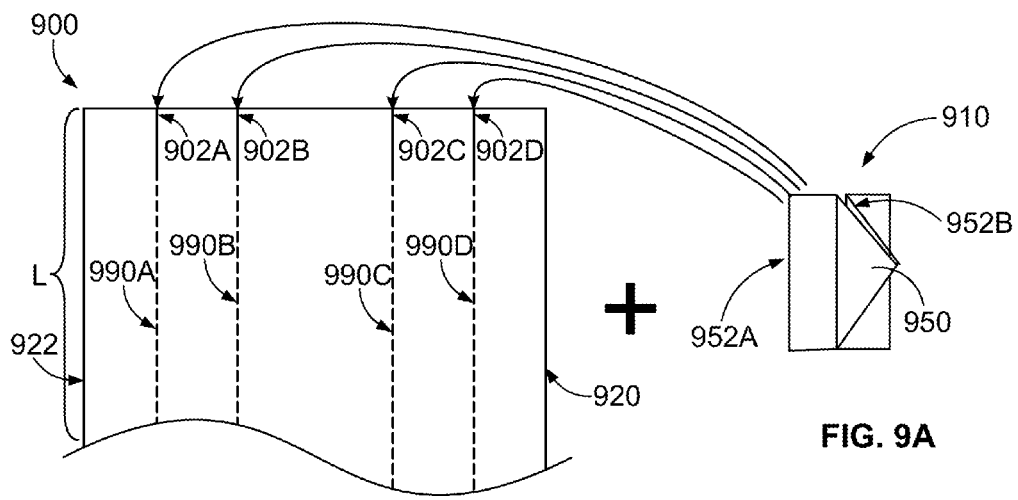
FIGS. 9A and 9B are block diagrams illustrating how an upper portion and lower portion of a bag may be connected, before being folded to create a cavity of the bag, according to another exemplary manufacturing method.
Figure 9B:
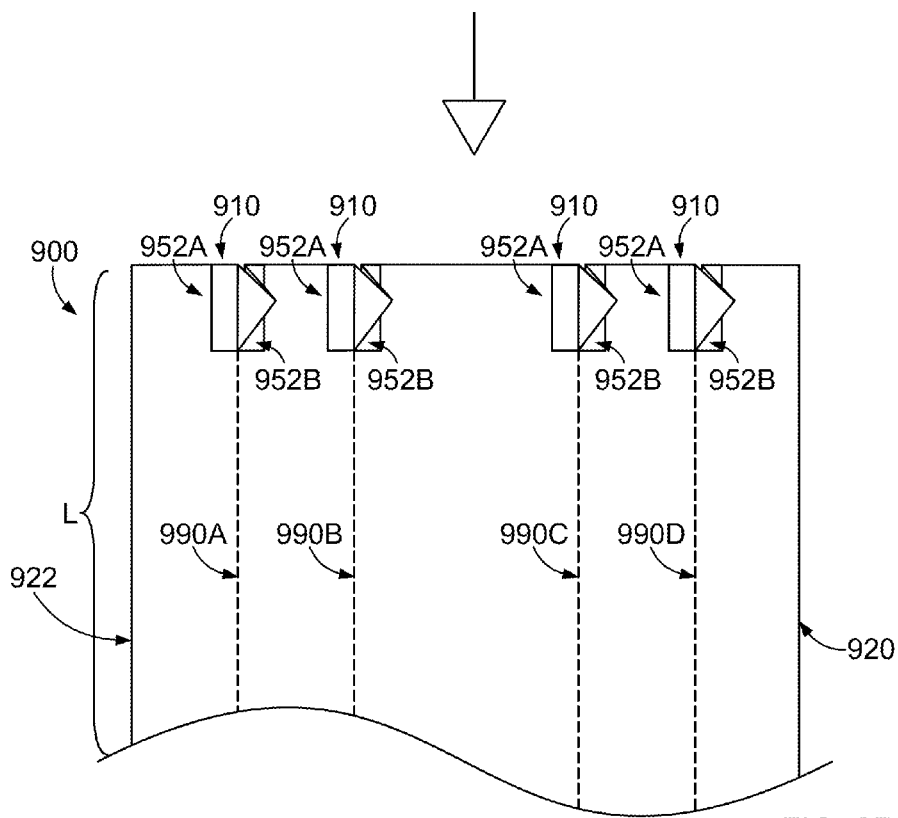

In an alternative embodiment, an exemplary paper bag including an upper portion and lower portion that function as described herein, may be formed from one or more pieces of material having the same form as the piece or pieces from which standard bags are formed, with the addition of four tabbed connector pieces. In particular, as shown in FIG. 9A, four slits 902A-D may be cut in a piece of flat material 900. Further, four tabbed connector sections 910 may be created. Each tabbed connector section 910 includes a foldable triangular connector 950 as described herein and two tabs 952A and 952B extending from the triangular connector section 950. The four tabbed connector sections 910 may then be inserted in slits 902A-D, and tabs 952A and 952B adhered to piece 900, as shown in FIG. 9B. The piece 900 may then be folded along creases 990A-990D (and possibly along other creases not shown) and adhered along sides 910 and 920 to form the bag such that when the foldable triangular connectors 950 are folded, the connectors 950 extend inward to the bag.

In another aspect of the invention, the invention may take the form of an expandable adapter piece, which provides a larger funnel-shaped opening for standard bags. The expandable adapter piece preferably takes the form of the upper portion of a bag as described herein. For example, the adapter piece may take the form of an upper portion of a bag as illustrated in FIGS. 1, 5, and 6, which includes insert sections, such as insert sections 240-248. The insert sections may be inserted along the side walls of a standard bag to connect the adapter piece to the standard bag. The insert sections may additionally or alternatively include other means for connecting the adapter piece to the standard bag. For instance, the insert sections may include adhesive for adhering the connector sections to the standard bag. Other variations for connecting the adapter piece to a standard bag are also possible.

Figure 10A:
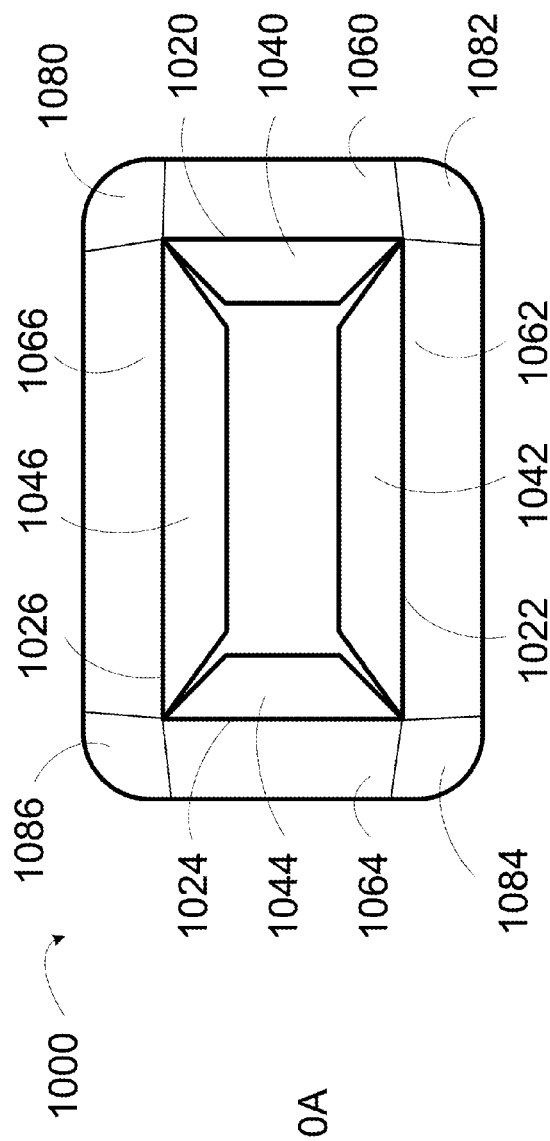
FIG. 10A shows a top-down view of an exemplary adapter piece before it is expanded.
Figure 10B:
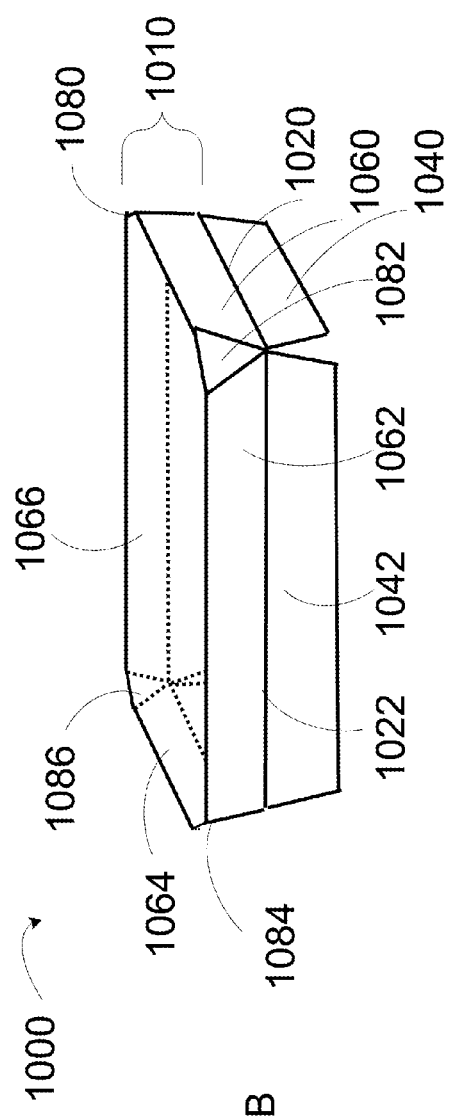
FIG. 10B shows an exemplary adapter piece in an expanded state.

FIGS. 10A and 10B depict an adapter piece 1000 according to an exemplary embodiment. FIG. 10A is a top-down view of the adapter piece 1000 before it is expanded, while FIG. 10B depicts the adapter piece 1000 after it is expanded. The adapter piece 1000 includes a plurality of creases 1020-1026, a plurality of insert sections 1040-1046, a plurality of upper side sections 1060-1066, and a plurality of connector sections 1080-1086.

In the present embodiment, the adapter piece 1000 may be made of a flexible material which does not degrade when exposed to water. Further, the adapter piece 1000 may be washable and/or otherwise reusable. In other embodiments, the adapter piece 1000 may be made of a flexible material or a washable, water-proof material. Other materials such as paper or cardboard, which may or may not be degradable, are also possible.

Further, the adapter piece 1000 may be made out of a single piece of material which is cut, folded, and/or adhered to itself to form the shape that includes insert sections 1040-1046, upper side sections 1060-1066, and connector sections 1080-1086 It is also possible that the adapter piece 1000 may be made out multiple pieces of material. For example, each insert section 1040-1046, each side section 1060-1066, and/or each connector section 1080-1086 could be a separate piece of material, and the separate pieces could be glued or otherwise attached to form the adapter piece 1000.

In the illustrated embodiment, the plurality of connector sections 1080-1086 are between the plurality of upper side sections 1060-1066. For example, the connector section 1082 is between the upper side section 1060 to the upper side section 1062. The plurality of insert sections 1040-1046 are connected to the plurality of upper side sections 1060-1066 at the plurality of creases 1020-1026. For example, the insert section 1040 is connected to the upper side section 1060 at the crease 1020.

In the illustrated configuration, the adapter piece 1000 includes a cavity 1010. The cavity 1010 includes a lower opening, defined by the plurality of creases, and an upper opening, defined by the outer edge of the expanded plurality of upper side sections 1060-1066 connected by the plurality of connector sections 1080-1086. In the illustrated embodiment, the lower opening may be of approximately the same size as the opening at the upper end of a bag for which the adapter piece is intended.

When the adapter piece 1000 is expanded, the upper opening is larger than the lower opening, as depicted in FIG. 10B. More specifically, as shown in FIG. 10B, the plurality of insert sections (only insert sections 1040 and 1042 are shown) are directed downwards at the plurality of creases (only creases 1020 and 1022 are shown), thereby defining a lower portion that can be inserted into or placed around an upper opening of a bag. The plurality of upper side sections 1060-1066 connected by the plurality of connector sections 1080-1086, which defines the cavity 1010, are folded upwards at the plurality of creases 1020-1026, away from the plurality of insert sections 1040-1046. As such, insert sections 1042 to 1046 may be inserted into a bag (e.g., a paper lawn bag), in order to provide an expandable opening via which contents may be placed into the bag (e.g., lawn waste).

FIG. 11A shows another adapter piece 1100, according to an exemplary embodiment. In particular, the adapter piece 1100 includes a plurality of horizontal-restraining straps and a plurality of side fasteners. FIGS. 11B and 11C depict a side fastener 1120. FIG. 11B shows a front view of the side fastener 1120, while FIG. 11C shows a side view of the side fastener 1120. The side fastener 1120 includes an upper piece 1130 and a lower piece 1140. The upper piece 1130 is defined by an upper edge 1132 and a lower edge 1134. In the present embodiment, the upper piece 1130 may be shaped in a trapezoidal manner such that the upper edge 1132 is wider than the lower edge 1134. In other embodiments, the upper piece may be shaped in other shapes without departing from the present invention.

The upper piece 1130 is connected to the lower piece 1140 at an angle 1150 at the lower edge 1134. The angle 1150 may be an acute angle, as in the illustrated example. In an exemplary embodiment, the angle 1150 may be, 30 degrees, for example. In other exemplary embodiments the angle between the upper piece 1130 and the lower piece 1140 may be 45 degrees or 60 degrees. Further, it should be understood that other angles are possible, without departing from the scope of the invention.

Each of the plurality of upper side sections (only upper side sections 1060 and 1062 are shown) may include at least one horizontal-restraining strap, which is configured to receive one of the plurality of side fasteners. In the illustrated embodiment, the ends of horizontal-restraining straps 1102-1108 are attached to the side section 1062 in such a manner that the middle of each restraining strap can be pulled away from the side section to which it is attached to create a gap between the horizontal-restraining strap and the upper side section. A side fastener, such as side fasteners 1120 and 1122, may then be inserted between each restraining straps 1102-1108 and the side section to which it is attached. Similarly, the ends of horizontal-restraining strap 1110 are attached to the upper side section 1060 in such a manner that an air gap is possible in between the middle of horizontal-restraining strap 1110 and upper side section 1060, such that the side fastener 1124 may be inserted.

When a side fastener 1120 is inserted into a horizontal-restraining strap (e.g., horizontal-restraining strap 1102-1110), the side fastener 1120 may provide structural rigidity to the adapter piece 1100. For example, the side fastener 1120 is shaped and sized with a decreasing width, such that the bottom of the side fastener is narrower than the gaps between the horizontal-restraining straps 1102 and 1104 and the side section, and the top of the side fastener 120 is wider than the gaps. As such, when the side fastener 120 is inserted into these gaps, the horizontal-restraining straps 102 and 104 may support the side fastener 1120, and thus may hold the side fastener between the straps and the upper side section 1062 in a substantially stationary position. The side fastener 1120 may be said to held in a substantially stationary position in that minor fluctuations of its position are possible. In this configuration, the side fastener 1120 may be said to be "removably connected" to the adapter piece 1100.

In practice, the lower piece 1140 may be inserted first into the horizontal-restraining strap 1102 and then into the horizontal-restraining strap 1104. Next, the upper piece 1130 first engages the horizontal-restraining strap 1104 and then the horizontal-restraining strap 1102. As noted, the shape of the horizontal-restraining straps 1102 and 1104 together with the width of the upper piece 1130 cause the upper piece 1130 to become removably connected with the horizontal-restraining straps 1102 and 1104 and the upper side section 1062. This configuration helps to prevent external forces, such as wind or gravity, from pulling the side fastener 1120 downwards and out of horizontal-restraining straps 1102 and 1104.

Figure 11E:
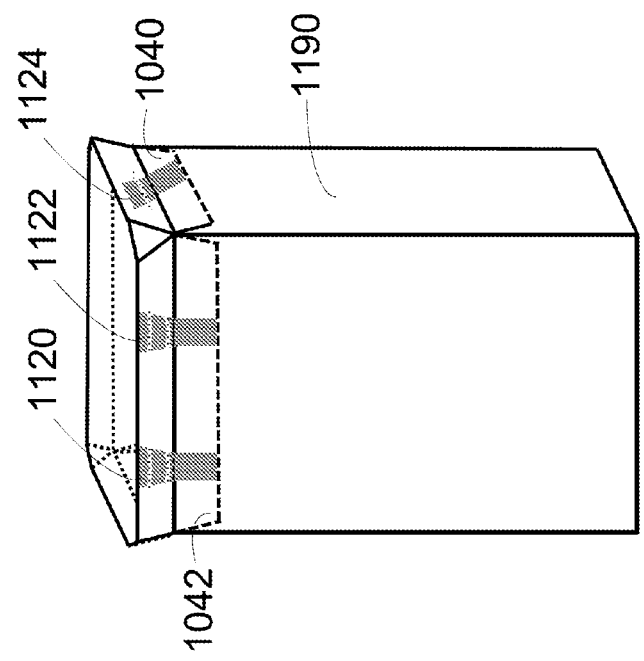
FIGS. 11D and 11E show an exemplary adapter piece before and after the adapter piece is attached to a bag.
Figure 11D:
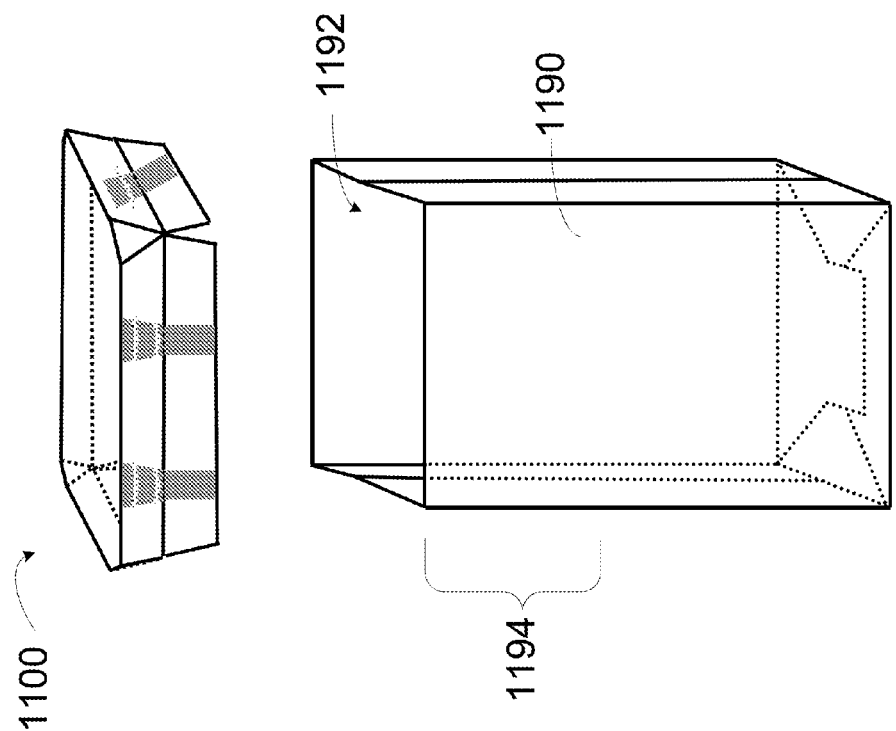

FIGS. 11D and 11E depict the adapter piece 1100 before and after it is attached to a bag 1190, according to an exemplary embodiment. The bag 1190 includes an opening 1192 at an upper end 1194. In the present embodiment, the bag 1190 may be a free-standing bag for lawn clippings. The adapter piece 1100 is inserted into the opening 1192, such that the plurality of insert sections (only insert sections 1040 and 1042 are depicted) are located on the inside of the bag 1190, while the plurality of side fasteners (only side fasteners 1120-1124 are shown) are located on the outside of the bag 1190 at the upper end 1194. The plurality of side fasteners may act as clamps, which attach the bag 1190 to the plurality of insert sections. That is, the bag 1190 may be placed between the plurality of side fasteners and the plurality of insert sections, thereby removably attaching the adapter piece 1100 to the bag 1190.

FIG. 11A shows an exemplary arrangement of horizontal-restraining straps. However, other arrangements and combinations are also possible. For example, while FIG. 11A depicts the upper side section 1062 including horizontal-restraining straps 1102-1108, in another embodiment, the upper side section 1062 includes only horizontal-restraining straps 1102 and 1106. In yet another embodiment, the upper side section 1062 includes only one horizontal-restraining strap located in the middle of the upper side section 1062. Other variations and different configurations of restraining straps are possible as well.

Figure 12A:
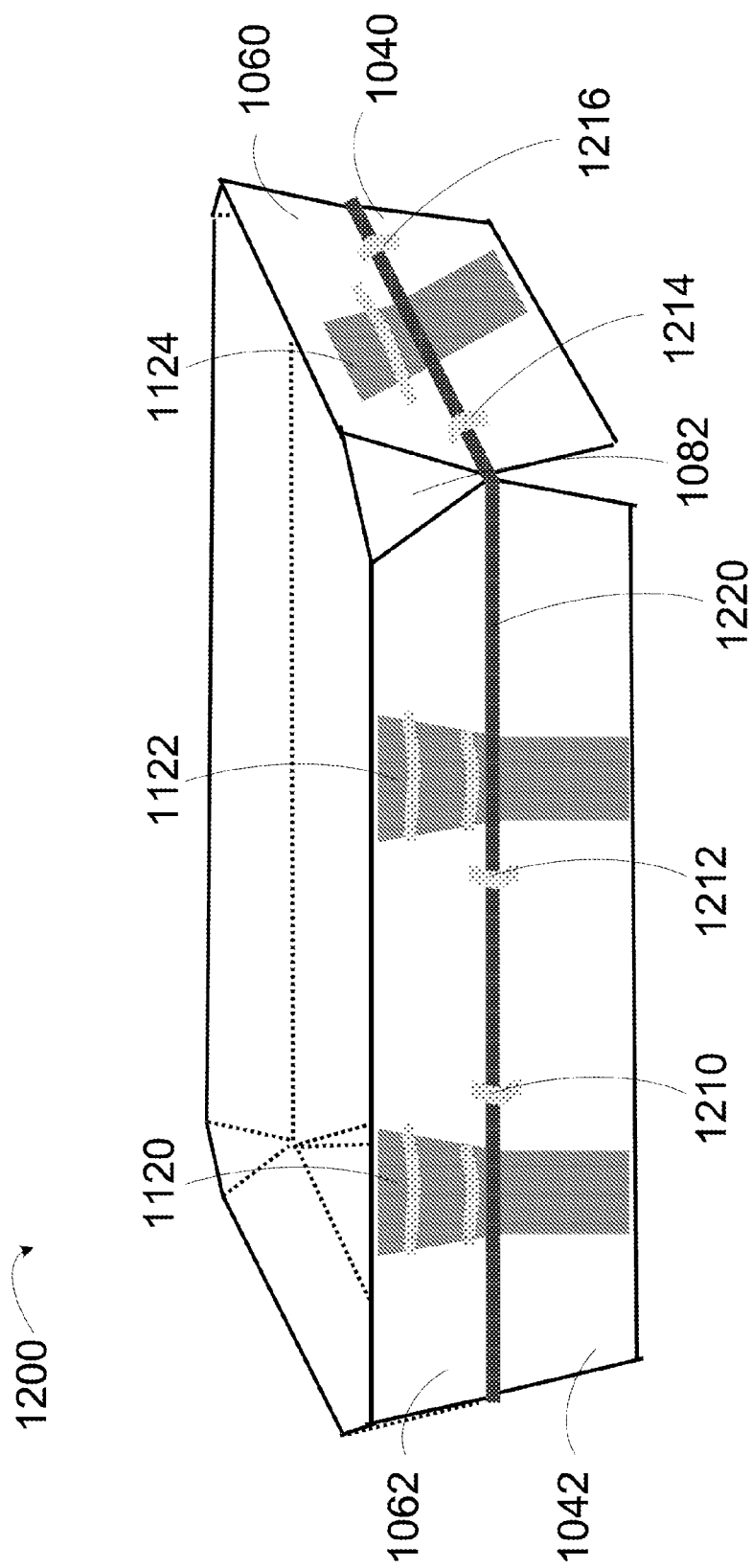
FIG. 12A shows an exemplary adapter piece including a plurality of side fasteners and an expandable frame.

FIG. 12A shows another adapter piece 1200, according to an exemplary embodiment. In particular, the adapter piece 1200 includes a plurality of vertical-restraining straps and an expandable frame 1220. The expandable frame 1220 provides structural rigidity to the adapter piece 1200. FIGS. 12B-C depict the expandable frame 1220 in more detail. The expandable frame 1220 includes a plurality of frame connector pieces 1230 and a plurality of frame pieces 1240. In the present embodiment, each frame connector piece 1230 is rounded through an arc of ninety degrees and includes two receiving ends 1232. In other embodiments, the frame connector pieces may be straight and include multiple straight sections so as to connect the frame pieces at 90 degrees (or at another angle) to each other. In the present embodiment, the receiving ends 1232 may be both hollow and open. In other embodiments, the receiving ends 1232 may be filled and closed. Each frame piece 1240 includes a receiving section 1250 and an expansion section 1260. The receiving section 1250 includes a connection end 1252 and an insertion end 1254; the insertion end 1254 may be both hollow and open. The expansion section 1260 includes a base portion 1262, which includes a juncture end 1264 and a telescoping end 1266, and a telescoping portion 1270. The cross section of the telescoping portion 1270 is smaller than the cross sections of both the base portion 1262 and the insertion end 1254. In other embodiments, the frame connector pieces 1230 may have a squared-off edge, rather than the illustrated rounded edge. It should be understood that other shapes are possible, without departing from the scope of the invention. Likewise, in other embodiments, the frame pieces 1240 may have a rectangular, a square-like, a hexagonal, or a pyramidal cross-section as opposed to the illustrated circular cross-section. It should be understood that other cross-sections are possible, without departing from the scope of the invention.

The plurality of vertical-restraining straps are attached to the adapter piece 1100. In the present embodiment, each of the plurality of upper sides sections (only upper side sections 1060 and 1062 are shown) and each of the plurality of insert sections (only insert sections 1040 and 1042 are shown) include an end of at least one vertical-restraining strap. For example, referring to FIG. 12, one end of both vertical-restraining straps 1210 and 1212 is attached to the upper side section 1062 and the other end of both vertical-restraining straps 1210 and 1212 is attached to the insert section 1042. In other embodiments, the plurality of vertical-restraining straps can be attached only to the plurality of upper side sections or only to the plurality of insert sections.

Referring to FIG. 12B, the telescoping portion 1270 is connected to the base portion 1262 at the telescoping end 1266. The telescoping portion 1270 is inserted into the receiving section 1250 at the insertion end 1254. Thus, the expansion section 1260 is connected to the receiving section 1250, thereby creating one of the plurality of frame pieces 1240 whose length is expandable up to the length of the telescoping portion 1270. A first frame piece is connected to a second frame piece using one of the plurality of frame connector pieces 1230. The connection end 1252 of the first frame piece is inserted into one of the two receiving ends 1232. Similarly, the juncture end of the second frame piece is inserted into the second of the two receiving ends 1232. Similarly, a third and fourth frame piece are connected to the first and second frame pieces, thereby creating the expandable frame 1220. It should be understood that the expandable frame 1220 may be in any shape, such as a hexagon or a triangle, without departing from the scope of the invention.

Referring to FIG. 12, the expandable frame 1220 is attached to the adapter piece 1200 using the plurality of vertical-restraining straps. The plurality of frame pieces are inserted into the plurality of vertical-restraining straps, for example, vertical-restraining straps 1210-1216. In the present embodiment, the dimensions of the expandable frame 1220 may be approximately equal to the dimensions of the lower opening of the cavity 1010. The expandable frame 1220 is attached to the adapter piece 1200, such that plurality of side fasteners, for example, side fasteners 1120-1124, are located between the adapter piece 1200 and the expandable frame 1220.

Figure 12D:
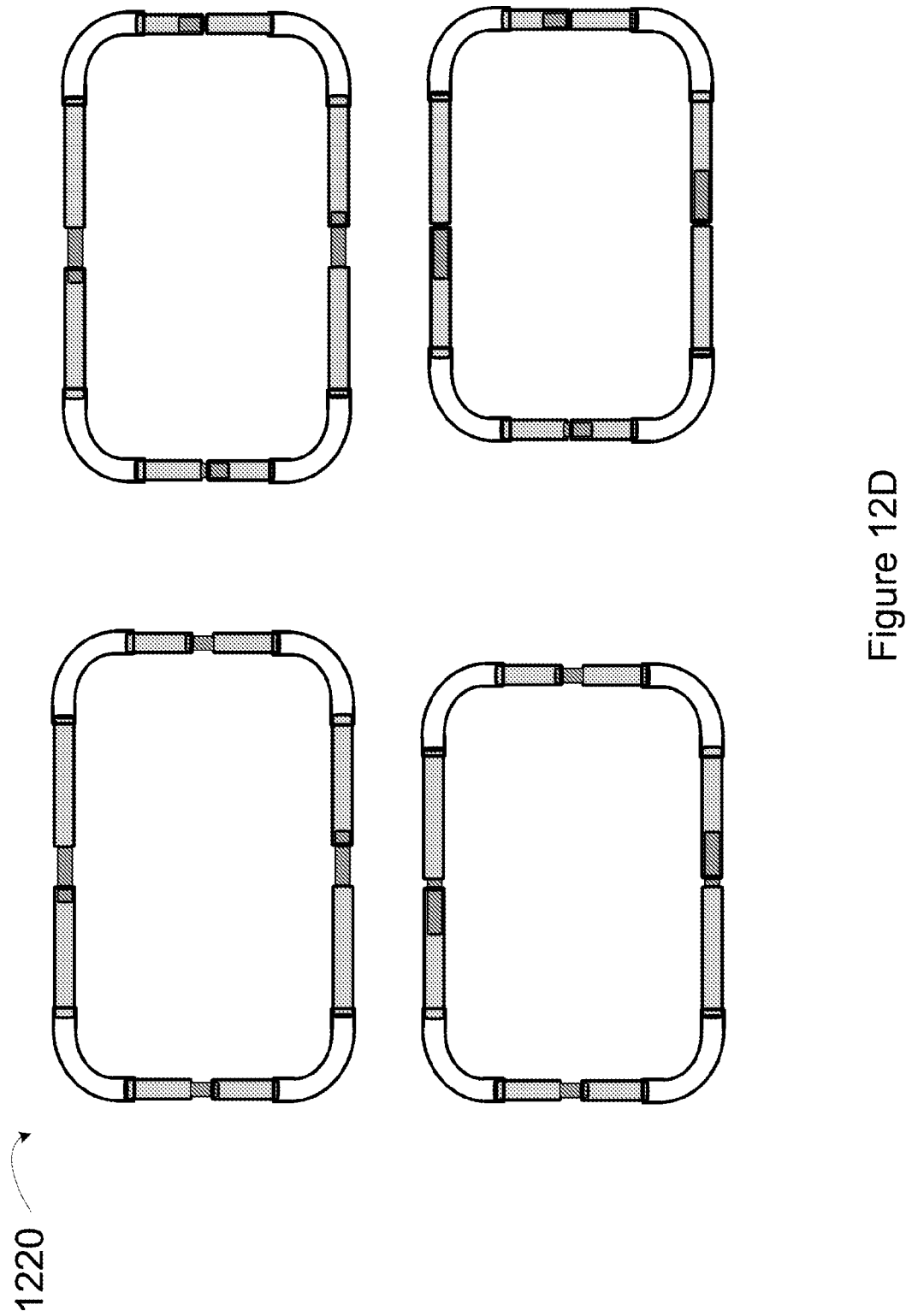
FIG. 12D shows a variety of exemplary configurations of an exemplary expandable frame.

In operation, the length of each frame piece 1240 is expandable up to the length of the telescoping portion 1270. FIG. 12C depicts a frame piece 1240 in an expanded configuration. In one embodiment, the frame pieces 1240 may be expanded by applying longitudinal forces in opposite directions against the receiving section 1250 and the expansion section 1260. In another embodiment, the frame pieces 1240 may be expanded by applying a longitudinal force against the receiving section 1250 in a direction away from the expansion section 1260. In other embodiments, the frame pieces 1240 may be expanded by applying a longitudinal force against the expansion section 1260 in a direction away from the receiving section 1250. Consequently, as depicted in FIG. 12D, the size of the expandable frame 1220 can be expanded or contracted in response to fluctuations in the size of the lower opening of the upper cavity 1010. It should be understood that other configurations are possible, without departing from the scope of the invention.

FIGS. 12E and 12F show an embodiment of the frame connector piece 1230 and the frame piece 1240, according to an exemplary embodiment. In particular, the frame connector piece 1230 further includes at least one L-shaped key slot at each of the two receiving ends 1232, and the frame piece 1240 further includes at least one lock key at the connection end 1252 and at least a second lock key at the juncture end (not shown in FIG. 12E or 12F). In the present embodiment, the frame connector piece 1230 includes two L-shaped key slots at each of the two receiving ends 1232 (only one L-shaped key slot 1280 is shown in FIG. 12E at each of the two receiving ends 1232), and the frame piece 1240 includes two lock keys at both the connection end 1252 and the juncture end 1264 (only one lock key 1282 at the connection end 1252 is shown in FIG. 12E). FIG. 12F depicts a top-down view of the connection end 1252 including two lock keys 1282. It should be appreciated that the juncture end 1264 is configured in a similar manner as the depicted connection end 1252.

The at least one L-shaped key slot is cut out of the receiving end 1232, for example, as the L-shaped key slot 1280 is depicted in FIG. 12E. The at least one lock key is connected to the frame piece 1240 at the connection end 1252, and the at least second lock key is connected to the frame piece 1240 at the juncture end.

In practice, as shown in FIG. 12E, the frame piece 1240 may be inserted into the frame connector piece 1230 when the two lock keys (only one lock key 1282 is shown) are aligned with the two L-shaped key slots at the receiving end 1232 (only one L-shaped key slot 1280 is shown). The frame piece 1240 is then twisted or otherwise turned, such that the two lock keys 1282 removably connect the frame piece 1240 to the frame connector piece 1230.

In other embodiments, the plurality of frame connector pieces 1230 further include internal threading located at the two receiving ends 1232, and the plurality of frame pieces 1240 further include external threading located at the connection end 1252 and the juncture end 1264, such that a frame piece is connected to a frame connector piece by twisting the frame piece into the internal threading of a receiving end. The internal threading may be comparable to the internal threading of a standard threaded nut, while the external threading may be comparable to the external threading of a standard threaded bolt. The connection of the frame piece to a frame connector piece may be comparable to a standard threaded bolt being screwed into a standard threaded nut.

In yet other embodiments, the plurality of frame connector pieces 1230 further include external threading located at the two receiving ends 1232, and the plurality of frame pieces 1240 further include internal threading located at the connection end 1252 and the juncture end 1264, such that a frame piece is connected to a frame connector piece by twisting the frame piece onto the external threading of a receiving end. In the present embodiment, the receiving ends 1232 may be solid and closed, as opposed to being hollow and open.

In other embodiments, the plurality of frame pieces 1240 may be connected to the plurality of frame connector pieces 1230 using other fastening mechanisms, without departing from the scope of the invention.

Figure 13A:
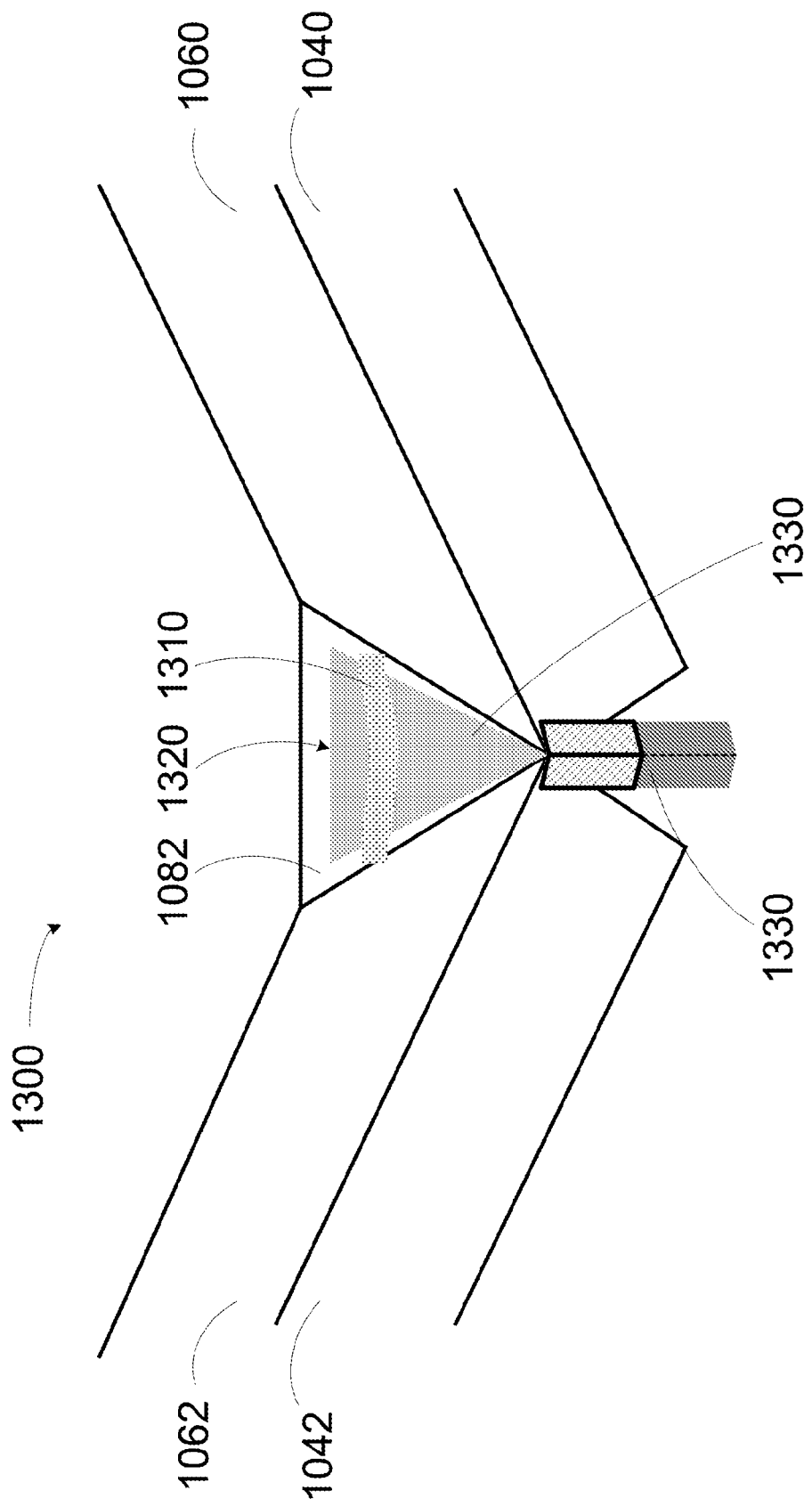
FIG. 13A shows an exemplary adapter piece including an exemplary corner fastener.
Figures 13B, 13C, 13D:
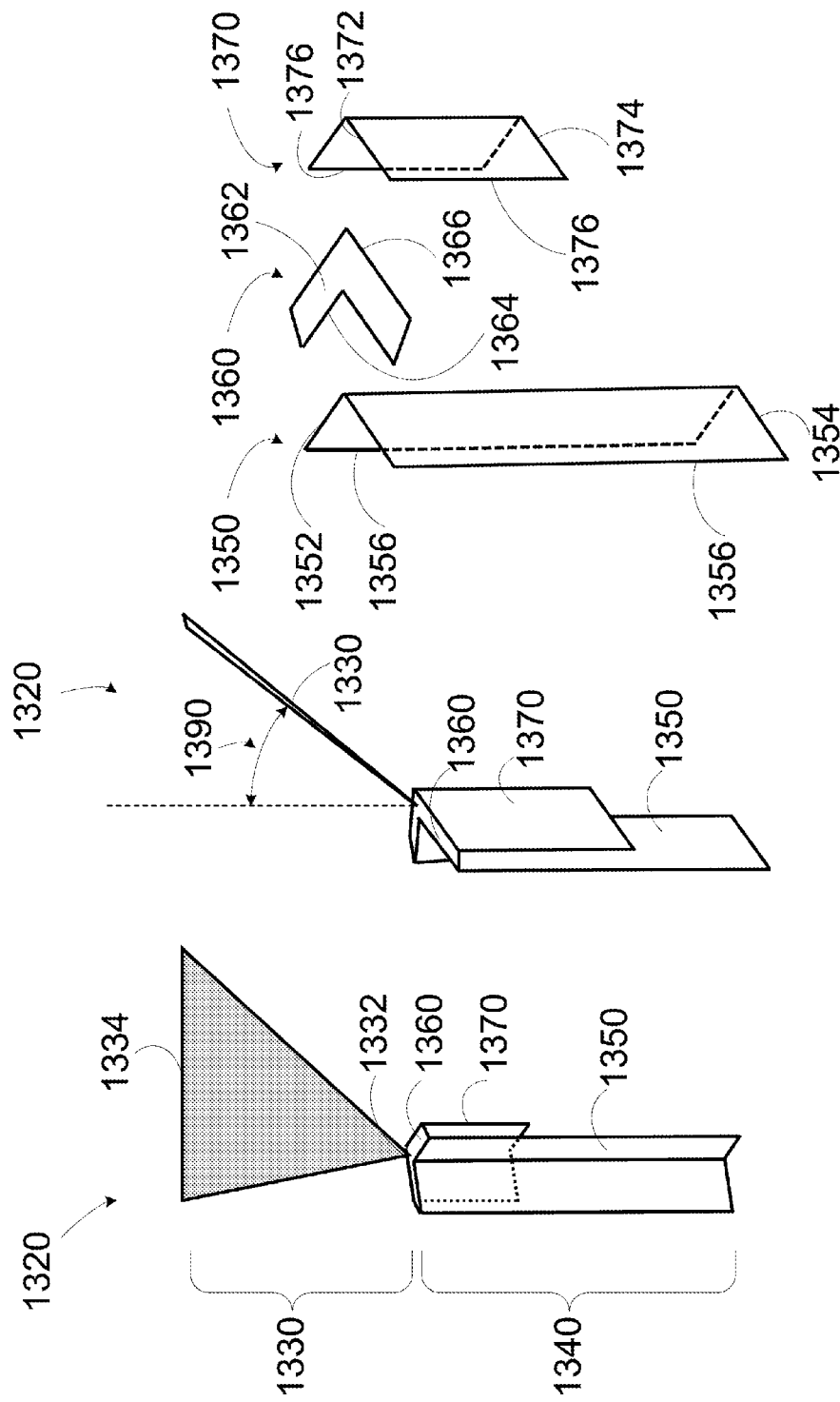
FIG. 13B shows an angular rearview of an exemplary corner fastener.
FIG. 13C shows a side view of an exemplary corner fastener.
FIG. 13D shows a dissection view of an exemplary bracket section.

FIG. 13A shows a corner of an embodiment of an adapter piece 1300, according to an exemplary embodiment. In particular, the adapter 1300 includes a plurality of corner-restraining straps and a plurality of corner fasteners. FIGS. 13B and 13C depict a corner fastener 1320. FIG. 13B shows an angled rearview of the corner fastener 1320, while FIG. 13C shows a side view of the corner fastener 1320. As shown, the corner fastener 1320 includes a top section 1330 and a bracket section 1340. The top section 1330 is defined by a point edge 1332 and a base edge 1334. The top section 1330 may be shaped in a pyramidal manner such that the base edge 1334 is wider than the point edge 1332. In other embodiments, the top section 1330 may be shaped in a half-circular manner or any other shape in which one edge is wider than a second edge. FIG. 13D depicts the bracket section 1340 in greater detail. The bracket section 1340 may include a base portion 1350, a juncture portion 1360, and a bracket portion 1370. The base portion 1350 is defined by a top edge 1352, a bottom edge 1354, and two long edges 1356. The two long edges 1356 are bent towards one another at a 90 degree angle to form an L-shape. The juncture portion 1360 is defined by a top surface 1362, an inside edge 1364, and an outside edge 1366. The juncture portion 1360 is bent at a 90 degree angle, such that the inside edge 1364 and the outside edge 1366 are L-shaped, where the inside edge L-shape is smaller than the outside edge L-shape. The bracket portion 1370 is defined by a top side 1372, a bottom side 1374, and two long sides 1376. The two long sides 1376 are bent towards one another at a 90 degree angle to form an L-shape.

Referring to FIGS. 13B-C, the juncture portion 1360 is connected to the base portion 1350 at the inside edge 1364 and the top edge 1352, respectively. The juncture portion 1360 is connected to the bracket portion 1370 at the outside edge 1366 and the top side 1372, respectively, thereby creating an air gap between the base portion 1350 and the bracket portion 1370 whose width is equivalent to the width of the top surface 1362. The top section 1330 is attached to the bracket section 1340 at a connection angle 1390 at the point edge 1332 and the juncture portion 1360, respectively. The connection angle 1390 may be an acute angle, as in the illustrated example. For instance, in an exemplary embodiment, the connection angle 1390 may be 30 degrees. In other exemplary embodiments, the connection angle may be 45 or 60 degrees. Further, it should be understood that other angles are possible, without departing from the scope of the invention.

Each of the plurality of connector sections includes at least one corner-restraining strap and each corner-restraining strap is configured to receive one of the plurality of corner fasteners. For example, referring to FIG. 13, a corner-restraining strap 1310 is connected to the connector section 1082. In the current embodiment, the corner-restraining strap 1310 is attached to the connector section 1082 in such a manner that there exists an air gap between the corner-restraining strap 1310 and the connector section 1082 where corner fastener 1320 may be inserted. As shown in FIG. 13, the corner-restraining strap 1310 is attached to the outside of the adapter piece 1330 at the connector section 1082. In another embodiment, the corner-restraining strap 1310 may be attached on the inside of the adapter piece 1300 at the connector section 1082.

In operation, each of the plurality of corner fasteners may be inserted into at least one corner-restraining strap attached to the adapter piece 1300. The plurality of corner fasteners may help to provide structural rigidity to the adapter piece 1300. In the present embodiment, the corner fastener 1320 can be inserted into the corner-restraining strap 1310. The corner-restraining strap 1310 is shaped and sized such that when the corner fastener 1320 is inserted, the corner-restraining strap 1310 temporarily secures the corner fastener 1320 to the connector section 1082 in a substantially stationary position. The corner fastener 1320 is temporarily secure in that it can be removed at any desired time and is in a substantially stationary position in that minor fluctuations in position are possible. That is to say, the corner fastener 1320 is removably connected to the corner-restraining strap 1310 and the connector section 1082.

In practice, the bracket section 1340 is inserted first into the corner-restraining strap 1310. Next, the top section 1330 engages the corner-restraining strap 1310. The shape of the corner-restraining strap 1310, together with the width of the top section 1330, cause the top section 1330 to become removably connected with the corner-restraining strap 1310 and the corner section 1082. External forces, such as wind or gravity, are unable to pull the corner fastener 1320 downwards and out of corner-restraining strap 1310. That is, the corner fastener 1320 is unable to slip through the corner-restraining strap 1310 and thus become detached from the adapter piece 1300.

Figure 13E:
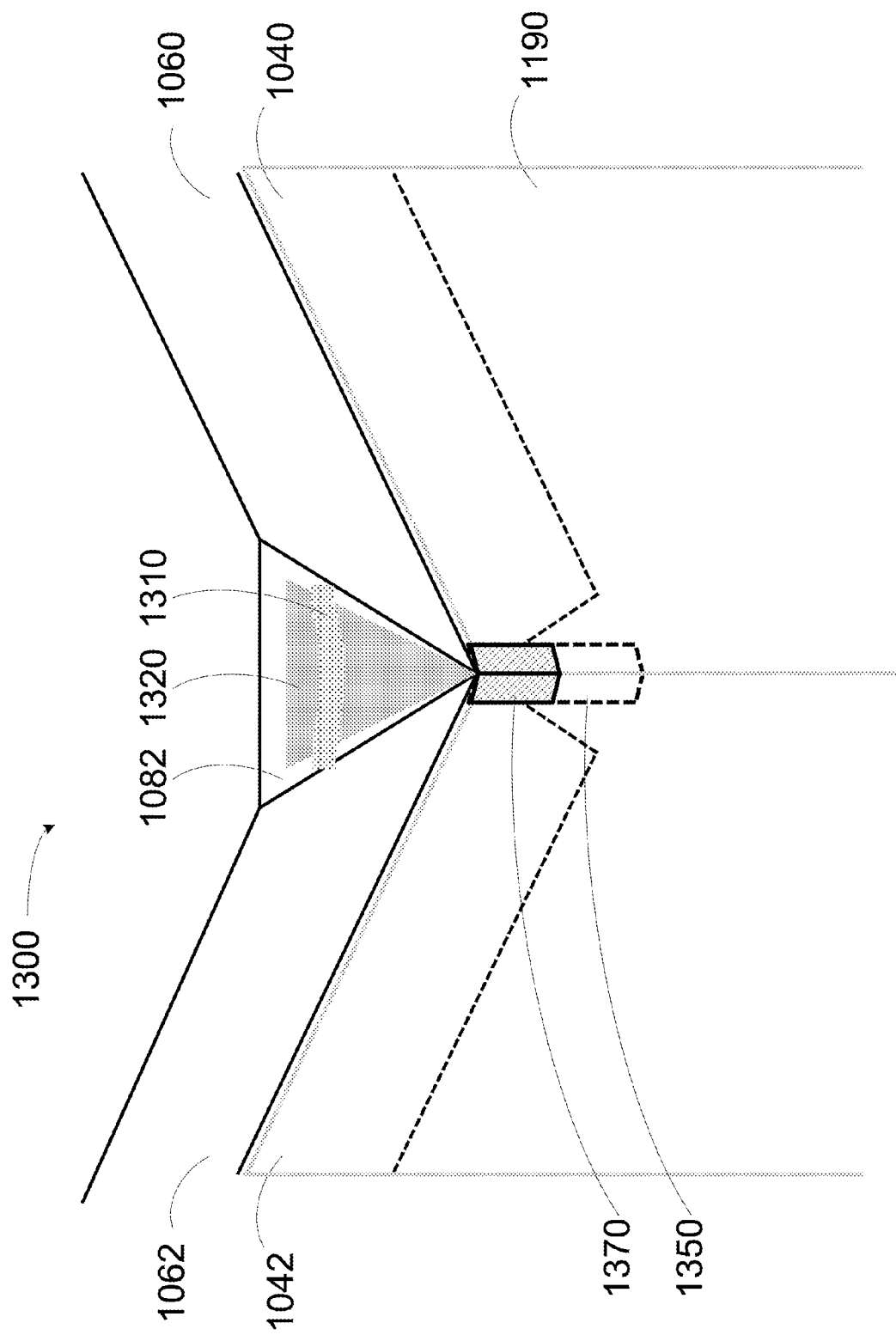
FIG. 13E shows an exemplary adapter piece attached to a bag.

FIG. 13E depicts the adapter piece 1300 attached to the bag 1190. In the present embodiment, the bag 1190 may be a free-standing bag for lawn clippings. The adapter piece 1300 is inserted into the opening of the bag 1190, such that the plurality of insert sections 1040-1046 (only insert sections 1040 and 1042 are shown) are located on the inside of the bag 1190, while a part of each of the plurality of corner fasteners (only corner fastener 1320 is shown) are located on both the inside and outside of the bag 1190. For example, the base portion 1350 is located on the inside of the bag 1190, the juncture portion rests atop a corner of the bag 1190, and the bracket portion 1370 is located on the outside of the bag 1190. The corner fastener 1320 acts as a clamp, which engages the bag 1190 between the base portion 1350 and the bracket portion 1370, thereby removably attaching the adapter piece 1300 to the bag 1190.

In other embodiments of the corner fastener 1320, the top section 1330 and the bracket section 1340 may be detachably connected. The top section 1330 may further include a locking mechanism at the point edge 1332 and the juncture portion 1360 may further include a key slot. The locking mechanism may be inserted into the key slot, thereby securing the top section 1330 to the bracket section 1340.

FIG. 13A is an exemplary embodiment of an arrangement of corner-restraining straps. Other arrangements and combinations are also possible without departing from the present invention. For example, while FIG. 13A depicts the connecter section 1082 including only the corner-restraining strap 1310, in another embodiment, the connector section 1082 includes multiple corner-restraining straps.

In another embodiment, the adapter piece 1300 further includes a plurality of horizontal-restraining straps and a plurality of side fasteners. Each of the plurality of upper side sections 1060-1066 may include at least one of the plurality of horizontal-restraining straps, and each horizontal-restraining strap may be configured to receive one of the plurality of side fasteners, for example, the side fastener 1120. The adapter piece 1300 may be removably attached to the bag 1190, such that the plurality of insert sections 1040-1046 are located on the inside of the bag 1190, the plurality of side fasteners are located on the outside of the bag 1190, and a part of each of the plurality of corner fasteners are located on both the inside and the outside of the bag 1190. For example, after the adapter piece is attached to the bag 1190, the lower piece 1140 of the side fastener 1120 may be located on the outside of the bag 1190. The lower pieces 1140 acts as a clamp, which engages the bag 1190 to the side section 1042. Further, the base portion 1350 is located on the inside of the bag 1190, the juncture portion 1360 rests atop a corner of the bag 1190, and the bracket portion 1370 is located on the outside of the bag 1190. The corner fastener 1320 acts as a clamp, which engages the bag 1190 between the base portion 1350 and the bracket portion 1370. The plurality of side fasteners and the plurality of corner fasteners thus removably attach the adapter piece 1300 to the bag 1190.

Figure 14:
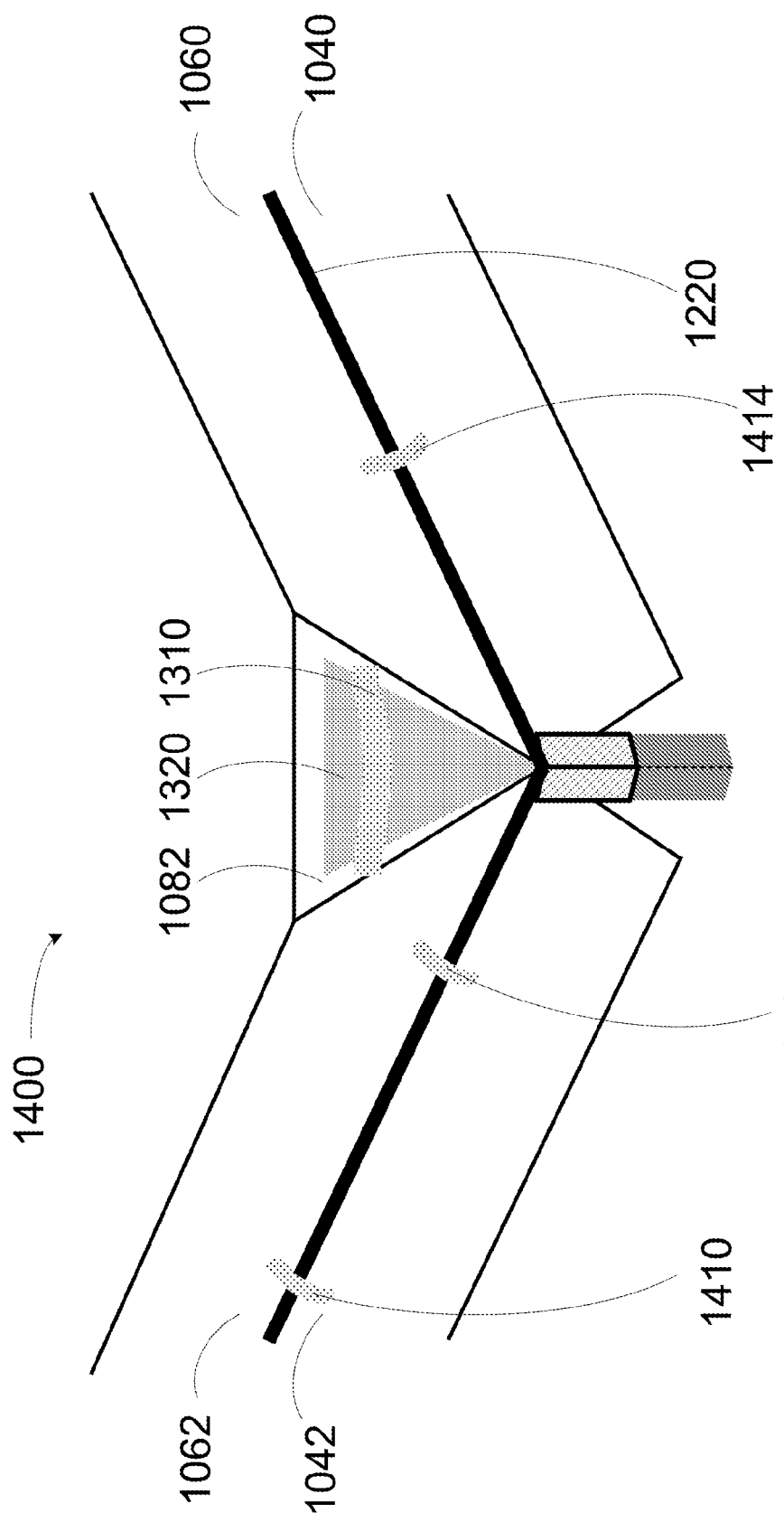
FIG. 14 shows an exemplary adapter piece including a plurality of corner fasteners and an expandable frame.

FIG. 14 depicts an embodiment of an adapter piece 1400, according to an exemplary embodiment. In particular, the adapter piece 1400 includes a plurality of vertical-restraining straps and the expandable frame 1220. The expandable frame 1220 provides structural rigidity to the adapter piece 1400. The expandable frame 1220 is attached to the adapter piece 1400 using the plurality of vertical-restraining straps. The plurality of frame pieces are inserted into the plurality of vertical-restraining straps, for example, vertical-restraining straps 1410-1414, such that the dimensions of the expandable frame 1220 are approximately equal to the dimensions of the lower opening of the cavity 1010. The expandable frame 1220 is attached to the adapter piece 1400, such that each corner fastener, for example, corner fastener 1320, is located between the adapter piece 1400 and the expandable frame 1220.

FIG. 15 shows another embodiment of a corner fastener 1500 of the adapter piece 1400, according to an exemplary embodiment. In particular, the corner fastener 1500 includes a junction post 1510. The junction post includes a frame hook 1520. The junction post 1510 is connected to the top section 1330 at the point edge 1332. The junction post 1510 is connected to the juncture portion 1360 at the top surface. The expandable frame 1220 is attached to the juncture post 1510 using the frame hook 1520. The frame hook 1520 is designed in such a manner that the expandable frame 1220 snaps or otherwise clips into the junction post 1510, such that the expandable frame 1220 is removably connected to the corner fastener 1500.

In another embodiment of the corner fastener 1320, the corner fastener 1320 further includes a portion of the expandable frame 1220, thereby defining a modified corner fastener. In particular, a frame connector piece 1230 may be connected to the corner fastener 1320 at the juncture portion 1360. Two of the plurality of frame pieces 1240 may then be directly inserted into the modified corner fastener.

Figure 16A:
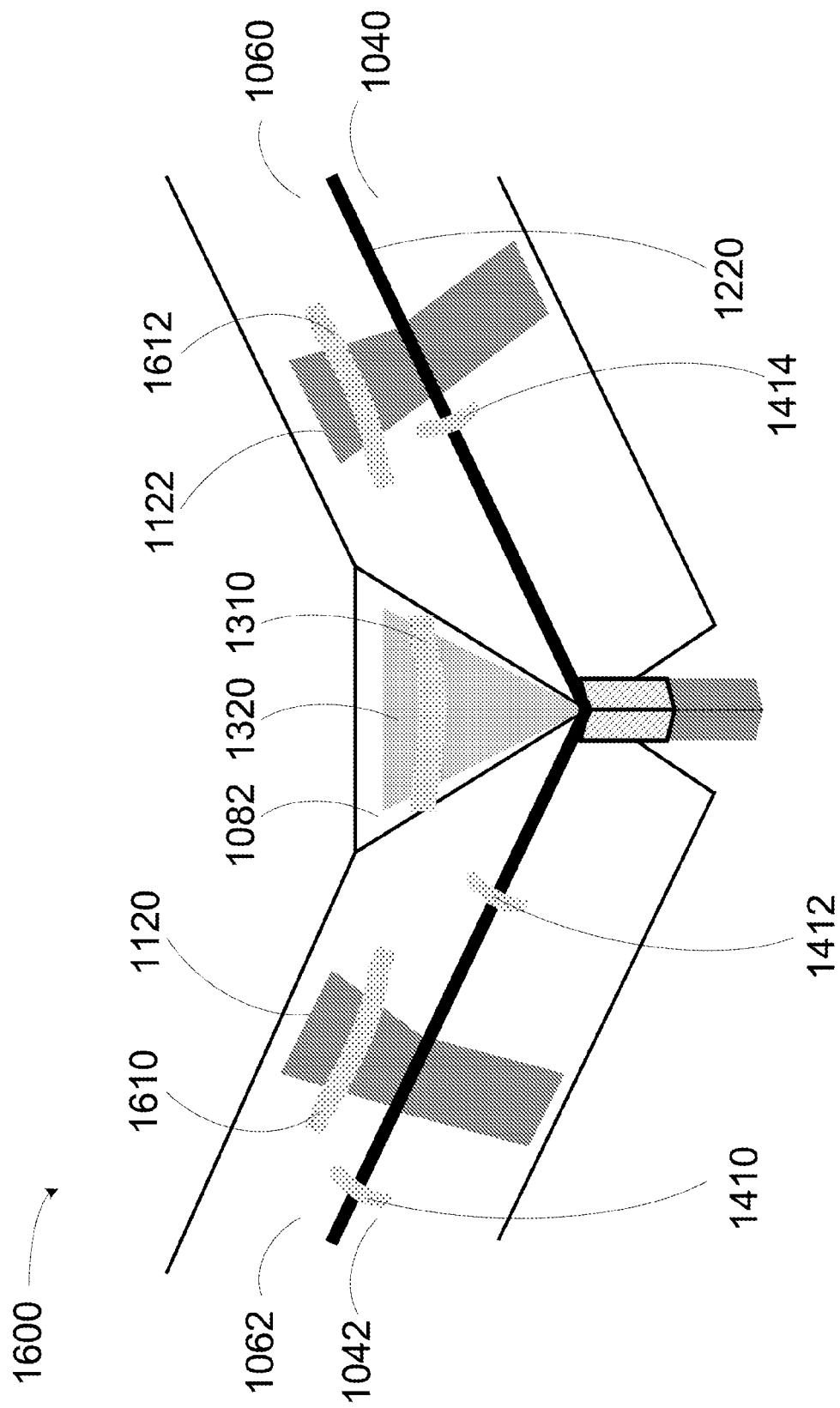
FIG. 16A shows an exemplary adapter piece including a plurality of corner fasteners, a plurality of side fasteners, and an expandable frame.

FIG. 16A depicts a corner of an embodiment of an adapter piece 1600, according to an exemplary embodiment. In particular, the adapter 1600 includes a plurality of horizontal-restraining straps and a plurality of side fasteners. The plurality of horizontal-restraining straps are attached to one of the plurality of upper side sections 1060-1066 (only upper side sections 1060 and 1062 are shown) and each of the plurality of horizontal-restraining straps is configured to receive one of the plurality of side fasteners. For example, a horizontal-restraining strap 1610 is attached to the upper side section 1062 in such a manner that there exists an air gap between the horizontal-restraining strap 1610 and the upper side section 1062 where side fastener 1120 may be inserted. Similarly, a horizontal-restraining strap 1612 is attached to the upper side section 1060 in such a manner that there exists an air gap in between the horizontal-restraining straps 1612 and the upper side sections 1060, where side fasteners 1122 may be inserted. The plurality of side fasteners are located between the expandable frame 1220 and the adapter piece 1600.

Figure 16B:
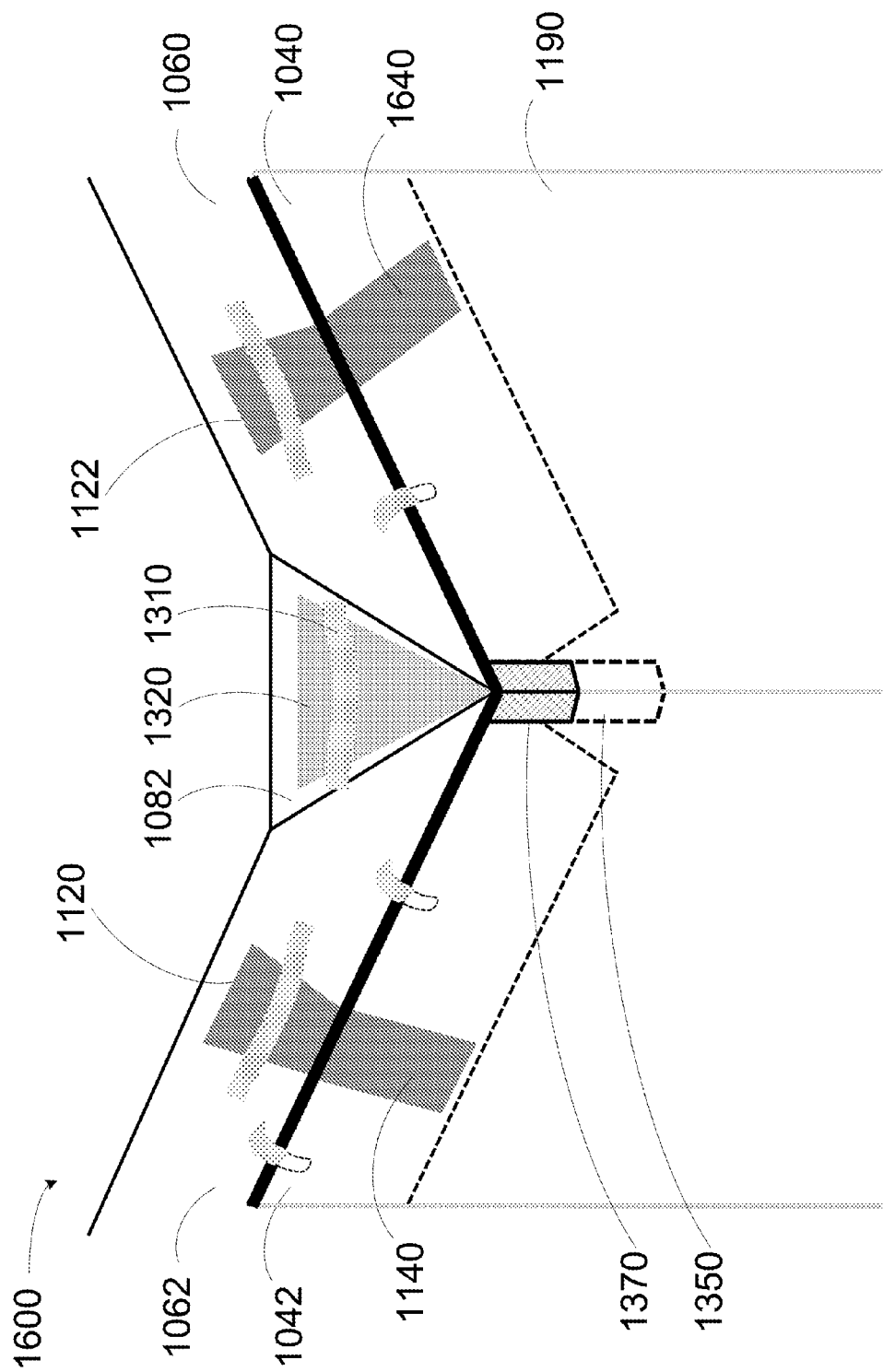
FIG. 16B shows an exemplary adapter piece attached to a bag.

FIG. 16B depicts a corner view of the adapter piece 1600 attached to the bag 1190. In the present embodiment, the bag 1190 may be a free-standing bag for lawn clippings. The adapter piece 1600 may be inserted into the opening of the bag 1190, such that the plurality of insert sections 1040-1046 (only insert sections 1040 and 1042 are shown) are located on the inside of the bag 1190, the plurality of side fasteners (only side fasteners 1120 and 1122 are shown) are located on the outside of the bag 1190, while a part of each of the plurality of corner fasteners (only corner fastener 1320 is shown) is located on both the inside and outside of the upper end of the bag 1190. For example, the lower piece 1140 of the side fastener 1120 and a lower piece 1640 of the side fastener 1122 are located on the outside of the bag 1190. The lower pieces 1140 and 1640 act as clamps, which engage the bag 1190 to the side sections 1042 and 1040, respectively. Further, the base portion 1350 is located on the inside of the bag 1190, the juncture portion rests atop a corner of the bag 1190, and the bracket portion 1370 is located on the outside of the bag 1190. The corner fastener 1320 acts as a clamp, which engages the bag 1190 between the base portion 1350 and the bracket portion 1370. The plurality of side fasteners and the plurality of corner fasteners thus removably attach the adapter piece 1600 to the bag 1190.

Figure 17:
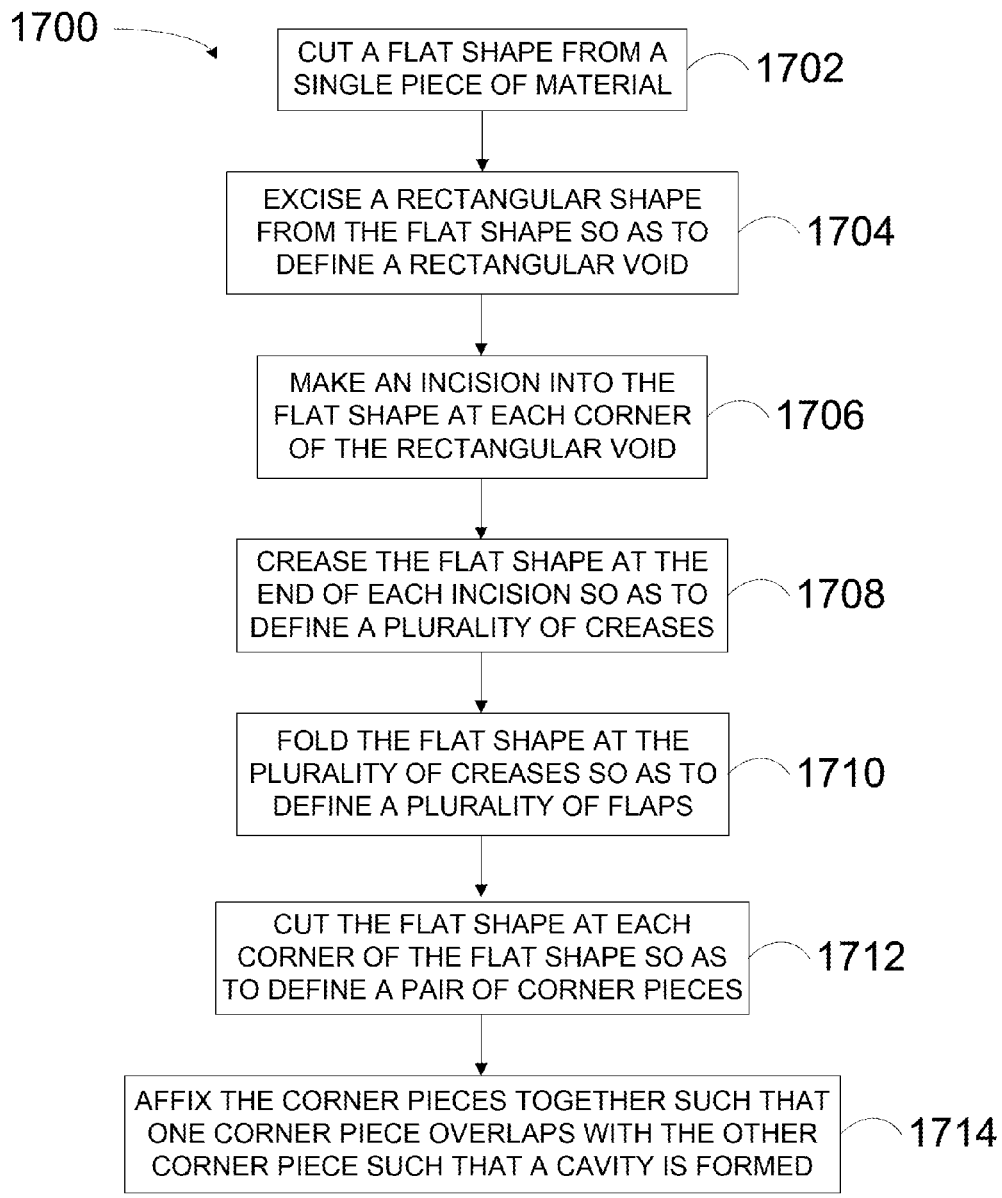
FIG. 17 is a flow chart illustrating a method for manufacturing an adapter, according to an exemplary embodiment.

FIG. 17 is a flow chart illustrating a method for manufacturing an adapter piece 1700, according to an exemplary embodiment. As shown at step 1702, the method involves cutting a flat shape (such as the shape shown in FIG. 10A) from a single piece of material. Next, at step 1704, a rectangular shape is excised from the flat shape so as to define a rectangular void. Then, at step 1706, an incision is made into the flat shape at each corner of the rectangular void (as shown in FIG. 10A). At step 1708, the flat shape is creased at the end of each incision so as to define a plurality of creases, for example, the plurality of creases 1020-1026 (as shown in FIG. 10A). Next, at step 1710, the flat shape is folded at the plurality of creases so as to define a plurality of flaps, for example, the plurality of flaps could be the plurality of insert sections 1040-1046. Then, at step 1712, each corner of the flat shape is cut so as to define a pair of corner sections. The cut may be performed at a 45 degree angle at the corners of the flat shape. Additionally, the cut may be performed at any other acute angle without departing from the present invention. Lastly, at step 1714, the corner sections are affixed together such that one corner section overlaps with the other corner section such that a cavity is formed (as shown in FIG. 10B, for example, the cavity 1010).

In another embodiment of the method for manufacturing the adapter piece, steps 1712 and 1714 are not performed. Instead, each corner of the flat shape is sewn to itself in such a manner as to create the cavity (as shown in FIG. 10B, the cavity 1010).

In other embodiments of the method for manufacturing the adapter piece, step 1714 is not performed. Instead, each of the corner sections is affixed to a connector section (for example, one of the plurality of connector sections 1080-1086) so as to form the cavity (as shown in FIG. 10B, for example, the cavity 1010). In the present embodiment, the connector section is in the shape of a triangle. Further, in other embodiments, the connector section can take other shapes without departing from the present invention.

Figure 18:
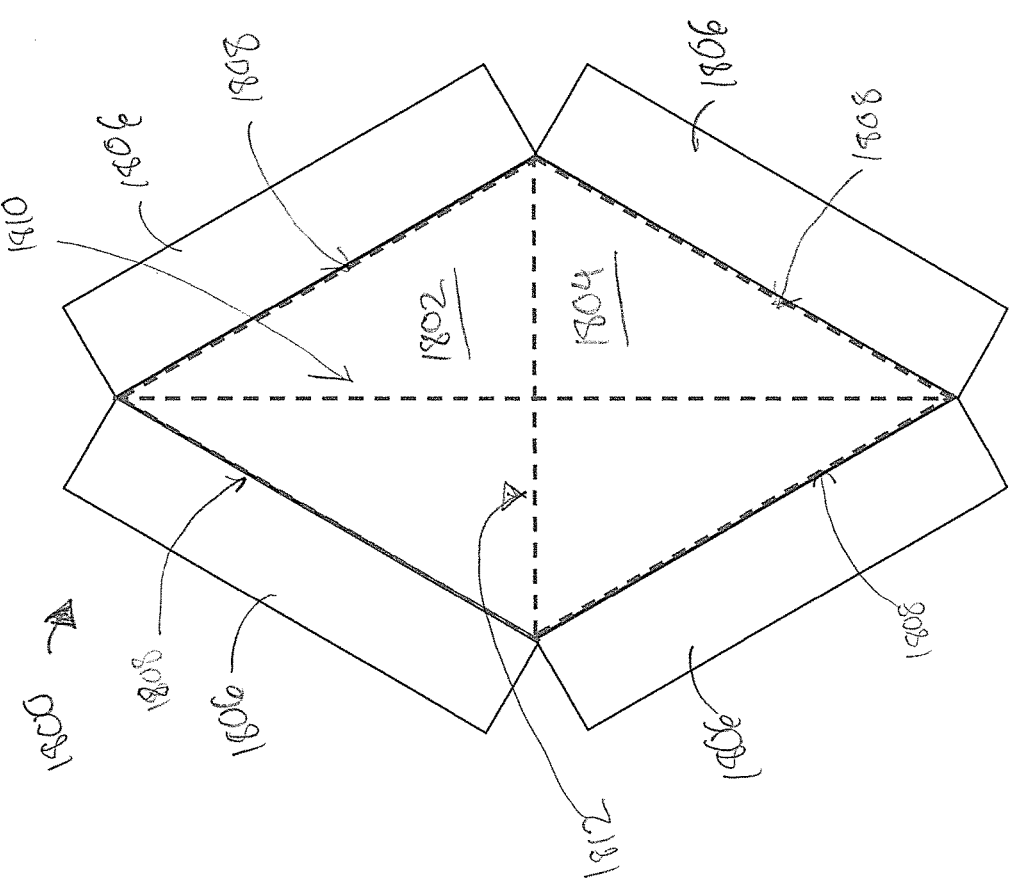
FIG. 18 shows a top-down view of an exemplary adapter piece.

FIG. 18 shows a top-down view of an exemplary adapter piece 1800 that may be used with a free-standing bag. As shown, the adapter piece 1800 includes a diamond-shaped structure. In particular, the adapter piece 1800 includes a first triangular portion 1802 and a second triangular portion 1804. As shown, rectangular portions 1806 are attached to each of the first and second triangular portions 1802, 1804 and form creases 1808 along the junction with the triangular portions. The adapter piece 1800 further includes a vertical crease 1810 along a first axis of the adapter piece 1800 and a horizontal crease 1812 along a second axis of the adapter piece 1800. In examples, the adapter piece 1800 may be made out of single-ply paper or the like.

Figure 19:
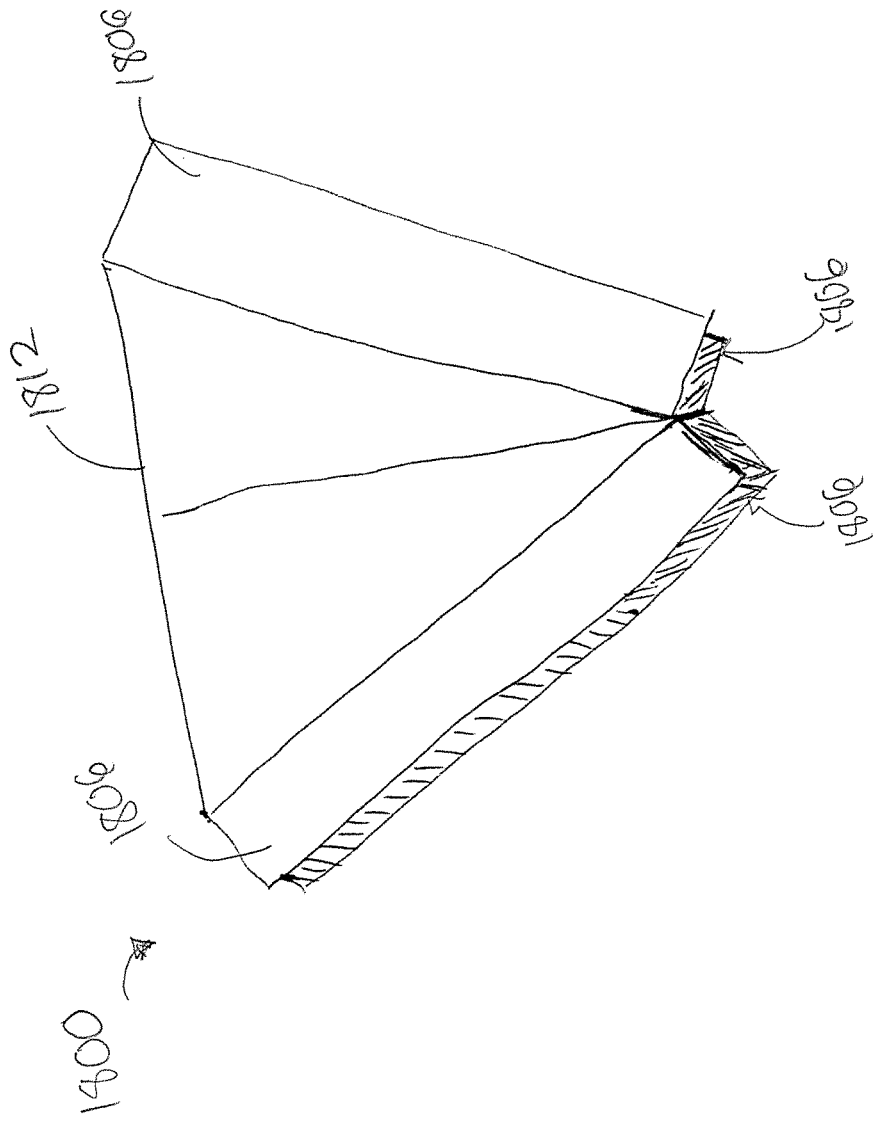
FIG. 19 shows the exemplary adapter piece of FIG. 18 folded over an axis.

FIG. 19 shows the adapter piece 1800 of FIG. 18 folded over the horizontal crease 1812. In this configuration, the adapter piece 1800 forms a triangular-shaped structure with a pair of rectangular portions 1806 on each side of the triangular-shaped structure. In examples where the adapter piece 1800 is made of single-ply paper, once folded as shown in FIG. 19, the triangular-shaped structure is then a double-ply structure and thereby more rigid and stable than a single-ply structure.

Figure 20:
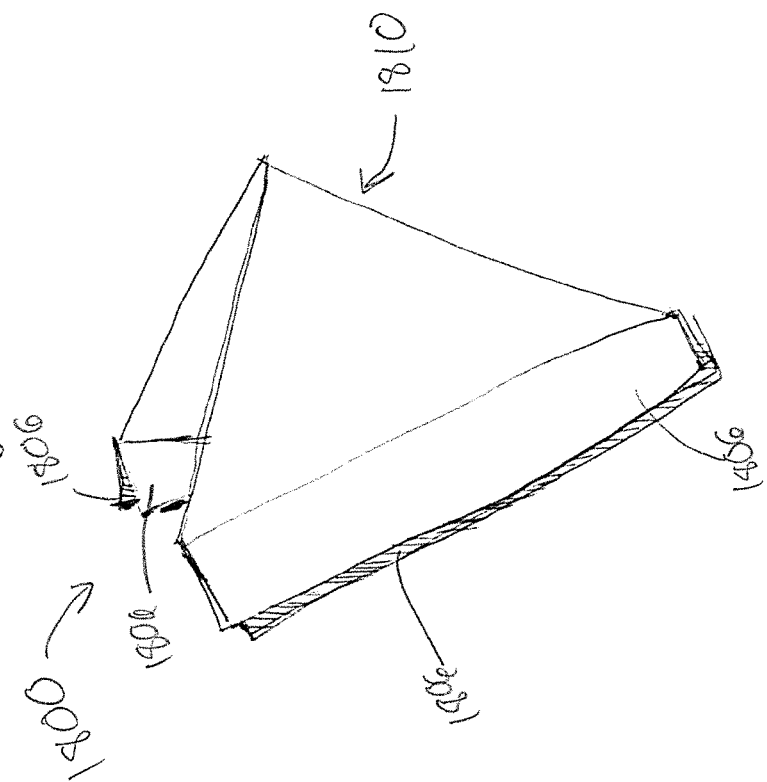
FIG. 20 shows the exemplary adapter piece of FIG. 19 folded over another axis.

FIG. 20 shows the adapter piece 1800 of FIG. 19 folded over the vertical crease 1810. As such, the adapter piece 1800 forms a right-angled structure with a pair of rectangular portions 1806 on each side of the right-angled structure.

Figure 21:
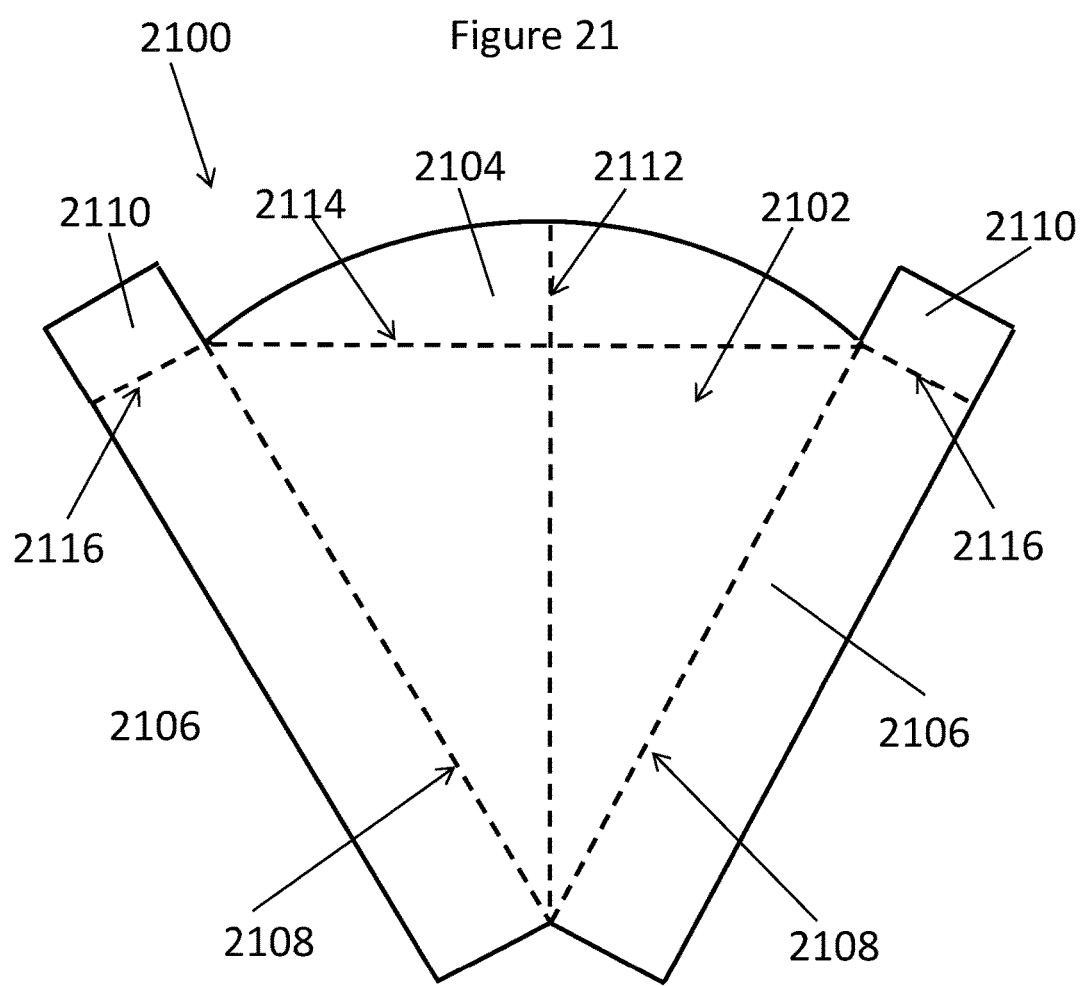
FIG. 21 shows an exemplary adapter piece.

FIG. 21 shows an exemplary adapter piece 2100 that may be used with a free-standing bag. As shown, the adapter piece 2100 includes a triangular portion 2102 with a curved side 2104 and rectangular portions 2106 that are attached to the sides of the triangular portion 2102 and form creases 2108 along the junction with the triangular portion 2102. As shown, the rectangular portions 2106 are longer than the length of the linear sides of the triangular portion 2102 and extend out to form foldable tabs 2110, which are foldable about creases 2116.

Moreover, the triangular portion 2102 includes a vertical crease 2112 and a horizontal crease 2114. The vertical crease 2112 extends from the center of the curved side 2104 to the apex of the triangular portion 2102. The horizontal crease 2114 extends along the length of the curved side 2104 between the points of intersection of the curved side 2104 and the linear sides of the triangular shape 2102. In examples, the adapter piece 2100 is made from a single-ply paper or the like.

Figure 22A:
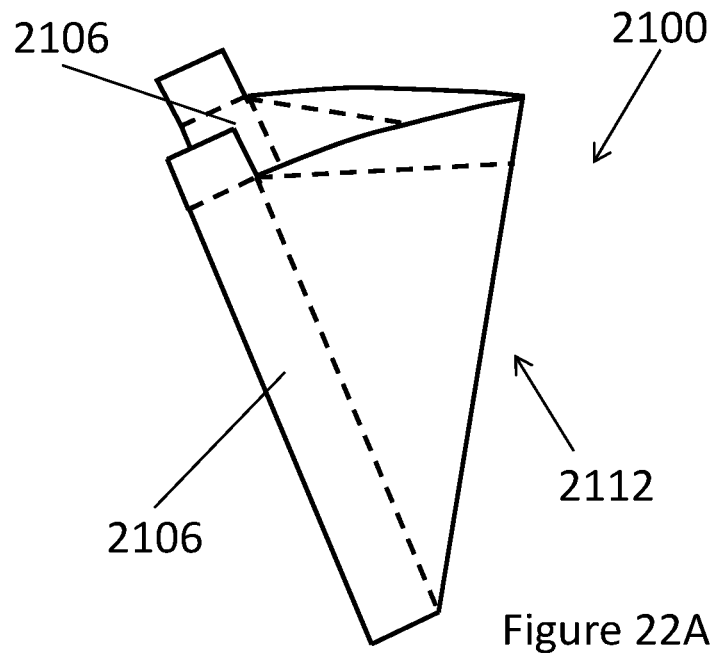
FIG. 22A shows side-views of the exemplary adapter piece of FIG. 21 folded about a crease.
Figure 22B:
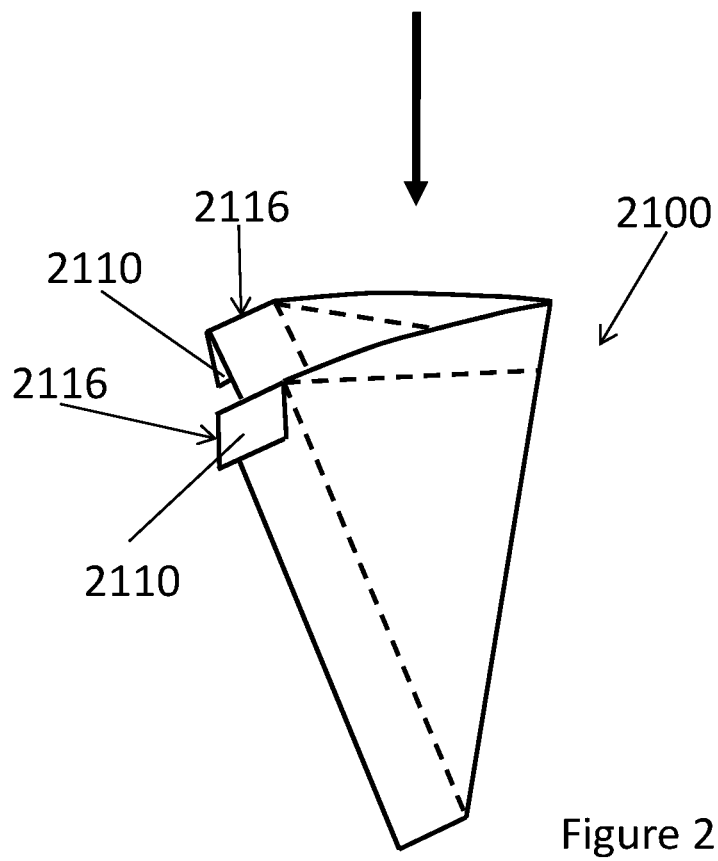
FIG. 22B shows a side-view of the exemplary adapter piece of FIG. 22A with tabs folded about creases.

FIG. 22A shows a side-view of the adapter piece 2100 of FIG. 21 folded about the vertical crease 2112. As such, a single rectangular portion 2106 is on each side of the adapter piece. FIG. 22B shows a side-view of the adapter piece 2100 of FIG. 22A with the tabs 2110 folded outward at the creases 2116.

Figure 23A:
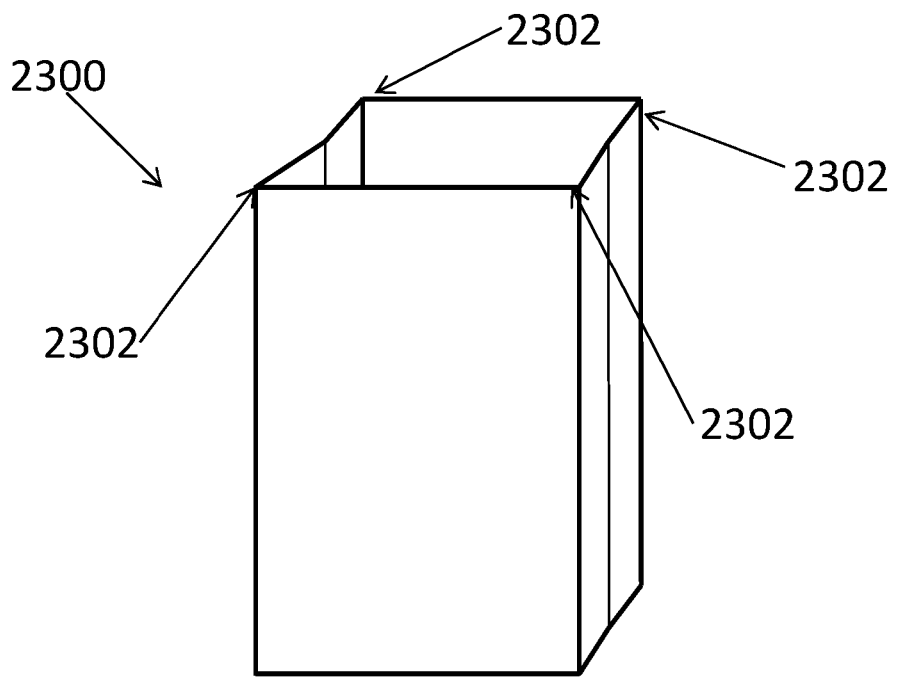
FIG. 23A shows an intact free-standing bag.
Figure 23B:
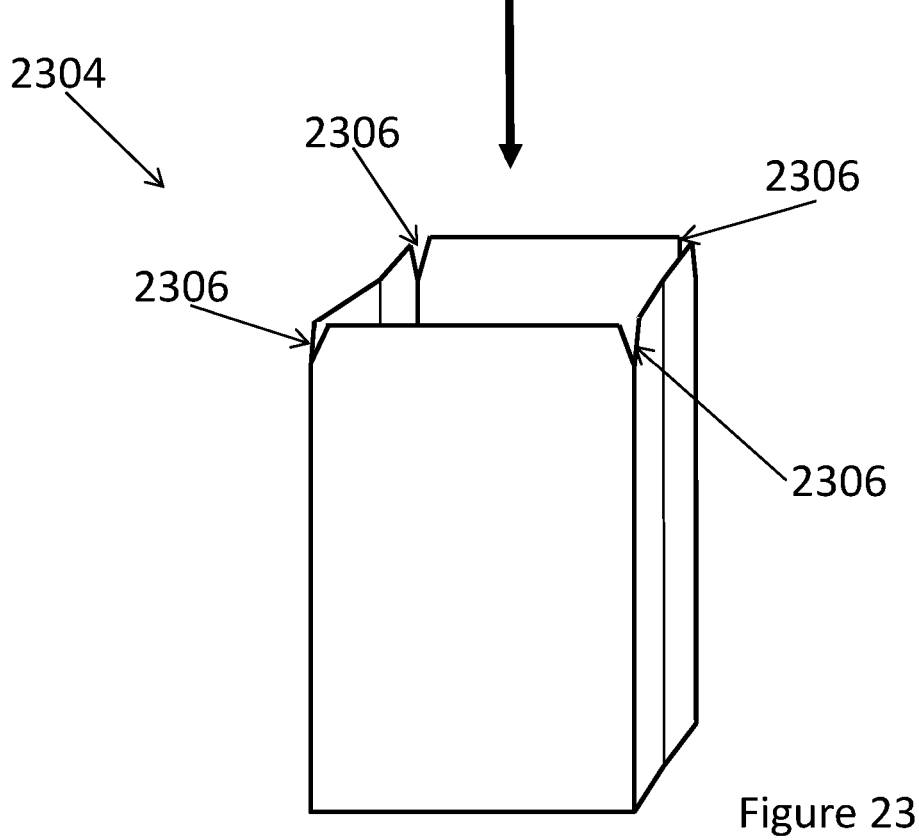
FIG. 23B shows the free-standing bag of FIG. 23A with cuts in each of the four corners.

FIG. 23A illustrates a free-standing bag 2300 that may be configured to receive adapter pieces. In particular, the free-standing bag is shown with intact corners 2302. FIG. 23B shows a free-standing bag 2304, which is the free-standing bag 2300 with vertical cuts 2306 in each of the four corners. As shown, the vertical cuts 2306 may be along the four creases of the free-standing bag 2304. In examples, the vertical cuts 2306 have a predetermined length, which may be the same or substantially the same as the length of a linear side of an adapter piece. For instance, the vertical cuts 2306 may be equivalent to the length of the crease 1808 of FIG. 18 and/or the length of the crease 2108 of FIG. 21.

Figure 24A:
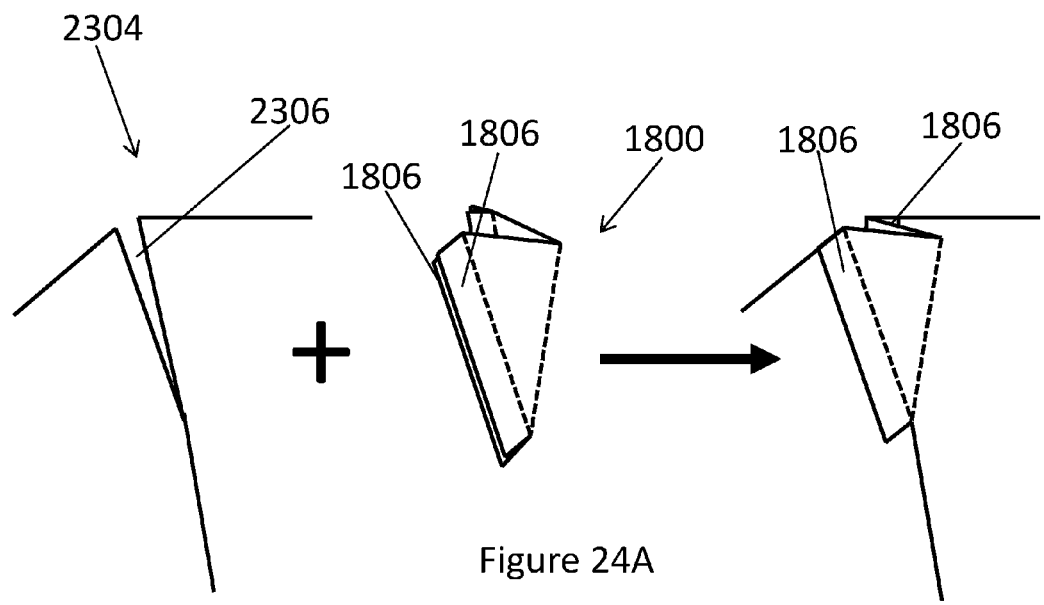
FIG. 24A is conceptual illustration of a method of affixing the adapter piece of FIG. 20 to the free-standing bag of FIG. 23B.

FIG. 24A is a conceptual illustration of a method of affixing the adapter piece 1800 of FIG. 20 to the free-standing bag 2304. As discussed above, each side of right-angled structure of the folded adapter piece 1800 includes a pair of rectangular portions 1806. By inserting the folded adapter piece 1800 in the corner of the free-standing bag 2304 such that the right-angled structure is inside the cavity of the free-standing bag 2304, each of the four rectangular portions 1806 may be affixed to a corner of the free-standing bag 2304 about a vertical cut 2306. In particular, each pair of rectangular portions 1806 may be affixed so as to sandwich part of a cut portion of the free-standing bag 2304. For instance, a first rectangular portion of a given pair may be affixed to an inner surface of the free-standing bag 2304, while a second rectangular portion 1806 of the given pair may be affixed to the outer surface of the free-standing bag 2304. The rectangular portions may be affixed using glue, adhesive, or the like.

In practice, an adapter piece 1800 may be affixed to each of the cut corners of the free-standing bag 2304. In this way, the cut free-standing bag 2304 becomes intact due to the affixed four adapter pieces 1800.

Figure 24B:
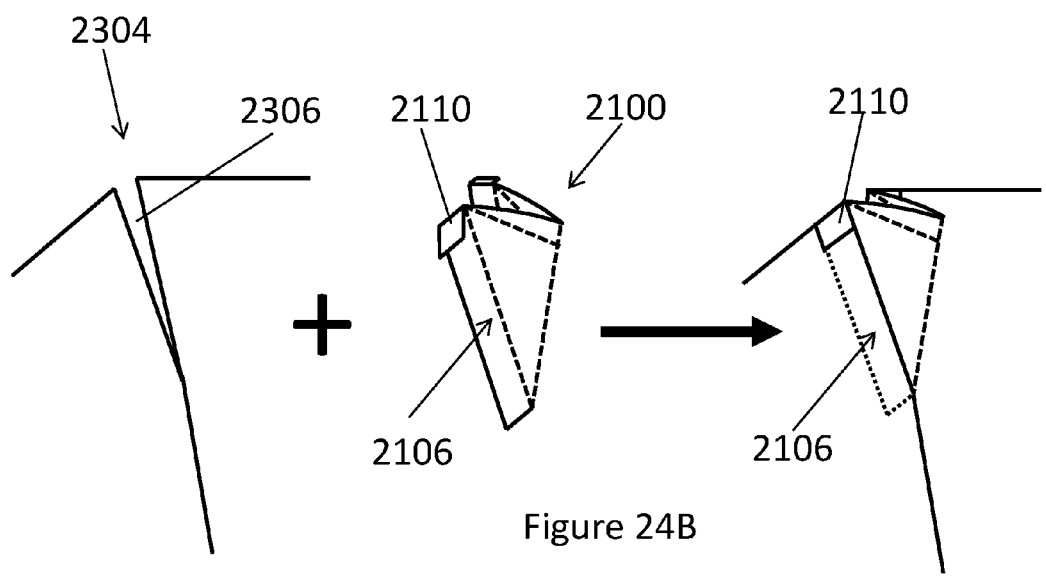
FIG. 24B is a conceptual illustration of a method of affixing the adapter piece of FIG. 22B to the free-standing bag of FIG. 23B.

Similarly, FIG. 24B is a conceptual illustration of a method of affixing the adapter piece 2100 of FIG. 22B to the free-standing bag 2304. Unlike the adapter piece 1800, as discussed above, the adapter piece 2100 of FIG. 22B remains single-ply when folded. As such, each side of the folded adapter piece 2100 has a single rectangular portion 2106.

In this case, the rectangular portions 2106 are affixed on each side of a vertical cut 2306 on the outer surface of the free-standing bag 2304 after positioning the folded adapter piece 2100 in the cavity of the free-standing bag 2304 (e.g., the vertical crease 2112 is inside the free-standing bag 2304). Moreover, the foldable tabs 2110 are folder over the rim of the free-standing bag 2304 and affixed to the inner surface of the free-standing bag.

In practice, an adapter piece 2100 may be affixed to each of the cut corners of the free-standing bag 2304. In this way, the cut free-standing bag 2304 becomes intact due to the affixed four adapter pieces 2100.

Figure 25A:
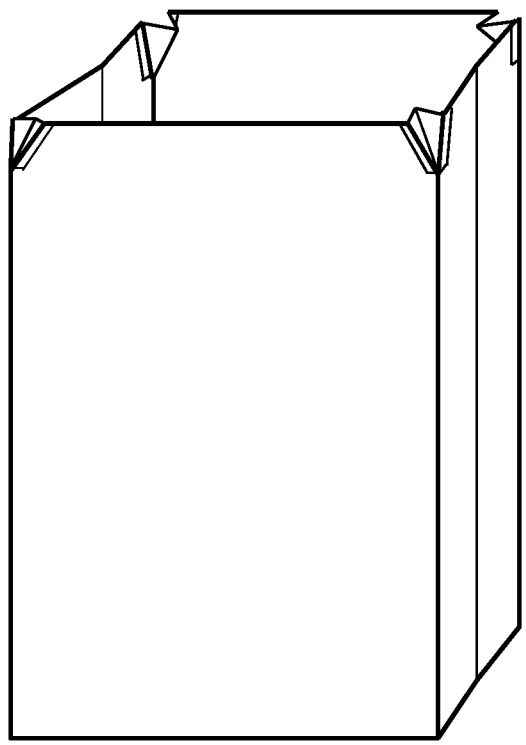
FIG. 25A shows the exemplary adapter pieces affixed to the free standing bag as in FIG. 24A in an unexpanded configuration.
Figure 25B:
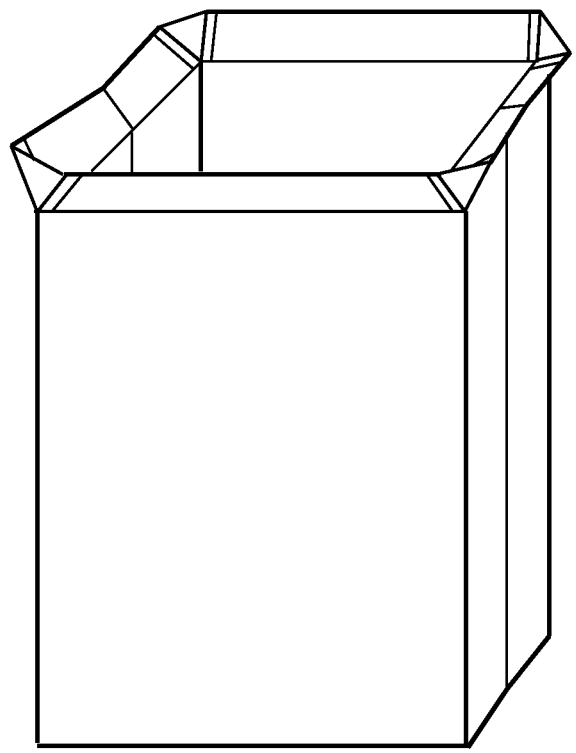
FIG. 25B shows the exemplary adapter pieces affixed to the free standing bag as in FIG. 24A in an expanded configuration.

FIGS. 25A-B and 26A-B illustrate the result of affixing adapter pieces to the corners of a cut free-standing bag to form a free-standing bag with an expandable opening. In particular, FIG. 25A shows four adapter pieces 1800 affixed to the free standing bag 2304 as in FIG. 24A in an unexpanded configuration, while FIG. 25B shows the same assembly in an expanded configuration. As shown, the adapter pieces 1800 that were previously folded inward are expanded outward (e.g., vertical crease 1810 is pulled outward) thereby creating an expanded opening for the free-standing bag 2304 as shown in FIG. 25B.

Figure 26A:
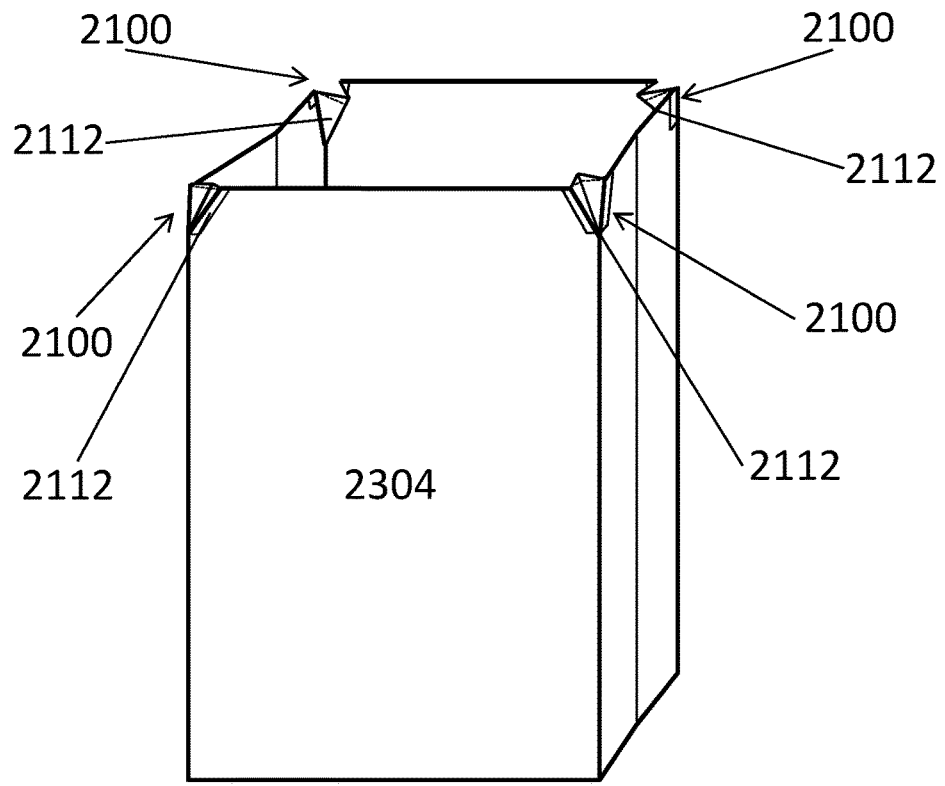
FIG. 26A shows the exemplary adapter pieces affixed to the free standing bag as in FIG. 24B in an unexpanded configuration.
Figure 26B:
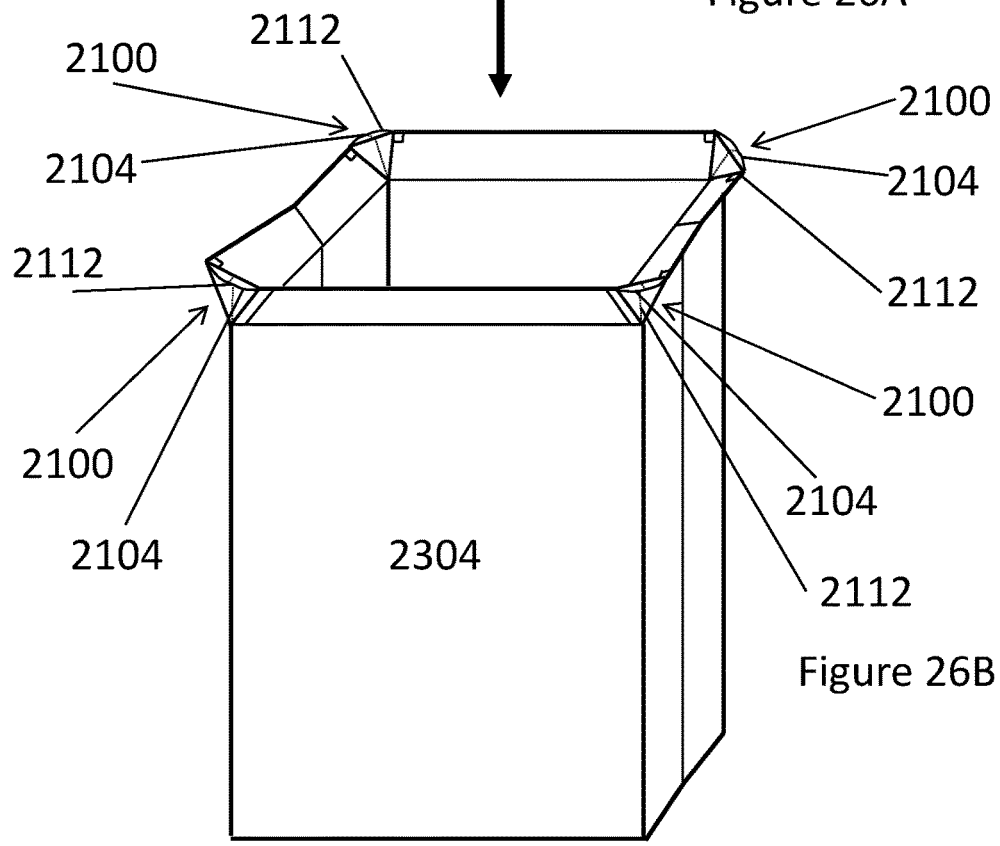
FIG. 26B shows the exemplary adapter pieces affixed to the free standing bag as in FIG. 24B in an expanded configuration.

Likewise, FIG. 26A shows four adapter pieces 2100 affixed to the free standing bag 2304 as in FIG. 24B in an unexpanded configuration, while FIG. 26B shows the same assembly in an expanded configuration. As shown, the adapter pieces 2100 that were previously folded inward are expanded outward (e.g., vertical crease 2112 is pulled outward) thereby creating an expanded opening for the free-standing bag 2304 as shown in FIG. 26B. Moreover, each of the adapter pieces 2100 may be folded along the horizontal crease 2112 to bend the curved side 2104 outward. Doing so, the curved side 2104 acts as a brace section to prevent the adapter pieces 2100 from re-folding inward along vertical creases 2112, thereby maintaining the expanded opening of the free-standing bag 2304.

In other examples, a method of affixing an adapter piece for creating an expandable opening for a free-standing bag may be performed starting with a sheet of single or double-ply material (e.g., paper) that is cut and creased in a manner similar to the above described cuts and creases. Next, four adapter pieces may be affixed to the sheet of material. Then, the sheet of material may be folded and glued along the sides and bottom to form a free-standing bag with the adapters, as illustrated in FIGS. 9A and 9B.

Figure 27A:
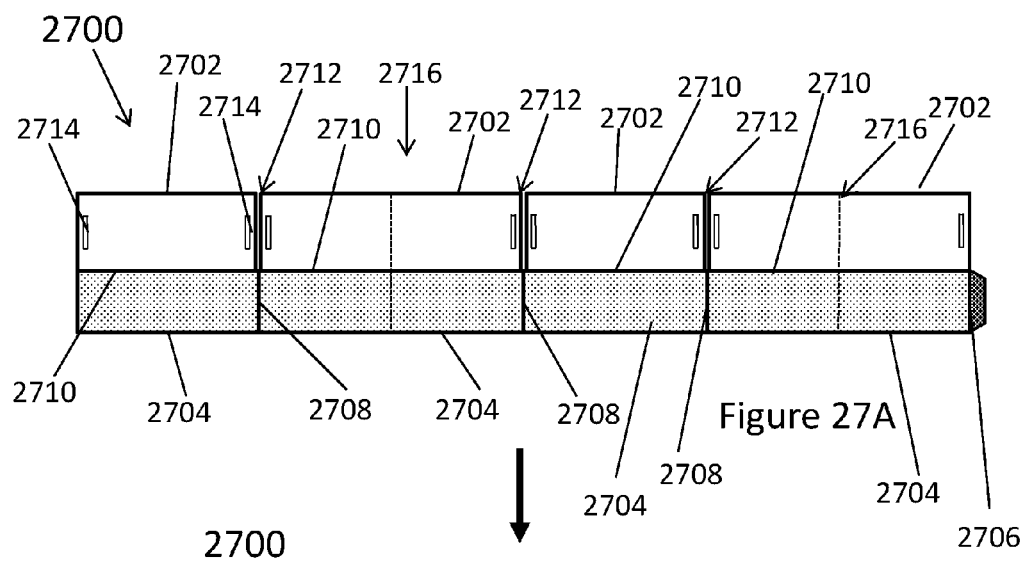
FIG. 27A shows an exemplary base unit of an adapter piece in a linear configuration.
Figure 27B:
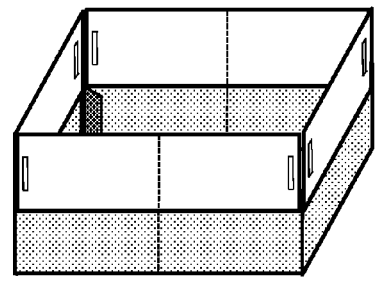
FIG. 27B shows the exemplary base unit of FIG. 27A in an assembled configuration.
Figure 27C:
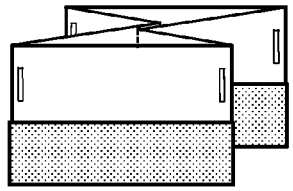
FIG. 27C shows the exemplary base unit of FIG. 27B in a folded configuration.

FIGS. 27A-C illustrates various configurations of a base unit 2700 of an adapter for use with a free-standing bag, according to example embodiments. In particular, FIG. 27A shows the base unit 2700 in a linear configuration. As shown, the base unit 2700 includes a plurality of top rectangular panels 2702 and bottom rectangular panels 2704, a foldable tab 2706, and a plurality of cuts and creases.

As shown, each of the bottom rectangular panels 2704 has the same width and each has either a first or second length, where the second length is longer than the first length. In this example, the bottom rectangular panels 2704 are arranged in an alternating pattern (e.g., a rectangular panel 2704 with a first length, then one with a second length, and so forth) and separated at a crease 2708.

Each of the top rectangular panels 2702 is connected to a corresponding bottom rectangular panel 2704 and has similar dimensions as the corresponding bottom rectangular panel 2704. Each top rectangular panel 2702 is separated from a corresponding bottom rectangular panel 2704 by a crease 2710. The top rectangular panels 2702 are separated by vertical cuts 2712. Each top rectangular panel 2702 includes a plurality of slits 2714.

Moreover, the base unit 2700 also includes vertical creases 2716. In particular, the vertical creases 2716 are included in top-bottom rectangular panel pairs that have the second length. In this way, the base unit 2700 is foldable along the plurality of crease to form a rectangular structure, as shown in FIG. 27B. The rectangular structure is formed by affixing the foldable tab 2706 to opposite end of the base unit 2700 in the linear configuration of FIG. 27A. As shown in FIG. 27C, the base unit 2700 may then be compressed into a folded configuration and laid flat by folding the base unit 2700 at the vertical creases 2716.

Figure 28:
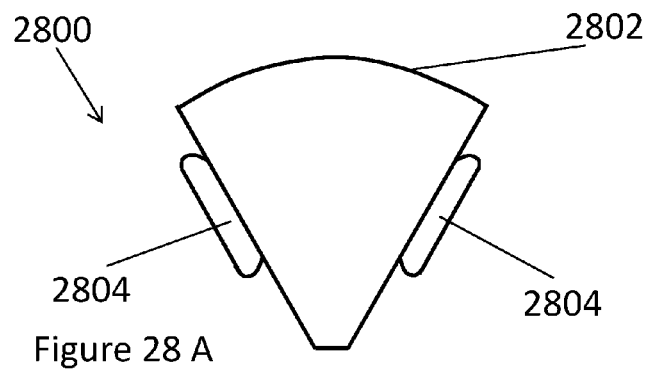
FIG. 28A shows an exemplary connector piece.
FIG. 28B shows an exemplary connector piece in a flat and vertically folded configuration.
FIG. 28C shows an exemplary connector piece in a flat and horizontally folded configuration.
Figure 28:
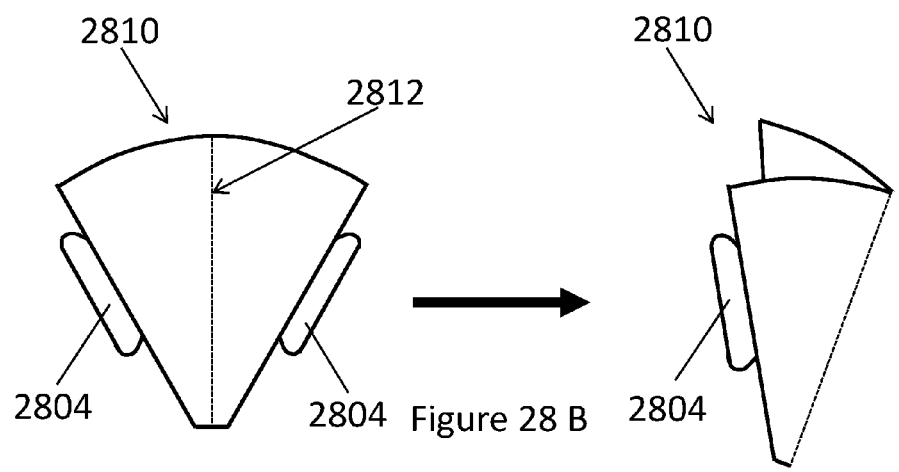
Figure 28:
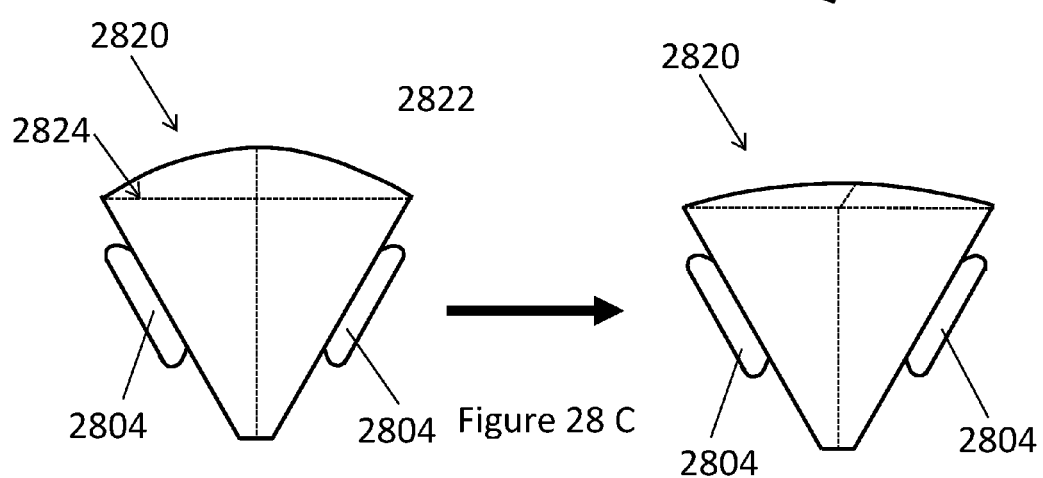

FIG. 28A shows a connector piece 2800 that may be connected to a base unit, such as the base unit 2700. As shown, the connector piece 2800 is triangular in shape with a curved side 2802 and includes tabs 2804 that are configured to be inserted into a slit 2714 of the base unit 2700. In this example, the connector piece 2800 is flat or substantially flat.

FIG. 28B shows a connector piece 2810 that is foldable about a vertical crease 2812. In other respects, the connector piece 2810 may be the same or similar to the connector piece 2800. When folded, the connector piece 2810 takes the form of a triangular structure with tabs 2804 on one side of the triangular structure.

FIG. 28C shows a connector piece 2820 that is foldable about a vertical crease 2822 and a horizontal crease 2824. The connector piece 2820 is similar in aspects to the connector piece 2810. However, when the connector piece 2820 is folded along the horizontal crease 2824, such that the folded portion on the curved side is perpendicular to the main portion of the connector piece 2820, the fold helps keep the connector piece 2820 substantially flat and helps prevent the connector piece 2820 from unintentionally folding along the vertical crease 2822. In this way, the connector piece 2820 is configured to allow flexibility with respect to how the connector piece is utilized (e.g., either in a flat configuration or a folded configuration).

In examples, the base unit 2700 and/or the connector pieces 2800, 2810, and 2820 may be made out of paper, plastic, or any other rigid material. It should be understood that the base unit 2700 may be made of a first material, such as paper, while the connector pieces may be made out of a second material, such as plastic, among other examples.

FIG. 29A shows a conceptual illustration of a method of connecting connector pieces 2800 to the base unit 2700 to form an adapter piece for a free-standing bag. Each connector piece 2800 may be connected to the base unit 2700 by inserting the tabs 2804 into the slits 2714 of adjacent top rectangular panels 2702. After connecting four connector pieces 2800 to the base unit 2700, the rectangular shaped base unit 2700 is converted to a pyramidal shaped structure 2900 that includes an expanded top portion and a rectangular bottom portion.

Similarly, FIG. 29B shows a conceptual illustration of a method of connecting connector pieces 2820 to the base unit 2700 to form an adapter piece for a free-standing bag. After connecting four connector pieces 2820 in a similar manner as in FIG. 29A, the rectangular base unit 2700 is converted to a pyramidal shaped structure 2910. While not depicted, one of ordinary skill in the art will appreciate that connector pieces 2810 may be connected to the base unit 2700 to form an adapter piece for a free standing bag in a similar manner as shown in FIGS. 29A and 29B.

Figure 30:
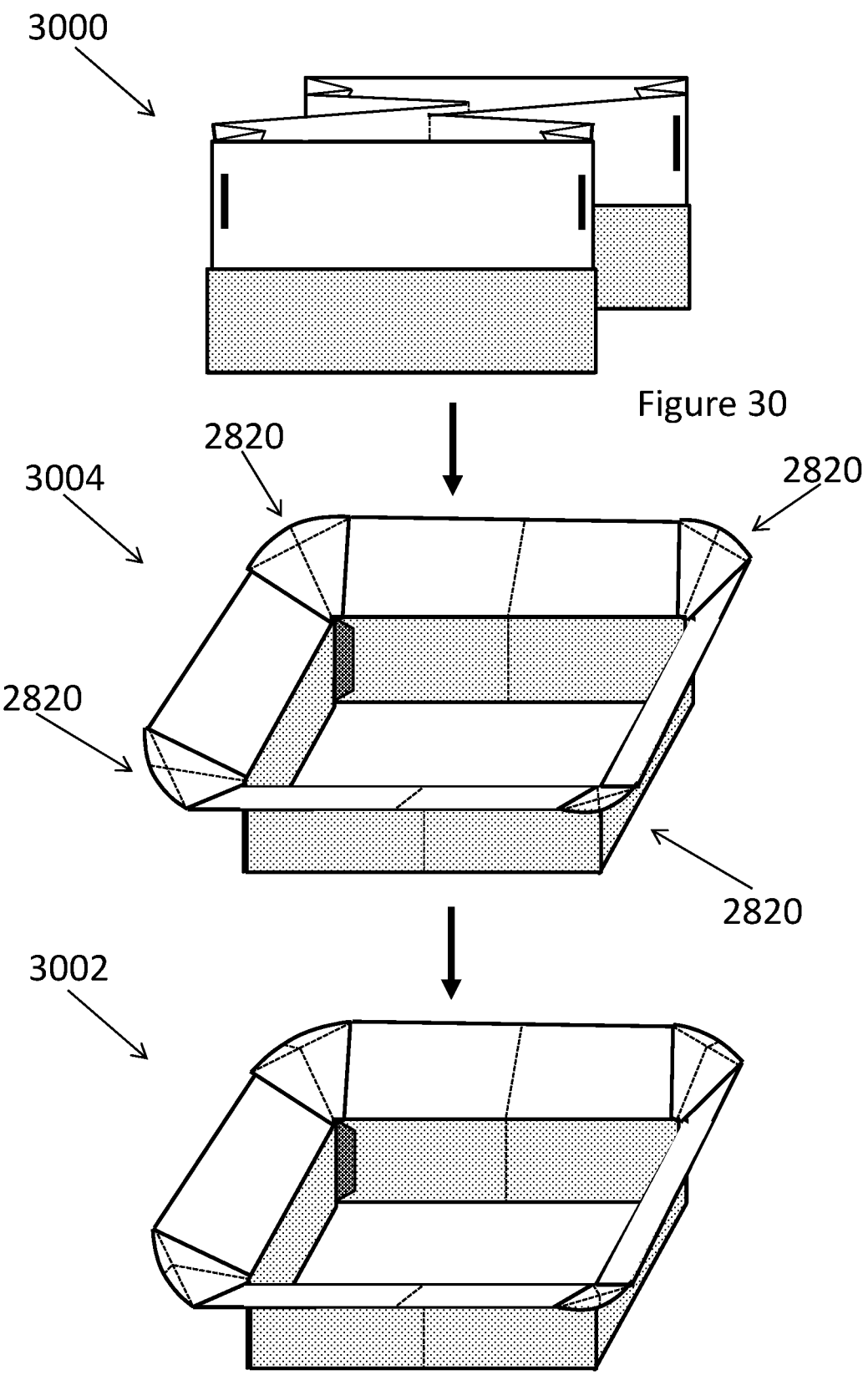
FIG. 30 shows an assembled adapter piece in a folded and expanded configuration.

FIG. 30 shows an assembled adapter piece 3000 in a folded configuration where the connector pieces are folded inward (e.g., along vertical creases 2822). As shown, the folded adapter piece 3000 can be converted to an expanded configuration 3002 by expanding the connector pieces 2820 outward to form a pyramidal structure, such as the pyramidal shaped structure 2910. Further, the curved side of each connector piece 2820 can be folded outward along the horizontal crease 2824 such that the curved portion of the connector piece 2820 is perpendicular to the main portion of the connector piece 2820. In doing so, the adapter piece 3004 maintains its pyramidal structure. Further, folding the curved side of a connector piece 2820 may help to keep the connector piece 2820 substantially flat, thereby helping to prevent the connector piece 2820 collapsing about the vertical crease 2822.

Figure 31:
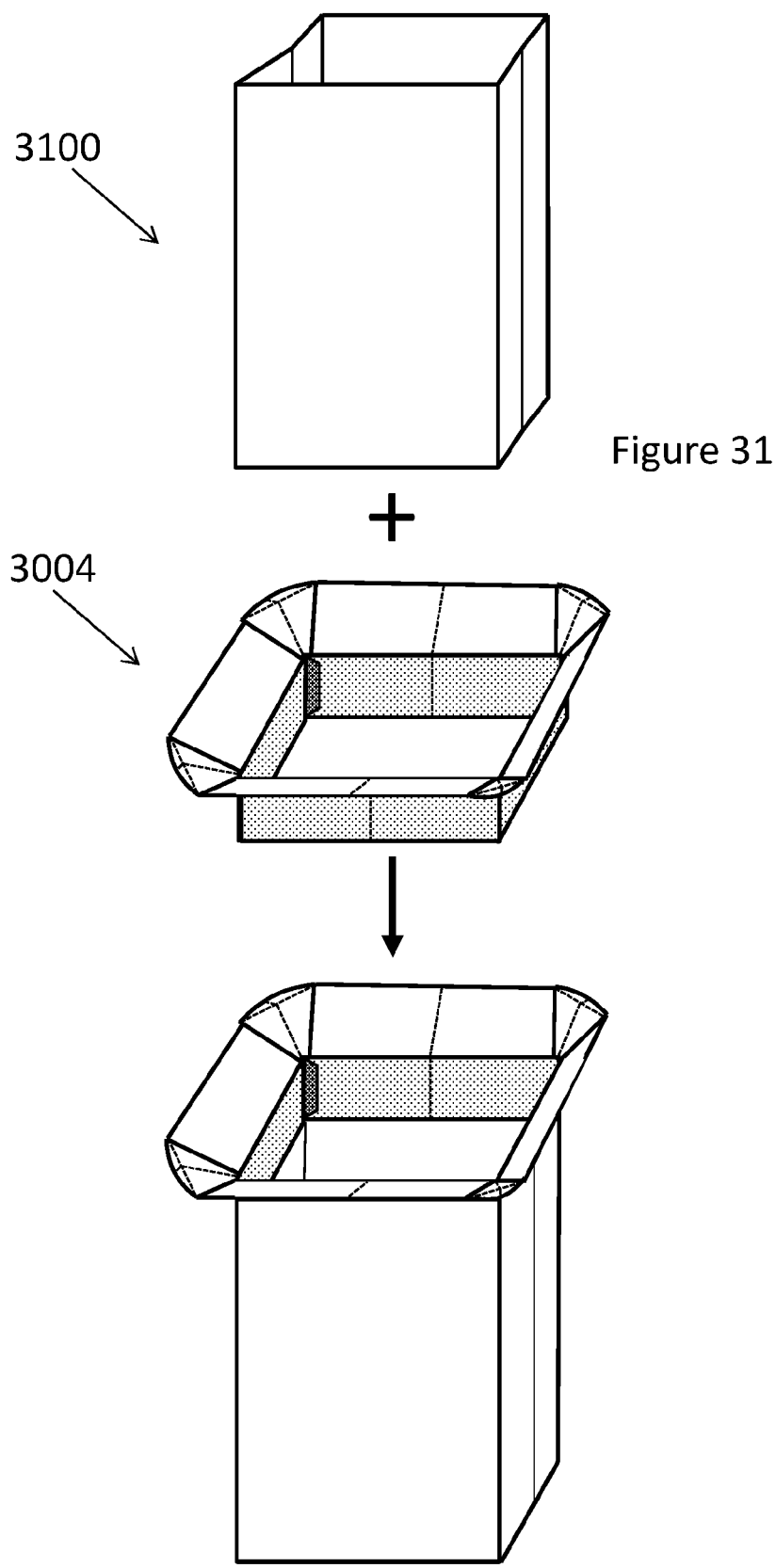
FIG. 31 shows a free-standing bag with an expanded adapter inserted into the bag.

FIG. 31 shows a free-standing bag 3100 with an expanded adapter piece 3004 inserted into the bag. As shown, the free-standing bag 3100 is an intact free-standing bag, and the adapter piece 3004 is inserted into the open cavity of the free-standing bag 3100. To secure the adapter piece 3004 to the free-standing bag 3100, the rectangular bottom portion of the adapter piece 3004 is inserted inside the free-standing bag 3100, while the expanded top portion of the adapter piece 3004 remains outside of the free-standing bag 3100. The pyramidal shape of the top portion of the adapter piece 3004 helps to prevent the adapter piece 3004 from slipping further inside the bag. In this way, inserting one of the adapters described herein into the mouth of a free-standing bag helps to create a larger opening for the bag and helps to prevent the mouth of the bag from closing.

It should be understood the arrangements and functions described herein are presented for purposes of example only, and that numerous variations are possible. For instance, elements can be added, omitted, combined, distributed, reordered, or otherwise modified.

I claim:

1. A free standing bag kit comprising:
a bag having a rectangular opening with a vertical cut at each corner of the rectangular opening;
a plurality of connector pieces, wherein each connector piece comprises four sides, with each of the four sides having a tab extending therefrom;
wherein each connector piece comprises a crease along a long axis of the connector piece, a crease along a short axis of the connector piece, and a crease at a junction of each tab and the corresponding side of the connector piece;
wherein, when each connector piece is folded upon itself along the crease on the short axis of the connector piece, the connector piece has a doubly-ply triangular form with a pair of the tabs on the connector piece arranged on two sides of the double-ply triangular form;
wherein, when each connector piece is folded along the crease on the short axis of the connector piece and then folded along the crease on the long axis of the connector piece, the connector piece has a quad-ply triangular form such that the tabs of the connector piece are arranged along a hypotenuse of the quad-ply triangular form connector piece;
wherein, each connector piece is connectable, in the quad-ply triangular form, to a corresponding one of the vertical cut at a respective top corner of a bag via two or more of the tabs
wherein, when all four connector pieces are connected to the bag at the corresponding vertical cuts the bag and the four connector pieces collectively provide an expandable opening at the top of the bag.

2. The free standing bag kit of claim 1, wherein the tabs are made out of paper.

3. The free standing bag kit of claim 1, further comprising the bag, wherein the bag is made out of single or double-ply paper.

4. The free standing bag kit claim 1, wherein the connector pieces are creased such that when the connector pieces are attached to the bag and folded inward, the opening of the bag has a cross section of the same size as a lower portion of the bag.

5. The free standing bag kit of claim 4, wherein the connector pieces are creased such that when the four connector pieces are connected to the bag and folded inward into the quad-ply triangular form, the bag is foldable to a substantially flat shape.

6. The bag of claim 5 wherein the substantially flat shape is rectangular.

7. The bag of claim 6 wherein, when the connector pieces are attached to the bag and unfolded from the quad-ply triangular form, the connector pieces and top portions of sides of the bag collectively form a pyramidal cavity funneling into a lower portion of the bag.

8. A free standing bag kit comprising:
a bag having a rectangular opening with a vertical cut at each corner of the rectangular opening;
a plurality of triangular connector pieces each having at least three sides, wherein two of the sides each have a tab arranged thereon, wherein a portion of each tab extends beyond a top end of the corresponding side of the triangular connector piece;
wherein each connector piece comprises a vertical crease between the two sides having tabs arranged thereon, and creases at the junctions of the tabs and the corresponding sides of the triangular connector piece,
wherein, when each triangular connector piece is folded upon itself along the vertical crease, the connector piece has a double-ply triangular form such that the tabs are substantially aligned and located along the hypotenuse of the double-ply triangular form;
wherein, on each connector piece, each tab has at least one horizontal crease at the junction of the extending portion of the tab and the top of the crease at the junction of the tab and the corresponding side of the connector piece, such that the portion of each tab extending beyond the top of the corresponding side can be folded over along the horizontal crease to provide a hinged smaller tab;
wherein, when the connector pieces are connectable to vertical cuts at the top corners of a free standing bag using the tabs on the connector pieces, the connector pieces and top side portions of the bag collectively provide an expandable opening for the bag.

9. The free standing bag kit of claim 8, wherein the triangular connector pieces and tabs are made of paper.

10. The free standing bag kit of claim 8 wherein the bag is made out of single or double-ply paper.

11. The free standing bag kit of claim 8, wherein, when the connector pieces are attached to the bag and folded inwards, the expandable opening of the bag has a cross section of the same size as a lower portion of the bag.

12. The free standing bag kit of claim 11, wherein, when the connector pieces are attached to the bag and folded inward, the bag and the attached connector pieces are collectively foldable into a substantially flat shape.

13. The free standing bag kit of claim 12 wherein the substantially flat shape is rectangular.

14. The free standing bag kit of claim 8, wherein when the connector pieces are attached to the bag and unfolded, the attached connector pieces and the top side portions of the bag collectively form a funnel at the top of the bag.

15. The free standing bag kit of claim 8, wherein each triangular connector piece further comprises a brace section extending from a third side of the triangular connector piece and a horizontal crease at a junction of the third side and the brace section, such that when all the connector pieces are connected to the base unit and folded along their respective horizontal creases, the brace sections hold the triangular connector pieces in an unfolded position, such that the expandable opening is held in an expanded position.

16. The free standing bag kit of claim 15 wherein the brace section has a curved side.

17. A foldable and expandable adapter for a free standing bag comprising:
- a base unit comprising a lower section and four top section panels,
    - wherein the lower section comprises a flap on a first end and plurality of vertical creases, wherein the plurality of vertical creases segment the lower section into four alternating rectangular lower panels of two different sizes;
    - wherein each of the four panels extend from a corresponding one of the lower panels, wherein a horizontal crease separates each top section panel from the corresponding lower panel,
    - wherein each top section panel comprises two vertical slits,
    - wherein a plurality of vertical cuts separate the top section panels such that each top section panel is independently foldable along its corresponding horizontal crease; and
    - wherein the base unit is arranged such that when the lower section is folded along the vertical creases and the first end of the lower section is joined to a second end of the lower section using the flap, the lower section forms a rectangular base having a first diameter and the top section forms an expandable opening that is expandable to a second diameter greater than the first diameter;
- a plurality of triangular connector pieces each having at least three sides, wherein two of the sides each have a tab arranged thereon, wherein the tabs on each connector piece are arranged such that when the tabs on each connector piece are inserted into corresponding slits of two adjacent top section panels the base unit and the triangular connector pieces collectively form a foldable and expandable adapter for free standing bag.

18. The adapter of claim 17 wherein the connector pieces are flat without any creases.

19. The adapter of claim 17, wherein each triangular connector piece has vertical crease between the two tabbed sides of the connector piece, such that when the connector piece is connected to the base unit and folded inward along the vertical crease, the expandable opening has the first diameter.

20. The adapter of claim 17, wherein each triangular connector piece comprises a brace section extending from a third side of the triangular connector piece, and a horizontal crease at a junction of the third side and the brace section, such that the when the connector piece is connected to the base unit and folded along the horizontal crease, the brace section provides a brace between the two tabbed sides of the triangular connector piece such that the triangular connector piece maintains flat shape and holds the top panels such that the expandable opening maintains the second diameter.

21. The adapter of claim 17, wherein the base unit and the connector pieces are made out of a single type of material:
- wherein the single type of material is a paper, a corrugated paper a plastic, or a corrugated plastic.

\* \* \* \* \*